US012791676B2

(12) United States Patent
Choi et al.

(10) Patent No.: US 12,791,676 B2
(45) Date of Patent: Nov. 10, 2026

(54) MOTOR

(71) Applicant: LG INNOTEK CO., LTD., Seoul (KR)

(72) Inventors: Jin Myung Choi, Seoul (KR); Young Dae Park, Seoul (KR); Jin Yong Kim, Seoul (KR); Jin Seob Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1149 days.

(21) Appl. No.: 17/793,708

(22) PCT Filed: Jan. 19, 2021

(86) PCT No.: PCT/KR2021/000731

§ 371 (c)(1),
(2) Date: Jul. 19, 2022

(87) PCT Pub. No.: WO2021/149995

PCT Pub. Date: Jul. 29, 2021

(65) Prior Publication Data

US 2023/0046753 A1 Feb. 16, 2023

(30) Foreign Application Priority Data

Jan. 20, 2020 (KR) ........................ 10-2020-0007447
Jan. 22, 2020 (KR) ........................ 10-2020-0008528
(Continued)

(51) Int. Cl.
*H02K 11/21* (2016.01)
*G01D 5/20* (2006.01)
*G01S 7/481* (2006.01)
*G01S 17/10* (2020.01)
(Continued)

(52) U.S. Cl.
CPC .......... *G01S 7/4817* (2013.01); *G01D 5/2006* (2013.01); *G01S 17/10* (2013.01);
(Continued)

(58) Field of Classification Search
CPC ..... G01S 7/4817; G01S 17/10; H02K 11/215; H02K 5/1735; H02K 7/085; H02K 21/22; H02K 2211/03; G01D 5/2006
See application file for complete search history.

(56) References Cited

U.S. PATENT DOCUMENTS 7,230,357 B2 6/2007 Rojo Lulic
9,036,237 B2 5/2015 Hayashi et al.
2015/0015104 A1 1/2015 Kataoka et al.

FOREIGN PATENT DOCUMENTS

JP H11-332164 11/1999
JP 2006-050848 2/2006
(Continued)

OTHER PUBLICATIONS

Korean Office Action dated Jan. 15, 2025 issued in Application No. 10-2020-0014830.
(Continued)

*Primary Examiner* — Terrance L Kenerly
(74) *Attorney, Agent, or Firm* — KED & ASSOCIATES, LLP

(57) ABSTRACT

An embodiment can provide a motor comprising: a shaft; a rotor coupled to the shaft; a stator disposed between the shaft and the rotor; a bearing disposed between the shaft and the stator; and a base plate, wherein: the rotor includes a yoke coupled to the shaft; the base plate includes a body, a first partition protruding from the body, and a second partition extending from the first partition; the first partition is disposed between the bearing and the stator; a portion of the second partition is disposed to be overlapped with the first partition; and the first partition is in contact with the lateral surface of an outer ring of the bearing and the second partition is in contact with the one surface of the outer ring of the bearing.

9 Claims, 63 Drawing Sheets

(30) Foreign Application Priority Data

Feb. 5, 2020 (KR) ........................ 10-2020-0013619
Feb. 7, 2020 (KR) ........................ 10-2020-0014830
Apr. 29, 2020 (KR) ........................ 10-2020-0052818

(51) Int. Cl.

| | |
|---|---|
| ***H02K 5/173*** | (2006.01) |
| ***H02K 7/08*** | (2006.01) |
| ***H02K 11/215*** | (2016.01) |
| ***H02K 21/22*** | (2006.01) |

(52) U.S. Cl.

CPC .......... *H02K 5/1735* (2013.01); *H02K 7/085* (2013.01); *H02K 11/215* (2016.01); *H02K 21/22* (2013.01); *H02K 2211/03* (2013.01)

(56) References Cited

FOREIGN PATENT DOCUMENTS

| | | |
|---|---|---|
| JP | 2009-124900 | 6/2009 |
| JP | 2014-010193 | 1/2014 |
| JP | 2016-114897 | 6/2016 |
| KR | 20-2000-0000314 | 1/2000 |
| KR | 10-2005-0098536 | 10/2005 |
| KR | 10-0872397 | 12/2008 |
| KR | 10-2014-0087140 | 7/2014 |
| KR | 10-1979374 | 5/2019 |
| KR | 10-2019-0118395 | 10/2019 |
| WO | WO 2019/199056 | 10/2019 |
| WO | WO 2020/091378 | 5/2020 |

OTHER PUBLICATIONS

International Search Report dated Apr. 26, 2021 issued in Application No. PCT/KR2021/000731.

Japanese Office Action dated Oct. 1, 2024 issued in Application No. 2022-544122.

Chinese Office Action dated Jun. 6, 2025, issued in Application No. 202180010124.6.

European Search Report dated Jan. 25, 2024 issued in Application No. 21744824.0.

MOTOR

CROSS-REFERENCE TO RELATED PATENT APPLICATIONS

This application is a U.S. National Stage Application under 35 U.S.C. § 371 of PCT Application No. PCT/KR2021/000731, filed Jan. 19, 2021, which claims priority to Korean Patent Application Nos. 10-2020-0007447, filed Jan. 20, 2020, 10-2020-0008528, filed Jan. 22, 2020, 10-2020-0013619, filed Feb. 5, 2020, 10-2020-0014830, filed Feb. 7, 2020 and 10-2020-0052818, filed Apr. 29, 2020, whose entire disclosures are hereby incorporated by reference.

TECHNICAL FIELD

Embodiments relate to a motor.

BACKGROUND ART

A motor may include a rotor, a stator and a shaft. The shaft is coupled to the rotor. The rotor may be disposed outside of the stator. The rotor rotates via the electromagnetic interaction between the rotor and the stator, and when the rotor rotates, the shaft rotates.

The shaft may connect a sensor device (e.g., light detection and ranging (LiDAR)).

In order to detect a position of the rotor, the motor may include a sensor configured to sense a change in a magnetic flux of a drive magnet disposed in the rotor. In addition, a separate sensing magnet which is multi-polar magnetized may be disposed to increase resolution and a sensor configured to sense the change in the magnetic flux therefrom may be provided.

These sensors may be mounted on a substrate. The substrate may be mounted on a base plate. Meanwhile, a bearing configured to support the shaft may be provided, and the bearing may be received in a bearing housing. The bearing housing may be coupled to the base plate.

When coupling the bearing housing to the base plate, press-fit or caulking is used. Usually, the bearing housing is made of aluminum or brass, and the base plate is made of a steel plate.

The bearing housing needs to secure rigidity to support a shaft via the bearing. Accordingly, the bearing housing has to be designed to have a thickness greater than or equal to a certain thickness. However, with an increase in the thickness of the bearing housing, there is a problem that the design of other components is restrained. In addition, since the materials of the bearing housing and the base plate differ from each other, a press-fit part or a caulking part is continuously stressed by temperature and external force, resulting in a structurally weak problem.

Meanwhile, a sensor device may be a device that senses a pulse returned when an emitted light pulse is reflected by hitting an object. In that case, in order to emit the light pulse, the sensor device may include a mirror. The mirror is connected to the rotor via a holder. When the rotor rotates, the holder rotates, and the mirror fixed to the holder rotates as well.

The mirror needs to have a sufficient height in an axial direction for the purpose of sufficiently securing a field of view of the sensor device.

However, a longer length of the mirror in the axial direction leads to a reduction of the mounting property of the motor, and an increase in the weight and size of the motor causes a degradation of the energy efficiency of equipment equipped with the motor.

Meanwhile, regular speed driving of the motor may be an important factor that secures the performance of the sensor device. The regular speed driving of the motor may be determined by detecting the position of a rotating rotor. To detect the position of the rotor, the motor may include a hall sensor configured to sense the change in the magnetic flux of the drive magnet disposed in the rotor. However, when a very high regular speed condition of the motor is required for use of the sensor device, there is a problem in that sensing the change in the magnetic flux caused by a general drive magnet has a limitation in satisfying the regular speed condition of the motor.

Accordingly, a separate multi-polar magnetized sensing magnet needs to be additionally disposed in order to increase the resolution.

Even if the sensing magnet is additionally disposed, there is a problem in that an additional sensing magnet needs be disposed with a separate sensor to detect an index signal that recognizes one rotation of the motor.

Meanwhile, since the stator is disposed under the mirror in the axial direction, there is a problem in that the height of the mirror may not be sufficiently secured due to the height of the stator.

Meanwhile, the mirror is fixed to the holder through an adhesive. As the mirror fixed with an adhesive has a weak bonding force, it may be separated from the holder due to external force or vibration. Specifically, there is a risk that the mirror may be separated from the holder while the performance of the adhesive decreases due to temperature and humidity conditions. In addition, when the holder and the mirror are fixed through a separate guide, the guide may cover a coating layer disposed on a front surface of the mirror in a process of coupling the guide to the mirror, resulting in reducing sensing performance.

DISCLOSURE

Technical Problem

Hereinafter, the embodiments are intended to solve the aforementioned problems and provide a motor with a high structural rigidity and a high degree of design freedom.

The embodiments also provide a motor that can reduce the size and weight of the entire motor while sufficiently securing an axial length of a mirror.

The embodiments also provide a motor that can accurately recognize a position of a rotor in a simple configuration without an additional sensing magnet.

The embodiments also provide a motor that ensure sensing performance while firmly fixing a mirror to a holder.

The problem to be solved by the present invention is not limited to the above-mentioned problems, and other problems not mentioned herein may be clearly understood by those skilled in the art from the following description.

Technical Solution

An embodiment may provide a motor comprising: a shaft; a rotor coupled to the shaft and a stator disposed between the shaft and the rotor; a bearing disposed between the shaft and the stator; and a base plate, wherein the rotor includes a yoke coupled to the shaft; the base plate includes a body, a first partition protruding from the body, and a second partition extending from the first partition; the first partition is disposed between the bearing and the stator; a portion of the second partition is disposed to be overlapped with the first partition; and the first partition is in contact with a lateral surface of an outer ring of the bearing and the second partition is in contact with one surface of the outer ring of the bearing.

An embodiment may provide a motor comprising a shaft; a rotor coupled to the shaft and a stator disposed between the shaft and the rotor; a bearing disposed between the shaft and the stator; and a base plate, wherein the rotor includes a yoke coupled to the shaft, the yoke includes a first hole penetrated by the shaft, the base plate includes a second hole penetrated by the shaft, an inner diameter of the second hole is larger than an inner diameter of the first hole, the shaft is in contact with an inner surface of the first hole, and an outer surface of the bearing is in contact with an inner surface of the second hole.

Preferably, the yoke may include an extension part in contact with the shaft, and in a radial direction, the second partition may be disposed to be overlapped with the extension part.

Preferably, in the radial direction, at least a portion of the first partition may be disposed to be overlapped with the stator.

Preferably, a curved surface disposed in a boundary between the body and the first partition may be provided.

Preferably, a distance from the body to an upper end of the first partition may exceed a length of the bearing and may be less than the longest distance from the body to the yoke in an axial direction.

Preferably, the rotor may further include a drive magnet and a sensing magnet coupled to the yoke, and at least a portion of the first partition in the radial direction may be disposed to be overlapped with the stator, the drive magnet and the sensing magnet.

Preferably, in the radial direction, a portion of the base plate may be disposed to be overlapped with the bearing.

Preferably, in the radial direction, a portion of the base plate may be disposed to be overlapped with the yoke.

Preferably, a distance in the radial direction between an inner surface of an inner ring of the bearing and an outer surface of the outer ring, in the radial direction, may be the same as a difference between the inner diameter of the second hole and the inner diameter of the first hole.

An embodiment provides a motor comprising: a shaft; a rotor coupled to the shaft; a stator disposed between the shaft and the rotor; a connection member including a first surface and a second surface and disposed on the rotor; a holder disposed on the connection member; and a mirror coupled to the holder, wherein the rotor includes a yoke coupled to the shaft, and the first surface is in contact with the holder, and the second surface is in contact with the yoke.

Preferably, the connection member may be disposed to be overlapped with the mirror in the radial direction.

Preferably, the mirror and the yoke may be disposed to be overlapped in the radial direction.

Preferably, the mirror may include a first mirror and a second mirror, and the holder may include a first member coupled to the first mirror, a second member coupled to the second mirror, and a third member connecting the first member and the second member, wherein the first surface may be in contact with the third member, and the second surface may be in contact with an upper surface of the yoke.

Preferably, the yoke may include a first hole disposed on the upper surface of the yoke penetrated by the shaft, and the connection member may be press-fitted into the first hole and coupled to the yoke, and may be coupled to the holder via a fastening member.

Preferably, the yoke may include a second hole disposed on the upper surface of the yoke, and a portion of the fastening member may be disposed to be overlapped with the second hole in the radial direction.

Preferably, the connection member may include a third hole penetrated by the fastening member, and a screw tab may be disposed on an inner surface of the third hole.

Preferably, the connection member may include a body including the first surface and the second surface, and a protrusion protruding from the second surface and disposed inside the first hole.

Preferably, the first member may include a third surface in contact with the first mirror and a first groove concavely disposed on the third surface, the second member may include a fourth surface in contact with the second mirror and a second groove concavely disposed on the fourth surface, and an adhesive may be disposed in the first groove and the second groove.

Preferably, each of the first groove and the second groove may have an axial length greater than a length in a width direction.

Preferably, the third member may include a fourth hole penetrated by the shaft and a fifth hole penetrated by the fastening member.

Preferably, the second hole, the third hole, and the fifth hole may be disposed to correspond to each other in the axial direction.

Preferably, the first member may include a fifth surface facing the first surface and a third groove concavely disposed on the fifth surface, the second member may include a sixth surface facing the second surface and a fourth groove concavely disposed on the sixth surface, and one portion of the yoke may be disposed in the third groove and the other portion of the yoke may be disposed in the fourth groove.

An embodiment may provide a motor comprising: a shaft; a rotor coupled to the shaft; a stator disposed in the rotor; and a substrate on which a sensor is disposed, wherein the rotor includes a yoke and a magnet coupled to the yoke, the yoke includes a body and a flange extending from the body, the flange includes a plurality of first edges and a plurality of second edges alternately disposed along a circumferential direction of the yoke, and the second edge is disposed closer to the body than the first edge in the radial direction of the yoke.

Preferably, the substrate may include a coil electrically connected to the sensor, and the sensor may be disposed to correspond to the magnet.

Preferably, the coil may be a pattern coil.

Preferably, the stator may be disposed between the shaft and the rotor.

Preferably, the yoke may be coupled to the shaft.

Preferably, the magnet may be disposed on an inner circumferential surface of the body.

Preferably, the first edge may be disposed on an outer side of the coil.

Preferably, at least a portion of the coil may be disposed between the first edge and the second edge in the radial direction of the yoke.

Preferably, the first edge and the second edge may be curved, and the second edge may be disposed on an outer circumferential surface of the body.

Preferably, the flange may include a third edge connecting the first edge and the second edge, and the third edge may be disposed along the radial direction of the yoke.

Preferably, the thickness of the body may be the same as that of the flange.

Preferably, the magnet and the flange may be disposed to be overlapped in the radial direction of the yoke.

Preferably, a base on which the substrate is disposed, a bearing housing connected to the base, and a bearing disposed inside the bearing housing may be further included, and the stator may be coupled to an outer side of the bearing housing, and the shaft may be rotatably supported by the bearing.

Preferably, the flange may be disposed to be overlapped with the bearing housing in the radial direction of the yoke.

Preferably, each of the plurality of first edges may have the same circumferential length, and the plurality of second edges may have the same circumferential length.

An embodiment may provide a motor comprising: a shaft; a rotor coupled to the shaft and including a yoke; a stator disposed in the rotor; a connection member disposed on the rotor; a holder coupled to the connection member; a mirror coupled to the holder; a bearing housing coupled to the stator; and a first bearing and a second bearing disposed in the bearing housing, wherein the first bearing is disposed between the bearing housing and the yoke, and the second bearing is disposed between the shaft and the bearing housing, and the stator is disposed to be overlapped with the mirror in a radial direction.

An embodiment may provide a motor comprising: a shaft; a rotor coupled to the shaft; a stator disposed in the rotor; a connection member disposed on the rotor; a holder disposed on the connection member; a mirror coupled to the holder; a bearing housing coupled to the stator; and a first bearing and a second bearing disposed on the bearing housing, wherein the first bearing is disposed to be overlapped with the mirror in a radial direction, the second bearing is disposed not to be overlapped with the mirror in the radial direction, and an inner diameter of the first bearing may provide a motor larger than an inner diameter of the second bearing.

An embodiment may provide a motor comprising: a shaft; a rotor coupled to the shaft; a stator disposed in the rotor; a connection member disposed on the rotor; a holder disposed on the connection member; a first mirror and a second mirror coupled to the holder; a bearing housing coupled to the stator; and a first bearing disposed on the bearing housing, wherein the rotor includes a yoke coupled to the shaft and a magnet disposed in the yoke, the yoke includes a magnet receiving part in which the magnet is disposed and a pillar part in contact with the first bearing. An outer diameter of the magnet receiving part may be larger than an outer diameter of the pillar part, and smaller than the shortest distance between the first mirror and the second mirror.

Preferable, the first bearing may be disposed to be overlapped with the mirror in a radial direction, and the second bearing may be disposed not to be overlapped with the mirror in the radial direction.

Preferably, the magnet may be disposed to be overlapped with the first mirror and the second mirror.

Preferably, an inner diameter of the stator may be smaller than an outer diameter of the first bearing, and an inner diameter of the second bearing may be smaller than an inner diameter of the first bearing.

Preferably, the bearing housing may include a first region in contact with the stator and a second region in contact with the first bearing, and an outer diameter of the first region may be larger than an outer diameter of the second region.

Preferably, the bearing housing may include a third region in contact with the second bearing, and an inner diameter of the third region may be larger than the outer diameter of the first region.

Preferably, the stator may include a stator core, and an inner diameter of the stator may be smaller than the outer diameter of the first bearing.

Preferably, the connection member may include a first surface and a second surface, wherein the first surface may be in contact with the holder and the second surface may be in contact with the yoke.

An embodiment may provide a motor comprising: a shaft; a rotor coupled to a shaft and including a yoke; a stator disposed in the rotor; a connection member disposed on the rotor; a holder disposed on the connection member; and a mirror coupled to the holder, wherein the holder includes a first surface in contact with a rear surface of the mirror and a first protrusion disposed to protrude rather than the first surface, and the first protrusion is in contact with one of a side surface and a front surface of the mirror.

Preferably, the holder may include a body including the first surface and a bracket coupled to the body, the bracket may include the first protrusion, and the first protrusion may be in contact with both side surfaces of the mirror.

Preferably, the holder may include a second protrusion protruding rather than the first surface, and the second protrusion may be in contact with an upper surface or a lower surface of the mirror.

Preferably, the height of the mirror may exceed the height of the bracket and less than a height of the holder.

Preferably, the bracket may include a bracket body in contact with the holder, and a clip part bent from the bracket body to contact a side surface of the mirror.

Preferably, at least a portion of the side surface of the mirror may include a first side part inclined with regard to a front surface of the mirror, and the clip part may be in contact with the first side part.

Preferably, the holder may include a body including the first surface and a bracket coupled to the body, the bracket may include the first protrusion, and the first protrusion may be in contact with the front surface of the mirror.

Preferably, the bracket may include a bracket body in contact with the holder and a clip part bent from the bracket body to contact the front surface of the mirror.

Preferably, the first protrusion may include a first-first protrusion in contact with one-side surface of the mirror and a first-second protrusion in contact with the other-side surface of the mirror, the holder may include a body including the first surface and the first protrusion, and the body may include a first part and a second part coupled to the first part. A portion of the first surface may be disposed in the first part, the remaining portion of the first surface may be disposed in the second part. The first-first protrusion may be disposed in the first part, and the first-second protrusion may be disposed in the second part.

Preferably, the first part and the second part may be disposed symmetrically with regard to the center of a width of the mirror.

Preferably, the holder may include a first screw and a second screw coupled across the first part and the second part. A head of the first screw may be in contact with the first part, and a head of the second screw may be in contact with the second part.

Preferably, the thickness of the first protrusion may be identical to the thickness of the mirror.

Preferably, the first protrusion may include a first-first protrusion in contact with one-side surface of the side surfaces of the mirror and a first-second protrusion in contact with the other-side surface of the side surfaces of the mirror. The holder may include a body including the first surface and the protrusion, and the body may include a third part, a fourth part coupled to the third part, and a fifth part coupled to the fourth part. The first surface may be disposed in the third part, the first protrusion may be disposed in the fourth part, and the second protrusion may be disposed in the fifth part.

Preferably, the third part and the fourth part may be spaced apart from a rear surface of the mirror.

Preferably, the side surface of the mirror may include a third side surface connected to the front surface of the mirror and a fourth side connected to the rear surface of the mirror. The third side surface and the fourth side surface may be connected using a stepped surface, and the first protrusion may be in contact with the stepped surface.

Preferably, a portion of the mirror and a portion of the first protrusion may be disposed to overlap each other with regard to the thickness direction of the mirror.

Advantageous Effects

According to the embodiments, a portion of the base plate may support the bearing, thereby providing a high structural rigidity and a high degree of design freedom.

According to the embodiments, the bearing housing may be removed to facilitate assembly and tolerance management.

According to the embodiments, a portion of the base plate may support the bearing, thereby providing high structural rigidity.

According to the embodiments, the weight and size of the motor may be reduced while sufficiently securing the axial length of the mirror.

According to the embodiments, when connecting the holder and the rotor, the number of components and the assembling process may be reduced using the connection member, which is a single component.

According to the embodiments, since the grooves where the adhesive is located on a surface of the holder in contact with the mirror are elongated in the axial direction, the adhesive may be easily applied and easily cured.

According to the embodiments, the holder and the connection member may be arranged so that a portion of the fastening member overlaps an upper surface of the yoke of the rotor in a radial direction, thereby preventing slip from occurring in the rotating direction between the holder and the rotor.

According to the embodiments, the protrusion of the connection member may be press-fitted into the yoke, thereby facilitating assembly.

According to the embodiments, the number of components for sensing the position of the rotor may be greatly reduced, thereby resulting in simple configuration.

According to the embodiments, the yoke configured to fix the magnet may be adapted to sense the position of the rotor using magnetic induction, thereby reducing the number of components.

According to the embodiments, an advantageous effect which can satisfy a high regular speed driving condition is thus achieved.

According to an embodiment, the yoke flange may be employed to detect the position of the rotor, thereby providing high degree of design freedom and high availability.

According to the embodiments, since the sensing magnet is not used, an advantage here is that there is no magnetic field interference with the drive magnet.

According to the embodiments, the winding space of the stator for the coil may be ensured even while reducing the outer diameter of the stator so that the axial length of the mirror increases, thereby ensuring a torque of the motor.

According to the embodiments, a relatively large first bearing may rotatably support the yoke, thereby having a high robustness of an axial structure.

According to the embodiments, there is an advantage of firmly fixing the mirror to the holder.

According to the embodiments, since the coating disposed on the front surface of the mirror is not covered while fixing the mirror to the holder, sensing performance may be ensured.

BEST MODE

A direction parallel to a longitudinal direction (up-and-down direction) of a shaft is referred to as an axial direction, while a direction perpendicular to the axial direction around the shaft is referred to as a radial direction, and a direction along a circle with a radial radius around the shaft is referred to as a circumferential direction.

Figure 1:
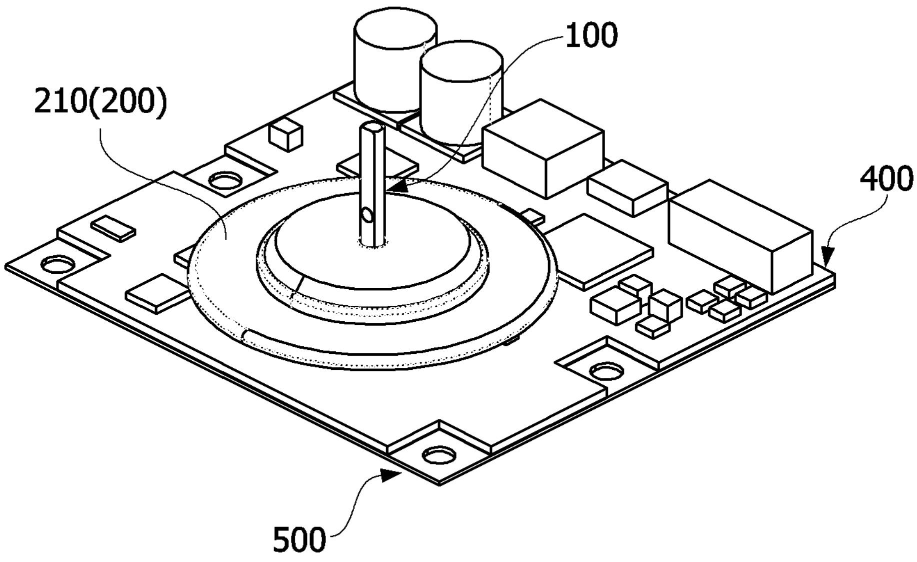
FIG. 1 is a perspective view illustrating a motor according to one embodiment.
Figure 2:
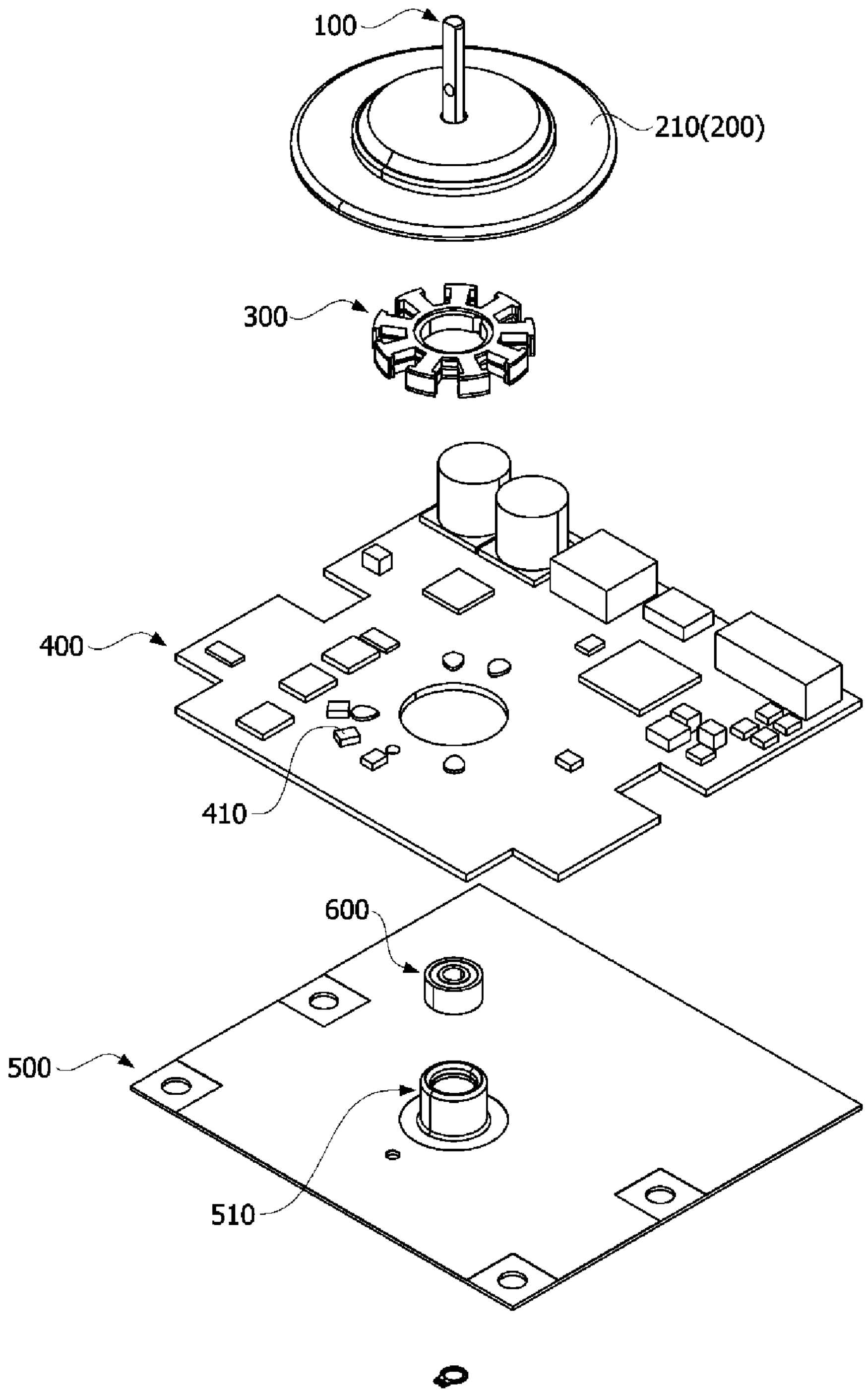
FIG. 2 is an exploded perspective view of the motor shown in FIG. 1.
Figure 3:
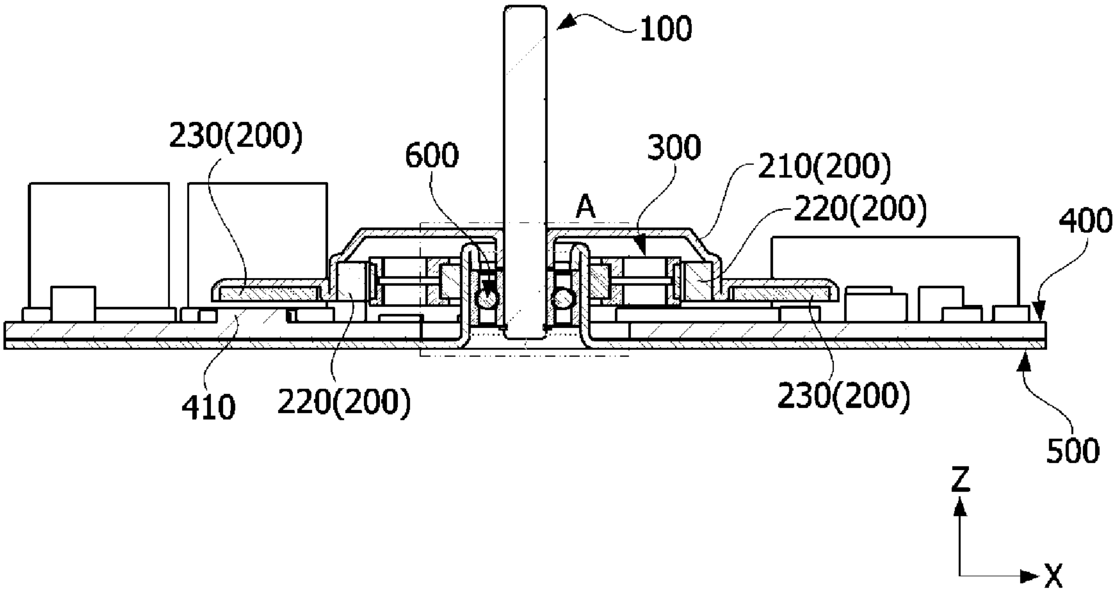
FIG. 3 is a side sectional view of the motor taken along line A-A in FIG. 1.

FIG. 1 is a perspective view illustrating a motor according to one embodiment, FIG. 2 is an exploded perspective view of the motor shown in FIG. 1, and FIG. 3 is a side sectional view of the motor taken along line A-A in FIG. 1. Hereinafter, an inner side is a direction facing a shaft 100 on the basis of the radial direction x of the motor, and an outer side is a direction opposite to the inner side. Hereinafter, in the drawings, an x-axis represents the radial direction, and a z-axis represents the axial direction.

Referring to FIGS. 1 to 3, a motor according to one embodiment may include the shaft 100, a rotor 200, and a stator 300.

The shaft 100 is coupled to a yoke 210 of the rotor 200. The shaft 100 may be press-fitted and coupled to the yoke 210. Alternatively, the shaft 100 may be integrated with the yoke 210. The shaft 100 rotates with the rotor 200. The shaft 100 is rotatably supported by a bearing 600.

The rotor 200 may include the yoke 210, a drive magnet 220, and a sensing magnet 230.

The yoke 210 is coupled to the shaft 100. The shaft 100 may be disposed at the center of the yoke 210.

The drive magnet 220 is for rotating the yoke 210. The drive magnet 220 may be disposed on an inner surface of the yoke 210. The drive magnet 220 may be disposed to face the stator 300 in the radial direction x of the rotor 200. When an electrical interaction occurs between the drive magnet 220 and a coil of the stator 300, the yoke 210 rotates. The drive magnet 220 may be a combination of a plurality of unit magnets. Alternatively, the drive magnet 220 may be a single component with a ring shape.

The sensing magnet 230 is for precisely recognizing a position of the rotor 200. The sensing magnet 230 may be disposed on the inner surface of the yoke 210. In addition, the sensing magnet 230 may be disposed to face a substrate 400 in an axial direction z.

The stator 300 may be disposed between the shaft 100 and the yoke 210. The stator 300 may be fixed to an outer surface of a first partition 520 (in FIG. 7) of a base plate 500. The stator 300 may include a core of the stator 300 including a plurality of teeth, and the coil may be wound around each tooth. The teeth may include an insulator configured to insulate the coil and the core of the stator 300.

The substrate 400 is disposed on one side of the yoke 210. The substrate 400 may include a sensor 410. The sensor 410 may be a Hall IC or an encoder IC that senses a change in a magnetic flux of the sensing magnet 230. The sensor 410 may be disposed to face the drive magnet 220 or the sensing magnet 230 in the axial direction z.

The substrate 400 may be mounted on one surface of the base plate 500.

The bearing 600 rotatably supports the shaft 100.

Figure 4:
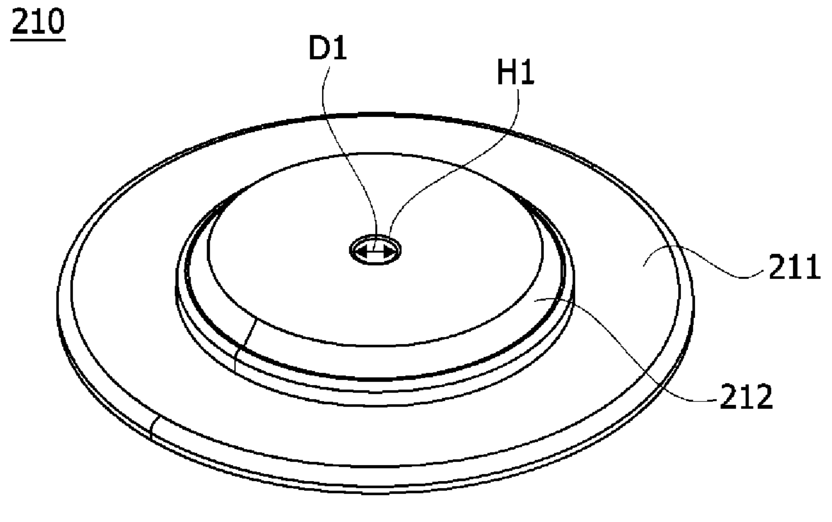
FIG. 4 is a perspective view illustrating a yoke.

FIG. 4 is a perspective view illustrating the yoke 210.

Referring to FIGS. 3 and 4, the yoke 210 may include a base 211 and a magnet receiving part 212. The yoke 210 may be a cylindrical member where one side and the other side thereof are opened as a whole. The magnet receiving part 212 may protrude from the base 211. The base 211 and the magnet receiving part 212 may have different inner diameters, respectively. The inner diameter of the base 211 may be larger than the inner diameter of the magnet receiving part 212.

The sensing magnet 230 is disposed inside the base 211. The drive magnet 220 is disposed in an inner side of the magnet receiving part 212.

The yoke 210 may include a first hole H1. The shaft 100 is disposed to penetrate the first hole H1.

Figure 5:
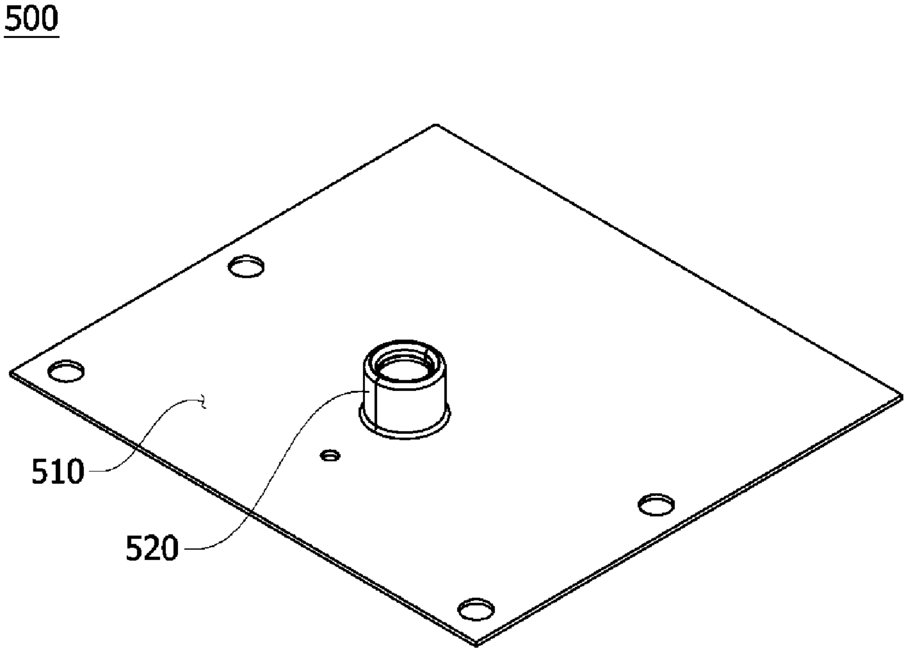
FIG. 5 is a view illustrating a base plate.
Figure 6:
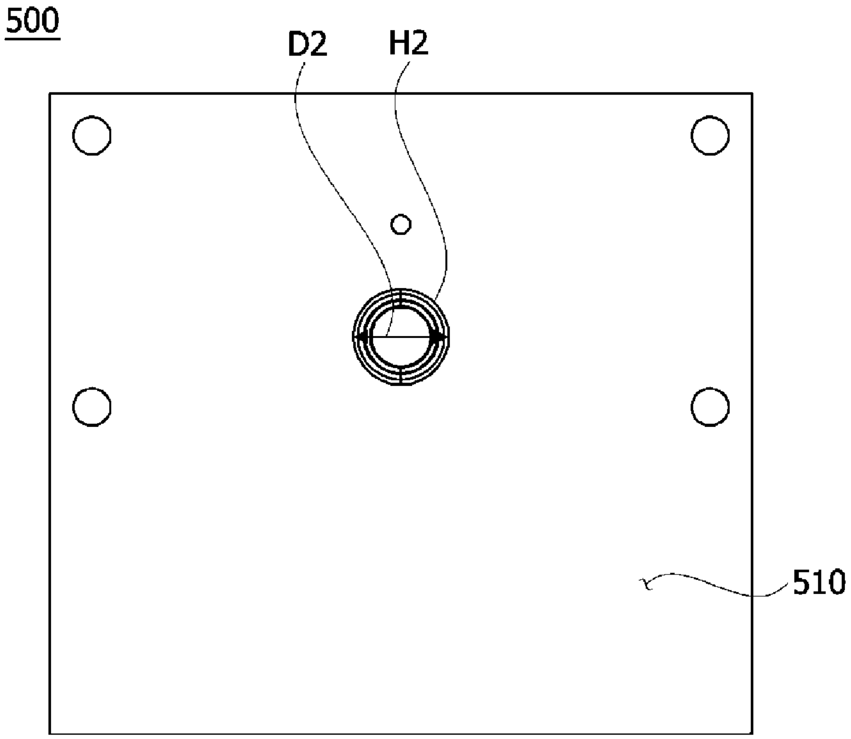
FIG. 6 is a bottom view of the base plate illustrated in FIG. 5.

FIG. 5 is a view illustrating the base plate 500, and FIG. 6 is a bottom view of the base plate 500 illustrated in FIG. 5.

Referring to FIGS. 5 and 6, the base plate 500 may include a body 510 and the first partition 520. The substrate 400 is mounted on one surface of the body 510. The first partition 520 protrudes from the body 510. The first partition 520 is an annular member that forms a space inside. The body 510 and the first partition 520 are integrated with each other. The bearing 600 is received in an inner side of the first partition 520.

The first partition 520 forms a second hole H2. The second hole H2 is a part penetrated by the shaft 100.

Figure 7:
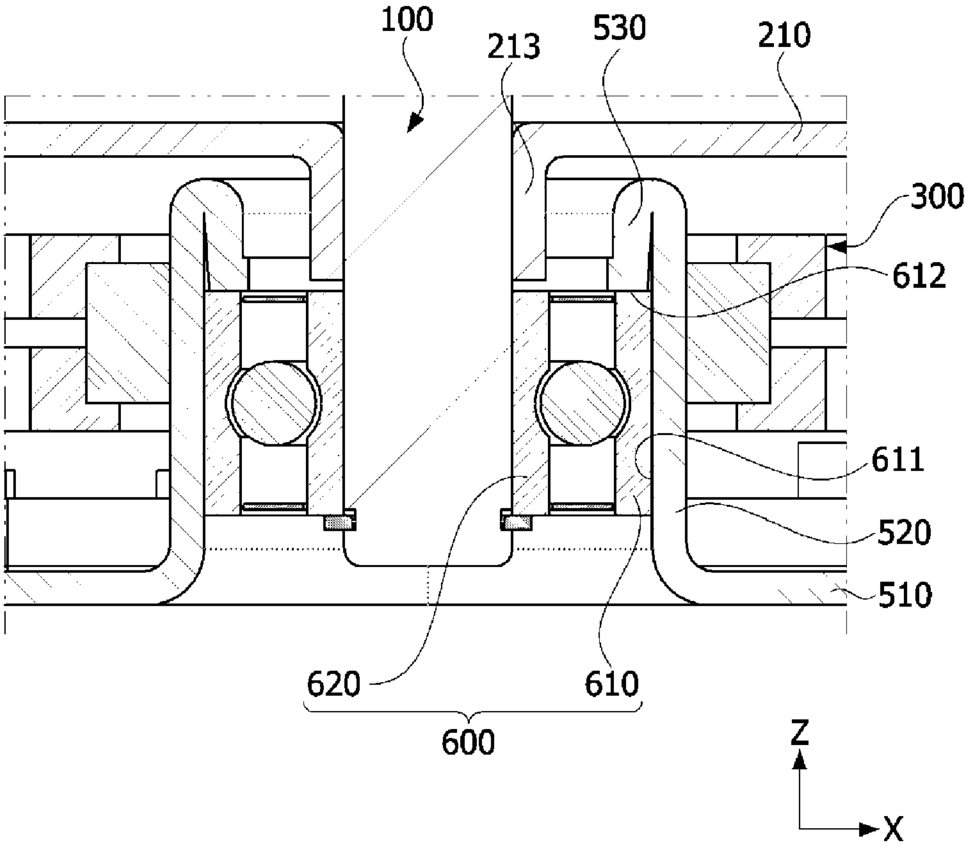
FIG. 7 is an enlarged view illustrating a part A in FIG. 3.

FIG. 7 is an enlarged view illustrating a part A in FIG. 3.

Referring to FIGS. 5 to 7, an inner diameter D2 of the second hole H2 is larger than an inner diameter D1 of the first hole H1. An inner ring 620 of the bearing 600 is in contact with the shaft 100, and an outer surface of an outer ring 610 of the bearing 600 is in contact with an inner surface of the second hole H2.

The base plate 500 may include a second partition 530. The second partition 530 extends from the first partition 520. The second partition 530 may be disposed to be bent from the first partition 520. In addition, the second partition 530 may be disposed to be overlapped with the first partition 520 in a radial direction x. In the radial direction x, the first partition 520 may be disposed between the bearing 600 and the stator 300. An inner surface of the first partition 520 is in contact with a side surface 611 of the outer ring 610 of the bearing 600. An outer surface of the first partition 520 is in contact with the stator 300. The stator 300 may be fixed to the first partition 520. The second partition 530 may be in contact with one surface 612 of the outer ring 610 of the bearing 600. For example, an end of the second partition 530 may be in contact with one surface 612 of the outer ring 610 of the bearing 600. Accordingly, the bearing 600 is restrained in the radial direction x by the first partition 520 and is restrained in the axial direction z by the second partition 530.

Figure 8:
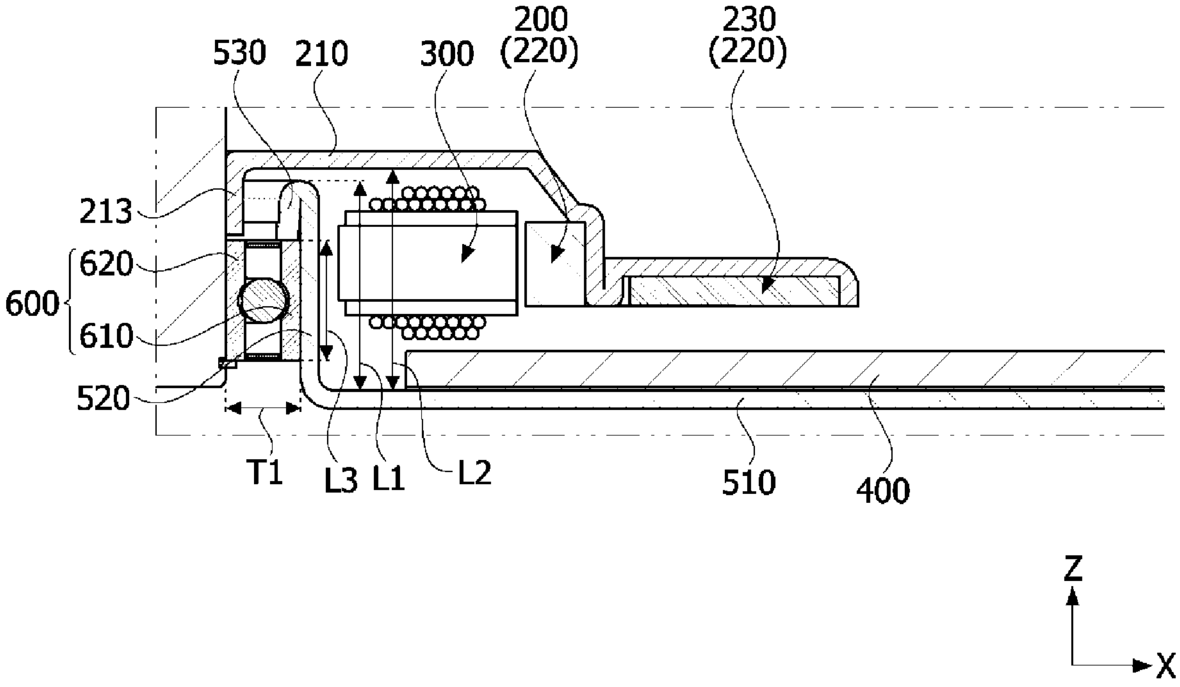
FIG. 8 is a side sectional view illustrating a portion of the motor.

FIG. 8 is a side sectional view illustrating a portion of the motor.

Referring to FIG. 8, the yoke 210 may include an extension part 213 in contact with the shaft 100. The second partition 530 may be disposed to be overlapped with the extension part 213 in the radial direction x. In addition, at least a portion of the first partition 520 may be disposed to be overlapped with the stator 300 in the radial direction x. In addition, at least a portion of the first partition 520 may be disposed to be overlapped with the drive magnet 220 and the sensing magnet 230 in the radial direction x.

A distance L1 from the body 510 to an upper end of the first partition 520 exceeds a length L3 of the bearing 600. In addition, the distance L1 from the body 510 to the upper end of the first partition 520 is smaller than an axial longest distance L2 of the yoke 210 from the body 510 of the base plate 500.

Meanwhile, a radial distance T1 between an inner surface of the inner ring 620 of the bearing 600 and an outer surface of the outer ring 610 of the bearing 600 may be the same as a difference between the inner diameter D2 of the second hole H2 and the inner diameter D1 of the first hole H1.

Such a structure is implemented by allowing a portion of the base plate 500 to protrude to the yoke 210 to receive the bearing 600. Since the overall length of the motor is small in the axial direction z, the motor may be easily installed, and high tolerance management of the axial direction z and high structural stability may be achieved. Specifically, since a part that receives the bearing 600 is a portion of the base plate 500 made of iron, there is an advantage of implementing an axial structure with high structural rigidity.

The first partition 520 may be processed by drawing the base plate 500, which is a flat plate member. Accordingly, a boundary between the first partition 520 and the body 510 may be curved.

Figure 9:
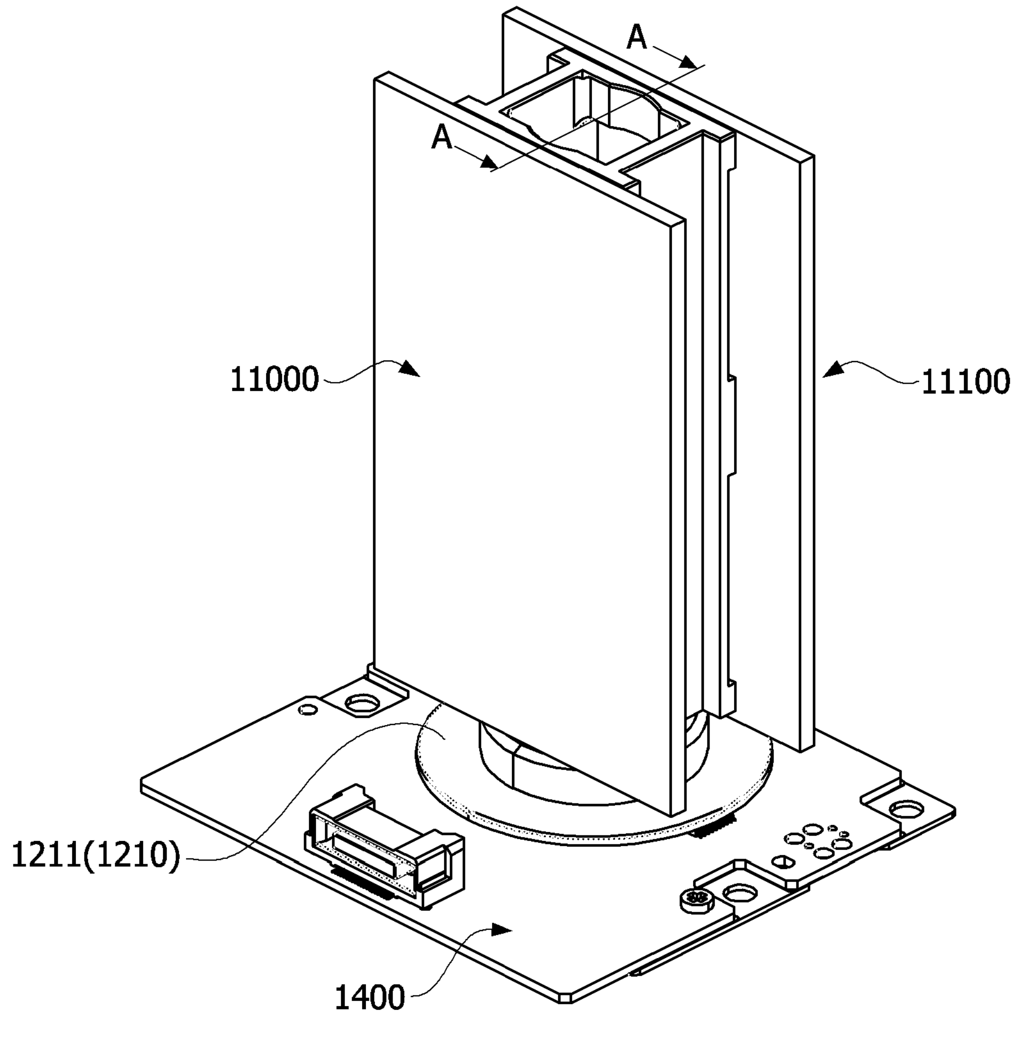
FIG. 9 is a perspective view illustrating a motor according to one embodiment.
Figure 10:
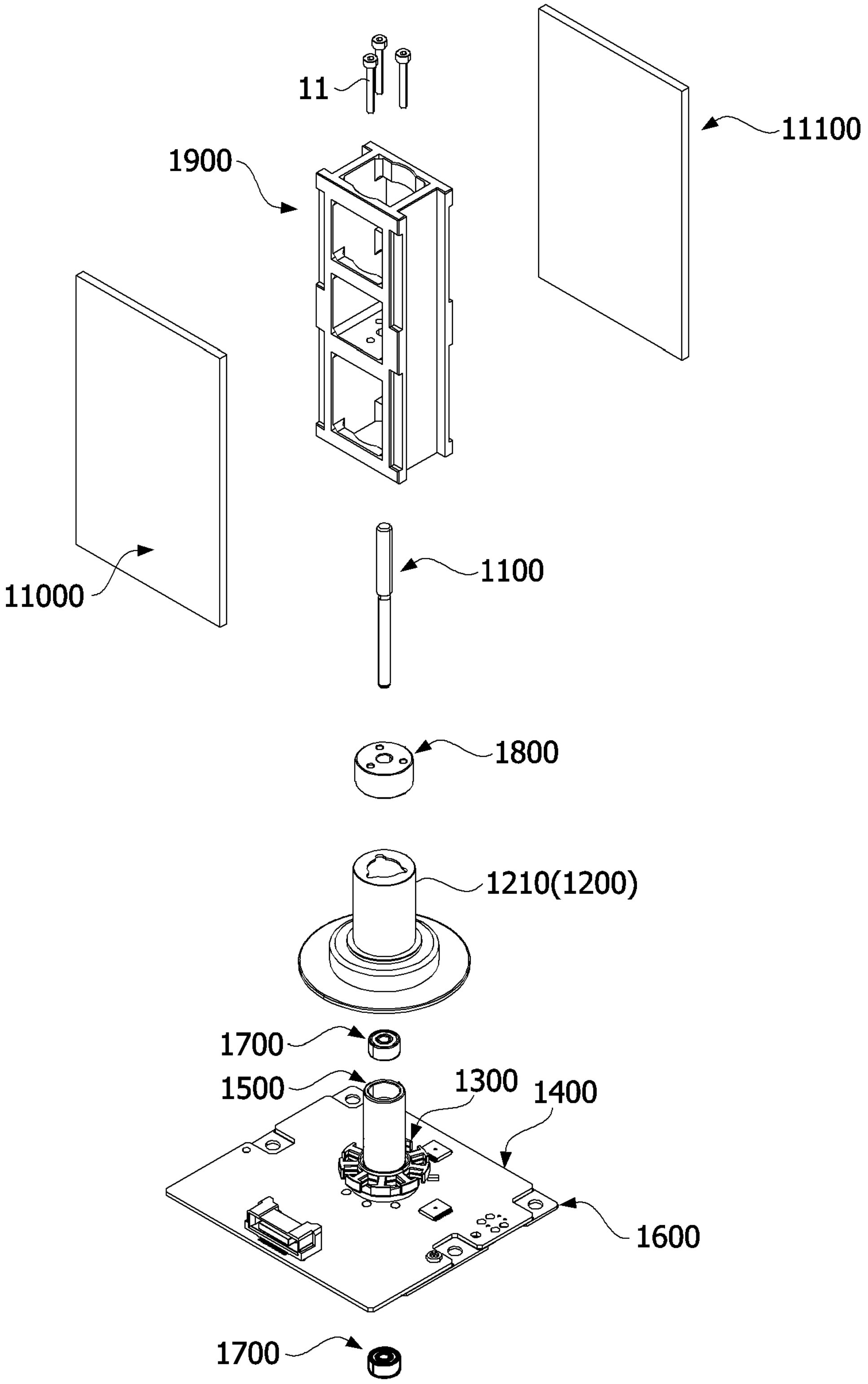
FIG. 10 is an exploded perspective view of the motor illustrated in FIG. 9.
Figure 11:
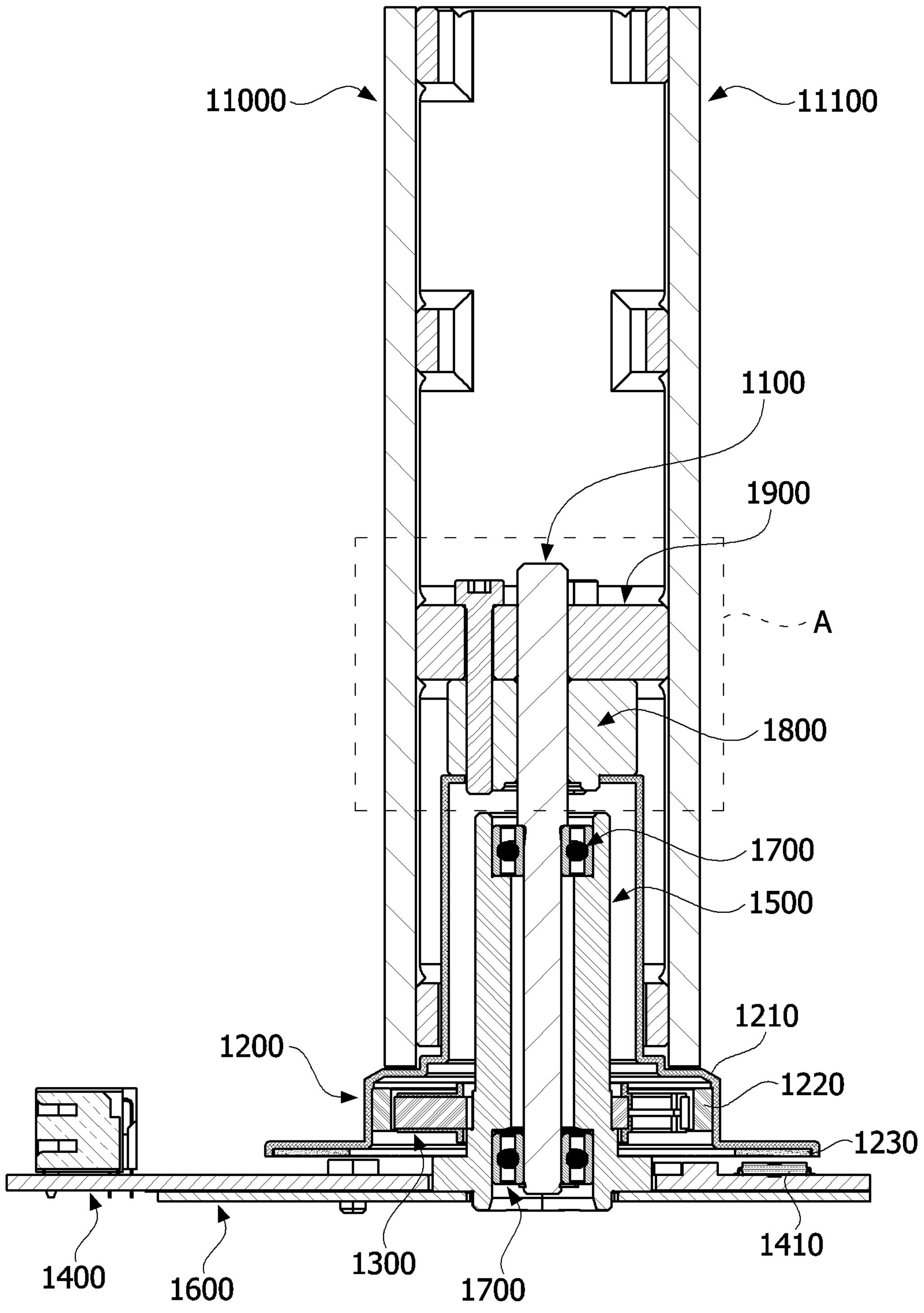
FIG. 11 is a side sectional view of the motor taken along line A-A in FIG. 9.

FIG. 9 is a perspective view illustrating the motor according to one embodiment, FIG. 10 is an exploded perspective view of the motor illustrated in FIG. 9, and FIG. 11 is a side sectional view of the motor taken along line A-A in FIG. 9. Hereinafter, an inner side is a direction facing the shaft 100 on the basis of the radial direction of the motor, and an outer side is a direction opposite to the inner side.

Referring to FIGS. 9 to 11, the motor according to embodiments may include a shaft 1100, a rotor 1200, and a stator 1300.

The shaft 1100 is coupled to the yoke 1210 of the rotor 1200. The shaft 1100 may be press-fitted and coupled to the yoke 1210. Alternatively, the shaft 1100 may be integrated with the yoke 1210. The shaft 1100 rotates with the rotor 1200. The shaft 1100 is rotatably supported by bearings 1700 disposed in an inner side of a bearing housing 1500.

The rotor 1200 may include a yoke 1210, a drive magnet 1220, and a sensing magnet 1230.

The yoke 1210 is coupled to the shaft 1100. The shaft 1100 may be disposed at the center of the yoke 1210.

The drive magnet 1220 is for rotating the yoke 1210. The drive magnet 1220 may be disposed on an inner surface of the yoke 1210. The drive magnet 1220 may be disposed to face the stator 1300 in the radial direction of the rotor 1200. When an electrical interaction occurs between the drive magnet 1220 and a coil of the stator 1300, the yoke 1210 rotates. The drive magnet 1220 may be a combination of a plurality of unit magnets. Alternatively, the drive magnet 1220 may be a single component having a ring shape.

The sensing magnet 1230 is for precisely recognizing a position of the rotor 1200. The sensing magnet 1230 may be disposed on the inner surface of the yoke 1210. In addition, the sensing magnet 1230 may be disposed to face the substrate 1400 in an axial direction.

The stator 1300 may be disposed between the shaft 1100 and the yoke 1210. The stator 1300 may be fixed to an outer surface of the bearing housing 1500. The stator 1300 may include a core of the stator 1300 including a plurality of teeth, and the coil may be wound around each tooth. The teeth may include an insulator configured to insulate the coil and the core of the stator 1300.

The substrate 1400 is disposed on one side of the yoke 1210. The substrate 1400 may include a sensor 1410. The sensor 1410 may be a Hall IC or an encoder IC that senses a change in magnetic flux of the sensing magnet 1230. The sensor 1410 may be disposed to face the drive magnet 1220 or the sensing magnet 1230 in the axial direction.

The bearing housing 1500 is a member that receives the bearings 1700 inside. The bearing housing 1500 may include a region such as a cylindrical member elongated along the axial direction.

The bearing housing 1500 is fixed to a plate 1600. Although the plate 1600 and the bearing housing 1500 are illustrated separately, the plate 1600 and the bearing housing 1500 may be integrated with each other. The substrate 1400 may be seated on one surface of the plate 1600.

The bearings 1700 may be mounted inside one-side end of the bearing housing 1500 and inside the other-side end thereof, respectively, in an axial direction. The bearings 1700 rotatably supports the shaft 1100. The bearings 1700 may be disposed not to be overlapped with the stator 1300 in the radial direction of the motor. For example, based on the axial direction, one of two bearings 1700 may be disposed higher than the stator 1300, while the other may be disposed lower than the stator 1300. In addition, one of the two bearings 1700 may be disposed higher than the drive magnet 1220 based on the axial direction.

A connection member 1800 is a member that couples the yoke 1210 to a holder 1900. The connection member 1800 is disposed between the yoke 1210 and the holder 1900 in the axial direction and couples the yoke 1210 to the holder 1900. When the yoke 1210 rotates, the connection member 1800 rotates, and the holder 1900 rotates together. The connection member 1800 may be a cylindrical member. One surface of the connection member 1800 may be in contact with the yoke 1210 in the axial direction, and the other surface of the connection member 1800 may be in contact with the holder 1900.

The holder 1900 fixes mirrors 11000 and 11100. In addition, the holder 1900 is coupled to the connection member 1800 and rotates together with the yoke 1210. The holder 1900 may be a member formed of a frame so that a cross section thereof is hollow inside. The holder 1900 having such a shape is resistant to bending and has the advantage of greatly reducing the weight. The first mirror 11000 and the second mirror 11100 may be disposed to face each other on one surface and the other surface of the holder 1900. The holder 1900 may be disposed to be overlapped with each of the first mirror 11000 and the second mirror 11100 in the radial direction.

The mirrors 11000 and 11100 serve to reflect a laser irradiated to an object to be sensed. The mirrors 11000 and 11100 may include the first mirror 11000 disposed on one surface of the holder 1900 and the second mirror 11100 disposed on the other surface of the holder 1900. When the yoke 1210 rotates, the holder 1900 rotates, and with the rotation of the holder 1900, the mirrors 11000 and 11100 rotate together. The mirrors 11000 and 11100 may be rectangular plate-shaped members which have long axial length. The mirrors 11000 and 11100 and the holder 1900 may be coupled to each other via an adhesive.

Figure 12:
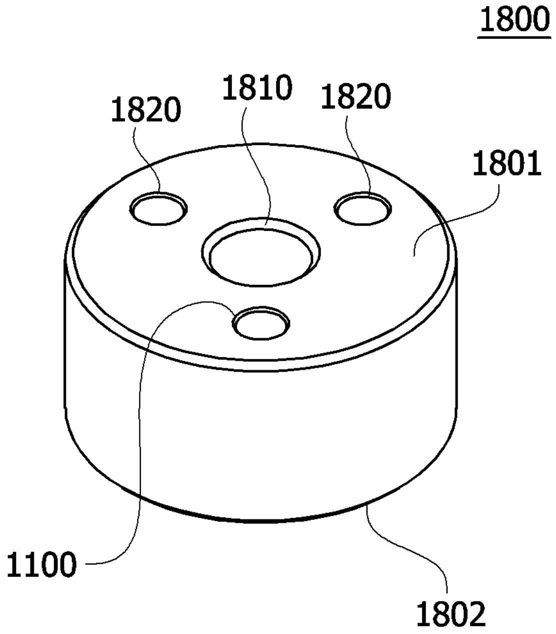
FIG. 12 is a perspective view illustrating a connection member.
Figure 13:
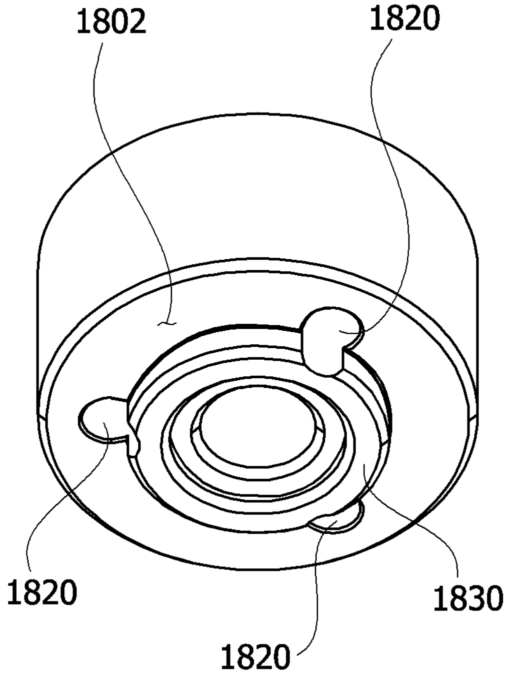
FIG. 13 is a bottom view of the connection member illustrated in FIG. 12.
Figure 14:
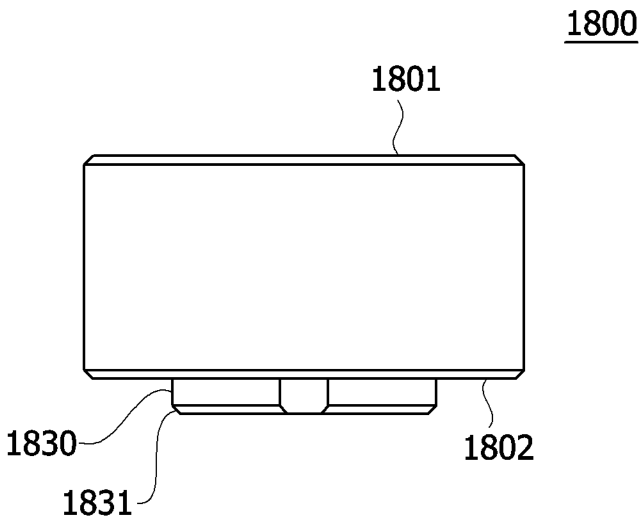
FIG. 14 is a side view of the connection member illustrated in FIG. 12.

FIG. 12 is a perspective view illustrating the connection member 1800, FIG. 13 is a bottom view of the connection member 1800 illustrated in FIG. 12, and FIG. 14 is a side view of the connection member 1800 illustrated in FIG. 12.

Referring to FIGS. 12 to 14, the connection member 1800 includes a first surface 1801 and a second surface 1802. The first surface 1801 may correspond to one surface of the cylindrical connection member 1800, and the second surface 1802 may correspond to the other surface of the cylindrical connection member 1800. The first surface 1801 and the second surface 1802 are disposed to face each other. The first surface 1801 and the second surface 1802 each may be disposed on a plane perpendicular to the axial direction.

The connection member 1800 may include a third hole 1820 and a sixth hole 1810. The sixth hole 1810 is a hole penetrated by the shaft 1100. An inner diameter of the sixth hole 1810 is disposed larger than an outer diameter of the shaft 1100. The sixth hole 1810 is disposed at the center of the connection member 1800. The third hole 1820 is a part where a fastening member 11 is fastened. The third hole 1820 is disposed by penetrating the first surface 1801 and the second surface 1802. A screw tab may be formed on an inner surface of the third hole 1820. A plurality of third holes 1820 may be disposed. The plurality of third holes 1820 may be disposed at the same interval along the circumferential direction of the connection member 1800.

The connection member 1800 may include a protrusion 1830. The protrusion 1830 protrudes from the second surface 1802. The protrusion 1830 may be an annular member. The protrusion 1830 is a part that is press-fitted into a first hole 1213*a* of the yoke 1210. A portion of the protrusion 1830 may be disposed to be overlapped with the third hole 1820. This takes into account the positions of a first hole 1213*a* and a second hole 1213*b* of the yoke 1210.

Figure 15:
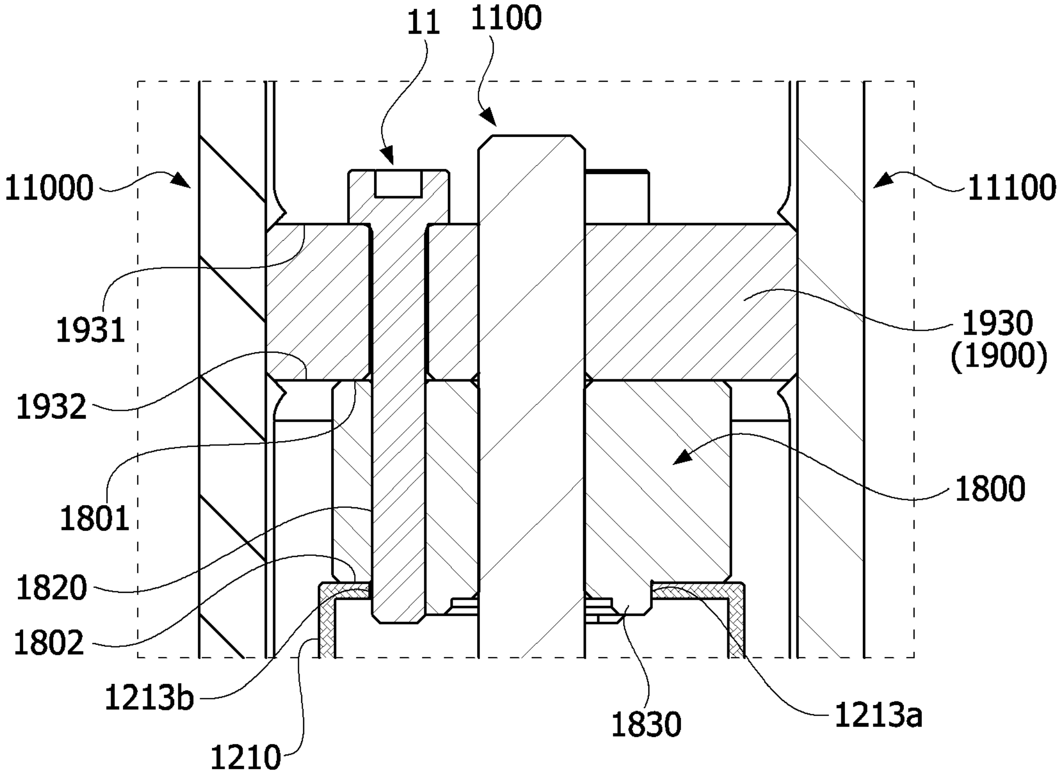
FIG. 15 is an enlarged side view illustrating a part A in FIG. 11.

FIG. 15 is an enlarged side view of a part A in FIG. 11.

Referring to FIG. 15, the first surface 1801 of the connection member 1800 is in contact with a lower surface of a third member 1930 of the holder 1900. The second surface 1802 of the connection member 1800 is in contact with the upper surface of the yoke 1210. The connection member 1800 is disposed between the yoke 1210 and the third member 1930 of the holder 1900 based on the axial direction.

The fastening member 11 penetrates the third member 1930 of the holder 1900 and is fastened to the third hole 1820 of the connection member 1800. As the fastening member 11 is rotatably fastened to the third hole 1820, the holder 1900 and the connection member 1800 are coupled to each other.

The protrusion 1830 of the connection member 1800 may be press-fitted into the first hole 1213*a* of the yoke 1210. As the protrusion 1830 is press-fitted into the first hole 1213*a*, the connection member 1800 and the yoke 1210 are coupled to each other. As a result, the holder 1900 and the yoke 1210 are coupled via the connection member 1800. Since the holder 1900 is coupled to the yoke 1210 via the connection member 1800, which is a single component, this facilitates assembly.

The fastening member 11 is disposed to penetrate the connection member 1800 and the third member 1930 of the holder 1900. In addition, an end of the fastening member 11 may be disposed to penetrate the second hole 1213*b* of the yoke 1210. In this case, the end of the fastening member 11 may be disposed such that a portion of the fastening member 11 overlaps the second hole 1213*b* in the radial direction. Accordingly, the connection member 1800 and the rotor 1200 are restrained to each other by the end of the fastening member 11 in a rotation direction, thereby preventing slip from occurring between the connection member 1800 and the rotor 1200.

Figure 16:
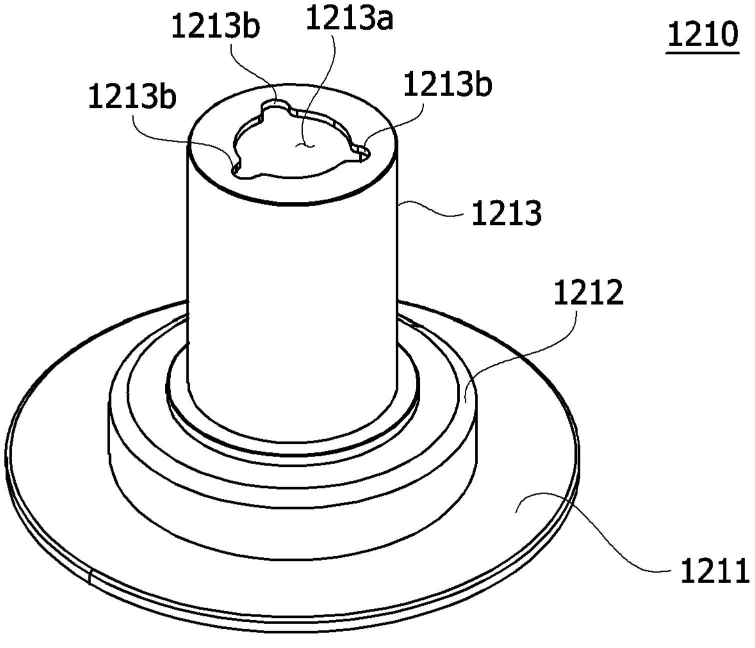
FIG. 16 is a view illustrating the yoke.

FIG. 16 is a view illustrating the yoke 1210.

Referring to FIG. 16, the yoke 1210 may include a base 1211, a magnet receiving part 1212, and a pillar part 1213. The yoke 1210 may be a cylindrical member in which one side and the other side thereof are opened as a whole. The magnet receiving part 1212 may protrude from the base 1211. The pillar part 1213 may protrude from the magnet receiving part 1212. The base 1211, the magnet receiving part 1212 and the pillar part 1213 may have different inner diameters. The inner diameter of the base 1211 may be larger than the inner diameter of the magnet receiving part 1212. The inner diameter of the magnet receiving part 1212 may be larger than the inner diameter of the pillar part 1213.

The sensing magnet 1230 is disposed in an inner side of the base 1211. The drive magnet 1220 is disposed in an inner side of the magnet receiving part 1212. A portion of the bearing housing 1500 may be disposed in an inner side of the pillar part 1213. One end surface of the pillar part 1213 is in contact with one end surface of the connection member 1800 in the axial direction. The first hole 1213*a* penetrated by the shaft 1100 may be disposed on one surface of the pillar part 1213. The protrusion 1830 of the connection member 1800 is press-fitted into the first hole 1213*a*.

The pillar part 1213 may be disposed to be overlapped with the holder 1900 in the radial direction. The pillar part 1213 may be disposed to be overlapped with the first mirror 11000 and the second mirror 11100 in the radial direction. The shape of the yoke 1210 takes into account characteristics of the shaft 1100, the first mirror 1000, and the second mirror 11100 which are elongated in the axial direction.

The yoke 1210 may include the second hole 1213*b*. The end of the fastening member 11 is disposed in the second hole 1213*b*. Since the end of the fastening member 11 is disposed penetrating the second hole 1213*b*, the yoke 1210 and the connection member 1800 are restrained to each other in the rotation direction. A plurality of second holes 1213*b* may be disposed. The number of second holes 1213*b* may correspond to the number of fastening members 11. The second hole 1213*b* may be concavely formed in the radial direction at an edge of the first hole 1213*a*.

Figure 17:
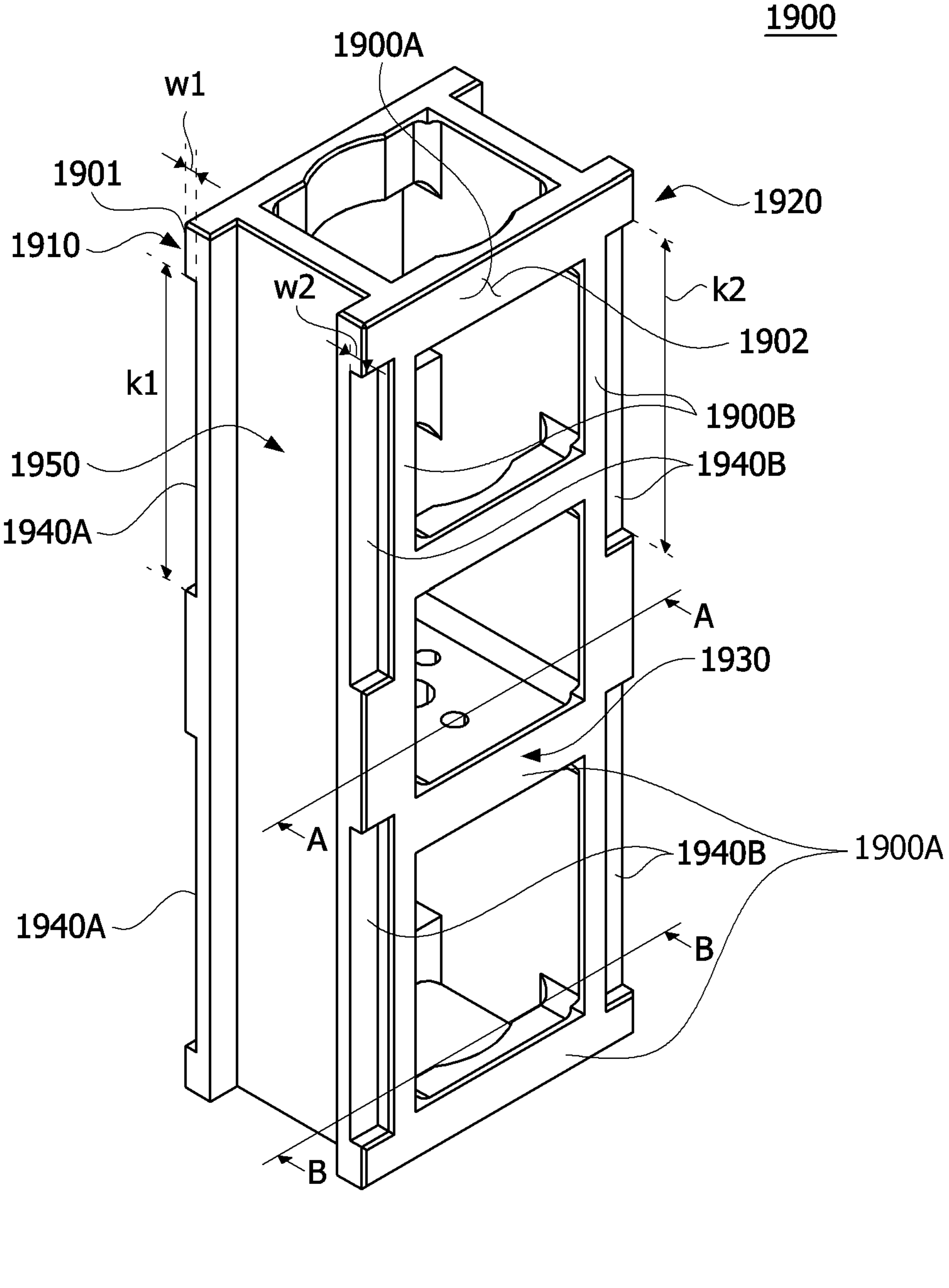
FIG. 17 is a view illustrating a holder.

FIG. 17 is a view illustrating the holder 1900.

Referring to FIG. 17, the holder 1900 may include a first member 1910, a second member 1920, a third member 1930, and a sidewall 1950. The first member 1910 is coupled to the first mirror 11000. The second member 1920 is coupled to the second mirror 11100. The third member 1930 connects the first member 1910 and the second member 1920. The sidewall 1950 may be disposed between the first member 1910 and the second member 1920. The first member 1910 may include a third surface 1901 in contact with the first mirror 11000. The second member 1920 may include a fourth surface 1902 in contact with the second mirror 11100. The third surface 1901 and the fourth surface 1902 may be disposed to face each other. In addition, the third surface 1901 and the fourth surface 1902 may be elongated along the axial direction.

Due to the hollow space in an inner side of the holder 1900, the first surface 1801 may be divided into a horizontal region 1900A and a vertical region 1900B in contact with a partial region of the first mirror 11000. The second surface 1802 may also be divided into the horizontal region 1900A and the vertical region 1900B in contact with a partial region of the second mirror 11100.

The holder 1900 may include a first groove 1940A and a second groove 1940B to which an adhesive is applied. The first groove 1940A is concavely formed on the third surface 1901. The first groove 1940A may have an axial length kl greater than a width direction length w1. The first groove 1940A may be disposed in the vertical region 1900B of the first surface 1801. The second groove 1940B is concavely formed on the fourth surface 1902. The second groove 1940B may have the axial length kl greater than the width direction length w1. The second groove 1940B may be disposed in the vertical region 1900B of the second surface 1802.

The first mirror 11000 and the second mirror 11100 have a rectangular structure with a relatively long axial length in consideration of a scan range. Accordingly, when the first groove 1940A and the second groove 1940B to which the adhesive is applied are elongated in the axial direction, there is an advantage of increasing the coupling force between the first mirror 11000 and the second mirror 11100 and the holder 1900, and there is also an advantage of easily applying the adhesive to the holder 1900 and easily curing the adhesive.

The holder 1900 may be manufactured by die casting using aluminum which may reduce weight relatively.

Figure 18:
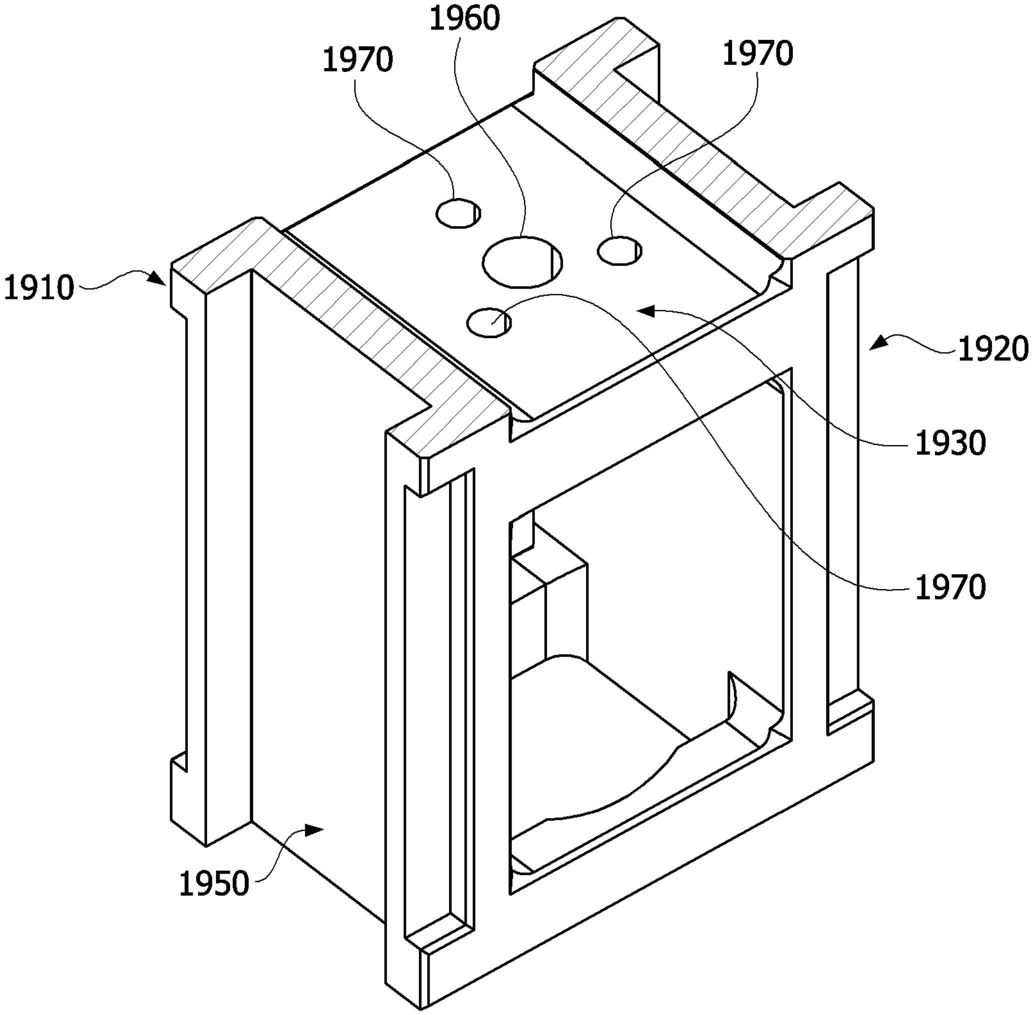
FIG. 18 is a cross-sectional view of the holder taken along line A-A in FIG. 17.

FIG. 18 is a cross-sectional view of the holder taken along line A-A in FIG. 17.

Referring to FIG. 18, the third member 1930 of the holder 1900 is disposed in a direction perpendicular to the axial direction and connects the first member 1910 and the second member 1920. The third member 1930 may include a fourth hole 1960 and a fifth hole 1970. The fourth hole 1960 is a part penetrated by the shaft 1100, and an inner diameter of the fourth hole 1960 is set to be larger than an outer diameter of the shaft 1100. The shaft 1100 may penetrate the fourth hole 1960, and an end portion of the shaft 1100 may protrude above an upper surface of the third member 1930.

The fifth hole 1970 is a part penetrated by the fastening member 11, and an inner diameter of the fifth hole 1970 is set to be larger than the outer diameter of the shaft 1100. In a state where the fastening member 11 penetrates the fifth hole 1970 and is fastened to the connection member 1800, a head of the fastening member 11 may be in contact with the upper surface of the third member 1930. The second hole 1213*b*, the third hole 1820, and the fifth hole 1970 may be disposed to correspond to each other in the axial direction. The end of the fastening member 11 that penetrates the fifth hole 1970 and the third hole 1820 are disposed in the second hole 1213*b*.

Figure 19:
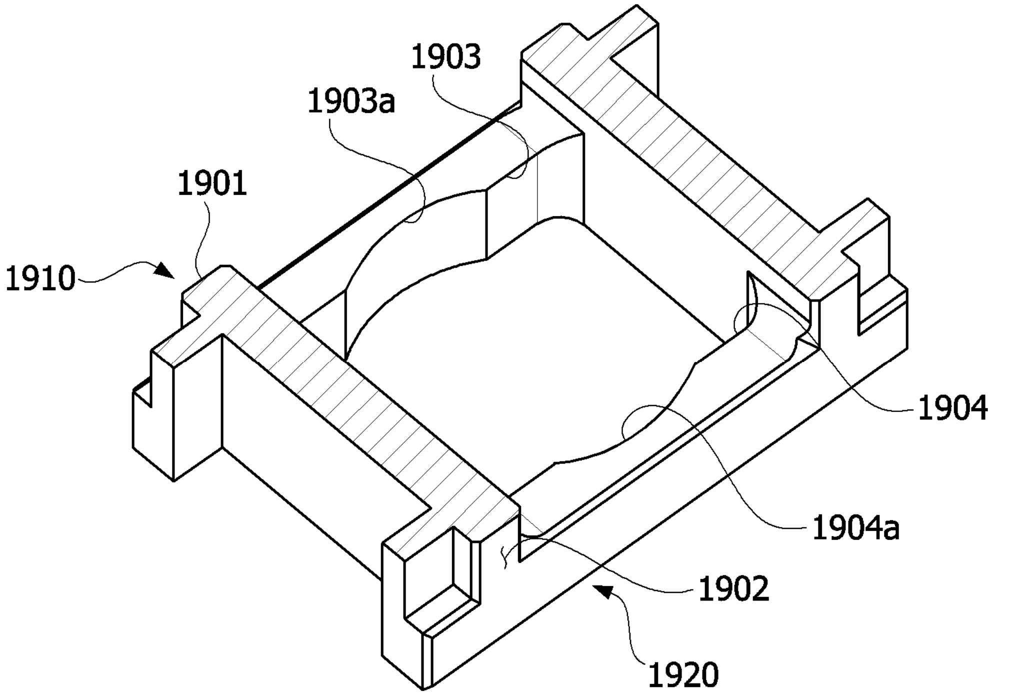
FIG. 19 is a cross-sectional view of the holder taken along line B-B in FIG. 17.

FIG. 19 is a cross-sectional view of the holder 1900 taken along line B-B in FIG. 17.

Referring to FIG. 19, the first member 1910 may include a fifth surface 1903 disposed to face the third surface 1901. A third groove 1903*a* may be disposed on the fifth surface 1903. The third groove 1903*a* may be concavely formed on the fifth surface 1903 towards the third surface 1901 and may be formed as a curved surface. The second member 1920 may include a sixth surface 1904 disposed to face the fourth surface 1902. A fourth groove 1904*a* may be disposed on the sixth surface 1904. The fourth groove 1904*a* may be concavely formed on the sixth surface 1904 towards the fourth surface 1902 and may be formed as a curved surface.

A portion of the yoke 1210 may be disposed in the third groove 1903*a*. In addition, another portion of the yoke 1210 may be disposed in the fourth groove 1904*a*. Due to the third groove 1903*a* and the fourth groove 1904*a*, there is an advantage of reducing the size of the holder 1900 while ensuring the size of the yoke 1210.

Figure 20:
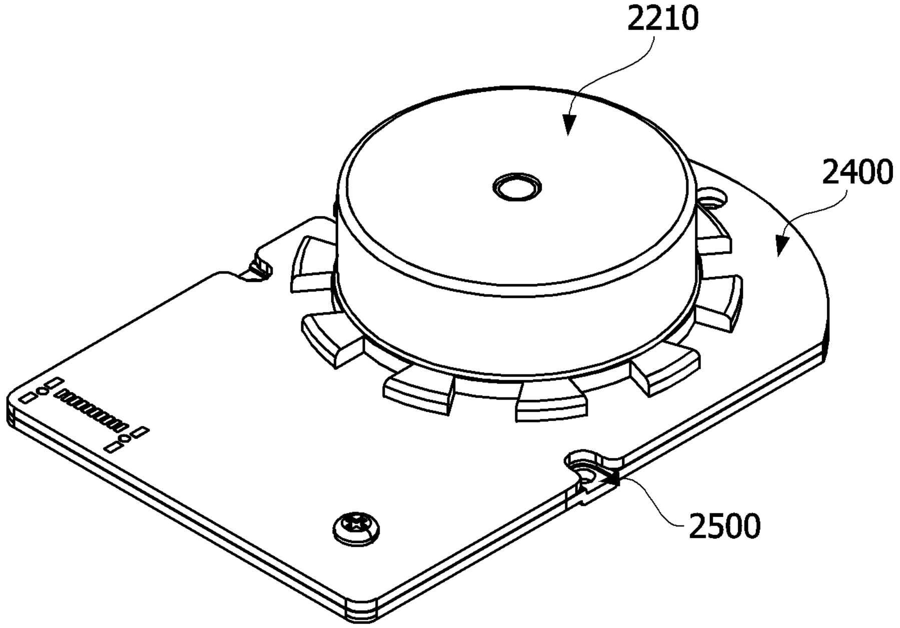
FIG. 20 is a perspective view illustrating a motor according to one embodiment.
Figure 21:
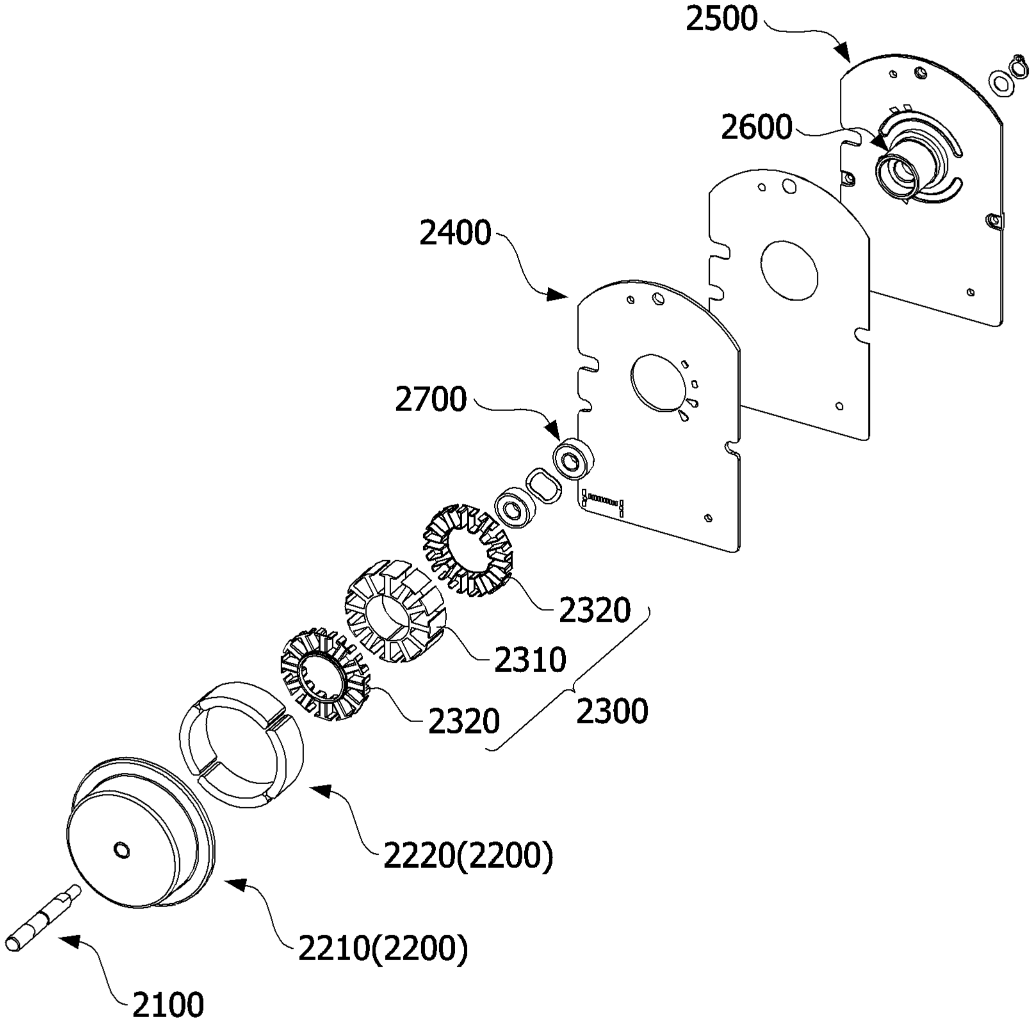
FIG. 21 is an exploded perspective view of the motor illustrated in FIG. 210.
Figure 22:
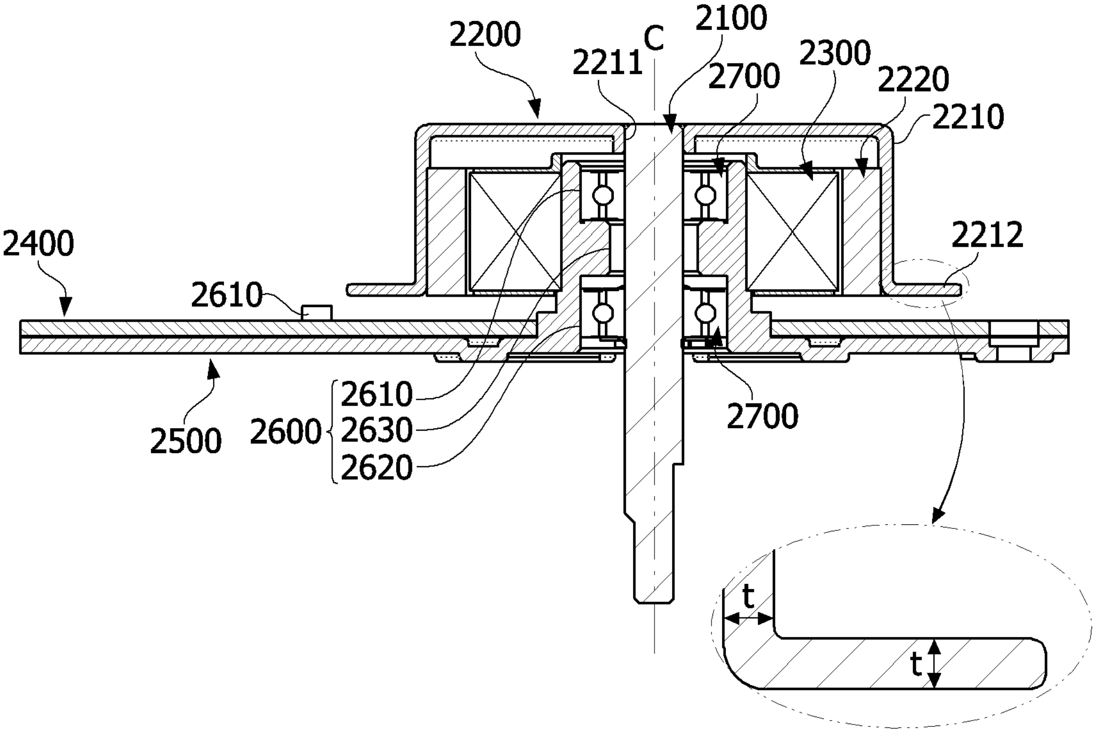
FIG. 22 is a side sectional view of the motor illustrated in FIG. 210.

FIG. 20 is a perspective view illustrating the motor according to one embodiment, FIG. 21 is an exploded perspective view of the motor illustrated in FIG. 21, and FIG. 22 is a side sectional view of the motor illustrated in FIG. 21. Hereinafter, an inner side is a direction facing the shaft 100 based on the radial direction of the motor, and an outer side is a direction opposite to the inner side.

Referring to FIGS. 20 to 22, the motor according to embodiments may include a shaft 2100, a rotor 2200, a stator 2300, a substrate 2400, a base 2500, a bearing housing 2600, and a bearing 2700.

The shaft 2100 rotates with the rotor 2200. A head of the shaft 2100 may be connected to a sensor device that acquires distance information.

The rotor 2200 may include a yoke 2210 and a magnet 2220.

The yoke 2210 is disposed in an outer side of the stator 2300. Furthermore, the yoke 2210 is coupled to the shaft 2100. The shaft 2100 is disposed at the center of the yoke 2210. The shaft 2100 is rotated along with the rotation of the yoke 2210.

The magnet 2220 may be disposed in the yoke 2210. The magnet 2220 is meant to drive the yoke 2210. The yoke 2210 rotates via electromagnetic interaction between the magnet 2220 and the coil wound around the stator 2300. The magnet 2220 may be one annular member. Alternatively, the magnet 2220 may be a combination of a plurality of divided magnets.

The stator 2300 is disposed in an outer side of the shaft 2100. The stator 2300 includes a stator core 2310. The stator core 2310 includes a plurality of teeth. The coil winds up in the teeth. The stator 2300 may include an insulator 2320. The insulator 2320 is coupled to the stator core 2310.

The substrate 2400 is disposed on one side of the yoke 2210. The substrate 2400 may include a sensor 2410 (in FIG. 25) and a coil 2420 (in FIG. 25). The sensor 2410 may be an inductive encoder. An air gap is formed between the substrate 2400 and the yoke 2210 in the axial direction. The coil 2420 may be a pattern coil.

The base 2500 is disposed on one side of the substrate 2400. For example, the substrate 2400 may be disposed on an upper surface of the base 2500. An adhesive film for coupling the base 2500 to the substrate 2400 may be disposed between the base 2500 and the substrate 2400.

A bearing housing 2600 includes the bearing 2700 inside. The bearing 2700 rotatably supports the shaft 2100. Two bearings 2700 may be disposed on an upper part and a lower part the bearing housing 2600, respectively. The bearing housing 2600 may be coupled to the base 2500. Alternatively, the bearing housing 2600 and the base 2500 may be integrated with each other.

The bearing housing 2600 may include a first receiving part 2610 and a second receiving part 2620 therein. The bearing 2700 is disposed in the first receiving part 2610. The bearing 2700 is also disposed in the second receiving part 2620. A partition 2630 may be disposed between the first receiving part 2610 and the second receiving part 2620. The partition 2630 protrudes from the inside of the bearing housing 2600 to separate the first receiving part 2610 and the second receiving part 2620, and supports an outer ring of the bearing 2700 in the axial direction.

Meanwhile, the bearing housing 2600 is fixed to the base 2500, and the bearing housing 2600 is coupled to the center of a stator core 2310 of the stator 2300.

Figure 23:
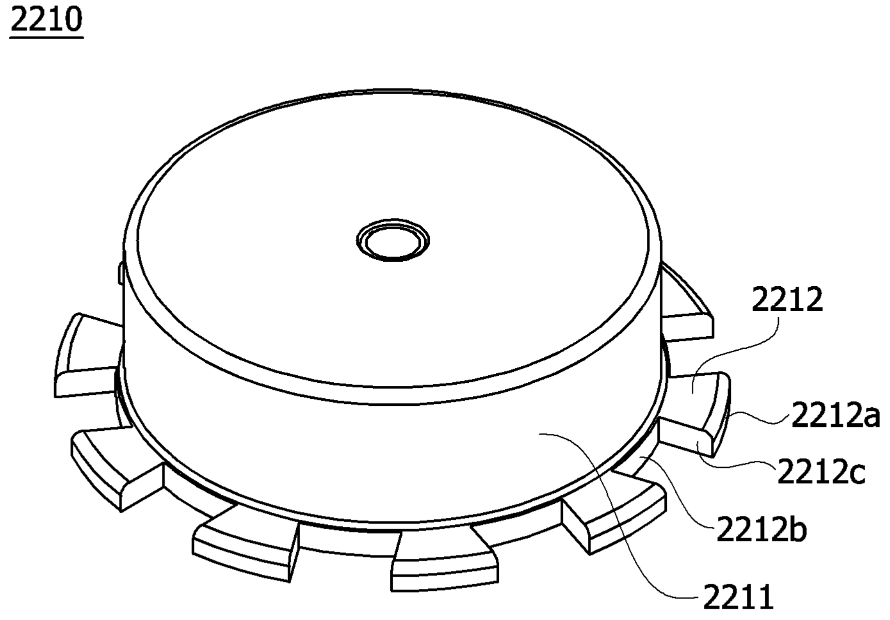
FIG. 23 is a view illustrating the yoke of the motor illustrated in FIG. 210.

FIG. 23 is a view illustrating the yoke 2210 of the motor illustrated in FIG. 20.

Referring to FIGS. 22 and 23, the yoke 2210 includes a cylindrical body 2211 and a flange 2212. One side of the body 2211 is blocked by an upper surface, and the other side of the body 2211 is open. The flange 2212 has a shape horizontally extending outwards from one end of the body 2211. The shaft 2100 is coupled to an upper surface of the body 2211, and the shaft 2100 and the yoke 2210 are integrally rotated. A hole is disposed at the center of the upper surface of the body 2211. An end of the shaft 2100 may be press-fitted and coupled to the hole.

The magnet 2220 is coupled to an inner circumferential surface of the body 2211. Meanwhile, a thickness t of the body 2211 may be the same as a thickness t of the flange 2212.

The flange 2212 includes a first edge **2212*a*, a second edge 2212*b*, and a third edge 2212*c*. The first edge 2212*a* and the second edge 2212*b* are alternately disposed along a circumferential direction of the yoke 2210. In the radial direction of the yoke 2210, the second edge 2212*b* is disposed closer to the body 2211 than the first edge 2212*a*. The third edge 2212*c* connects the first edge 2212*a* and the second edge 2212*b*. As the first edge 2212*a* and the second edge 2212*b* are alternately disposed in the circumferential direction of the yoke 2210, the flange 2212 may have a shape with a plurality of blades protruding from the body 2211**.

The flange 2212 interacts with the coil 2420 disposed on the substrate 2400 to generate an induced electromotive force. Since the shape of the flange 2212 changes along the circumferential direction of the yoke 2210, the deviation of the induced electromotive force intermittently appears, and the sensor 2410 senses this phenomenon and uses the same to recognize one rotation of the rotor 2200.

Meanwhile, the flange 2212 may be disposed to be overlapped with the magnet 2220 in the radial direction of the yoke 2210. In addition, the flange 2212 may be disposed to be overlapped with the bearing housing 2600 in the radial direction of the yoke 2210.

Figure 24:
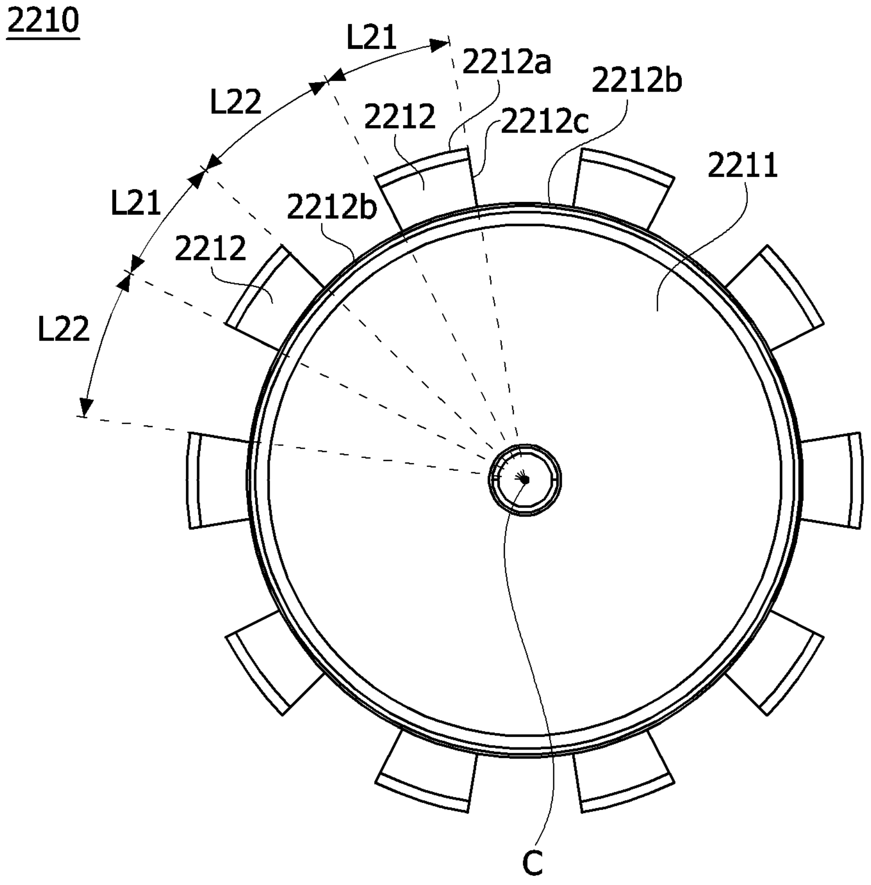
FIG. 24 is a top plan view of the yoke illustrated in FIG. 23.

FIG. 24 is a top plan view of the yoke 2210 illustrated in FIG. 23.

Referring to FIGS. 22 to 24, the first edge **2212*a* and the second edge 2212*b* may be curved surfaces that regard the center C of the yoke 2210 as a center of curvature. In addition, the second edge 2212*b* may be disposed on an outer circumferential surface of the body 2211. The third edge 2212*c* may be a plane disposed in the radial direction of the yoke 2210**.

As described above, although the shape of the flange 2212 of the yoke 2210 is illustrated, the present invention is not limited thereto, and the second edge **2212*b* may be disposed to protrude rather than the outer circumferential surface of the body 2211. In addition, as the first edge 2212*a* and the second edge 2212*b* are alternately repeated, the shape of the flange 2212 is a shape where square teeth are repeated, but the present invention is not limited thereto, and the flange 2212 may be implemented with a flange where protruding structures with various shapes are repeated. For example, the first edge 2212*a* and the second edge 2212*b* may be not curved surfaces but planes, while the third edge 2212*c* may be disposed to be inclined more than the radial direction of the yoke 2210**.

Meanwhile, a plurality of first edges **2212*a* may have the same circumferential length L12. A plurality of second edges 2212*b* may have the same circumferential length L22 as well. In addition, the plurality of first edges 2212*a* may be disposed on one circular orbit on the basis of the center C of the yoke 2210. The plurality of second edges 2212*b* may also be disposed on one circular orbit on the basis of the center C of the yoke 2210**.

The number of the first edge **2212*a* and the second edge 2212*b* may be variously controlled to correspond to the resolution of the sensor 2410**.

Figure 25:
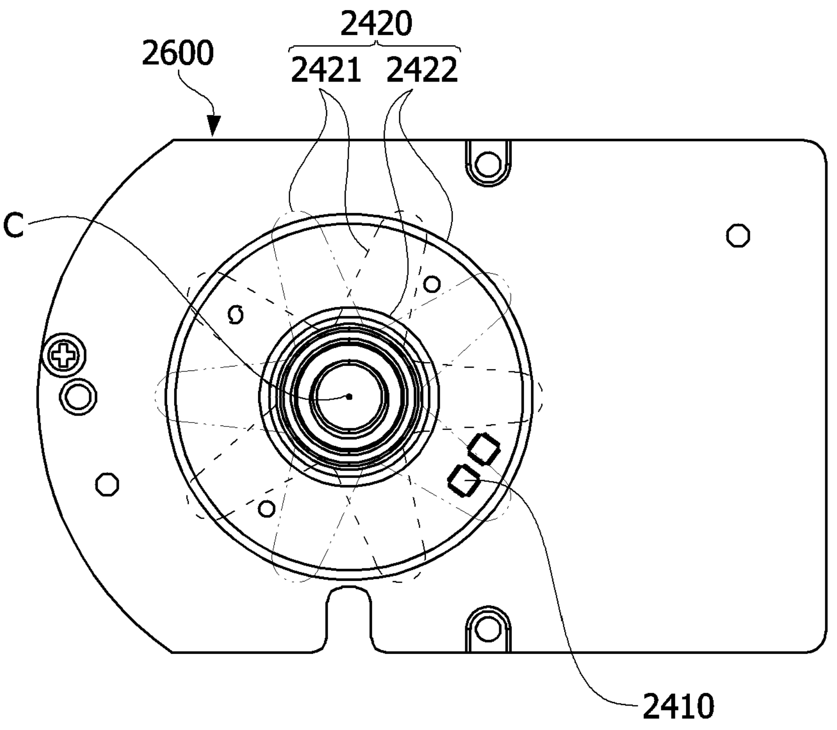
FIG. 25 is a view illustrating a substrate.

FIG. 25 is a view illustrating the substrate 2400.

Referring to FIGS. 22 and 25, the sensor 2410 and the coil 2420 are disposed in the substrate 2400. The sensor 2410 is electrically connected to the coil 2420 to measure changes in the induced electromotive force according to the rotation of the substrate 2400. The coil 2420 may be a combination of a first coil 2421 and a second coil 2422 having different shapes and sizes. For example, the first coil 2421 may be radial, and the second coil 2422 may be annular. The first coil 2421 and the second coil 2422 are independently separated from each other, and may be disposed on different layers of the substrate 2400.

The substrate 2400 may have a circular plate shape, and the coil 2420 may be disposed to be symmetrical on the basis of the center of the substrate 2400. For example, the coil 2420 may be disposed to be rotationally symmetrical on the basis of the center of the substrate 2400.

Figure 26:
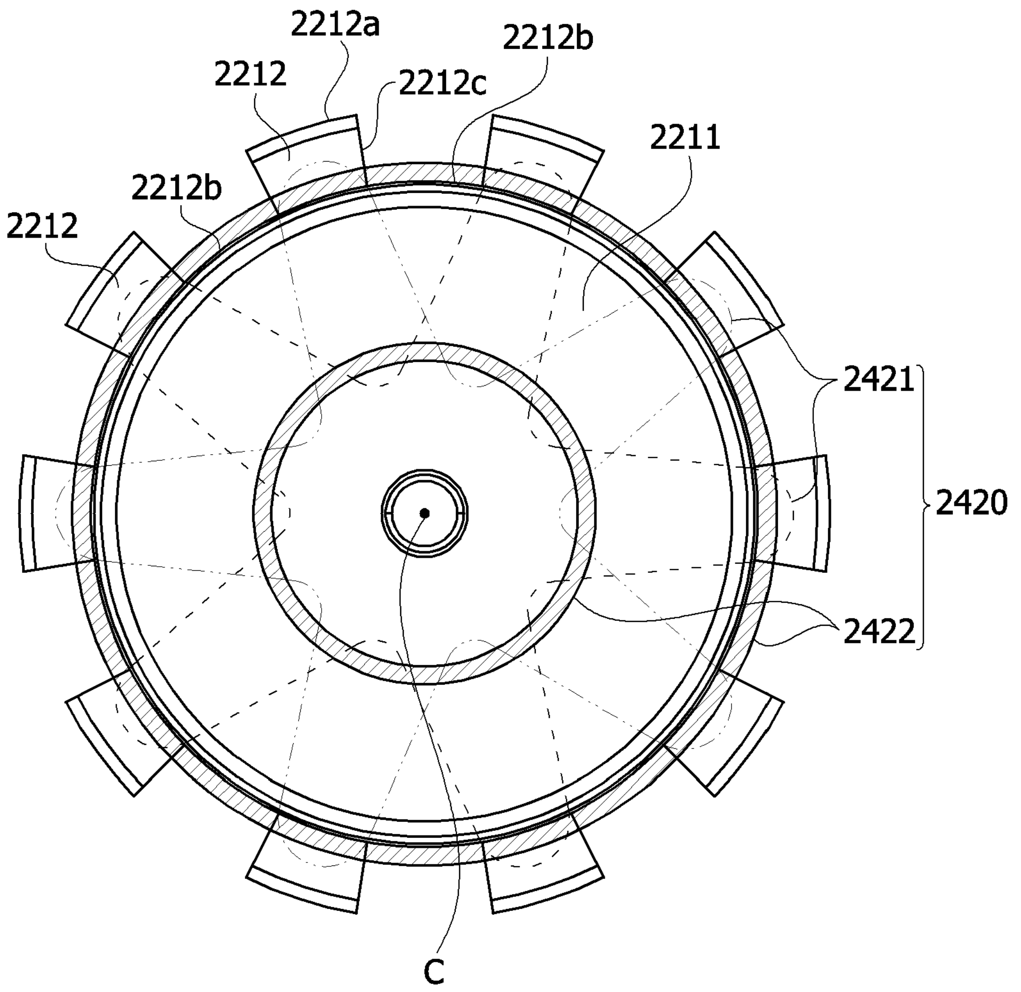
FIG. 26 is a view where a coil and a flange are viewed in an axial direction.

FIG. 26 is a view where the coil and the flange are viewed in the axial direction.

Referring to FIGS. 22 and 26, the coil 2420 is disposed to face the flange 2212. A portion of the coil 2420 may be disposed between the first edge 2212*a* and the second edge 2212*b* of the flange 2212 based on the radial direction of the yoke 2210. In that case, the first edge 2212*a* may be disposed in an outer side of the coil 2420.

When the rotor 2300 rotates by electrical interaction between a coil wound around the stator core 2310 and the magnet 2220, magnetic induction occurs between the coil 2420 and the flange 2212 of the yoke 2210 by the shape of the flange 2212 of the rotor 2200, and the sensor 2410 senses a change in the magnetic induction. In this way, in sensing the position of the rotor 2200, the configuration of the motor may be greatly simplified by utilizing the flange 2212 as a portion of the yoke 2210 and the coil 2420.

In particular, since the sensing magnet is not used, an advantage here is that there is no magnetic field interference with the drive magnet. In addition, an advantage here is that the electromotive force generated by the coil 2420 of the substrate 2400 can greatly reduce interference of external magnetic field.

Figure 27:
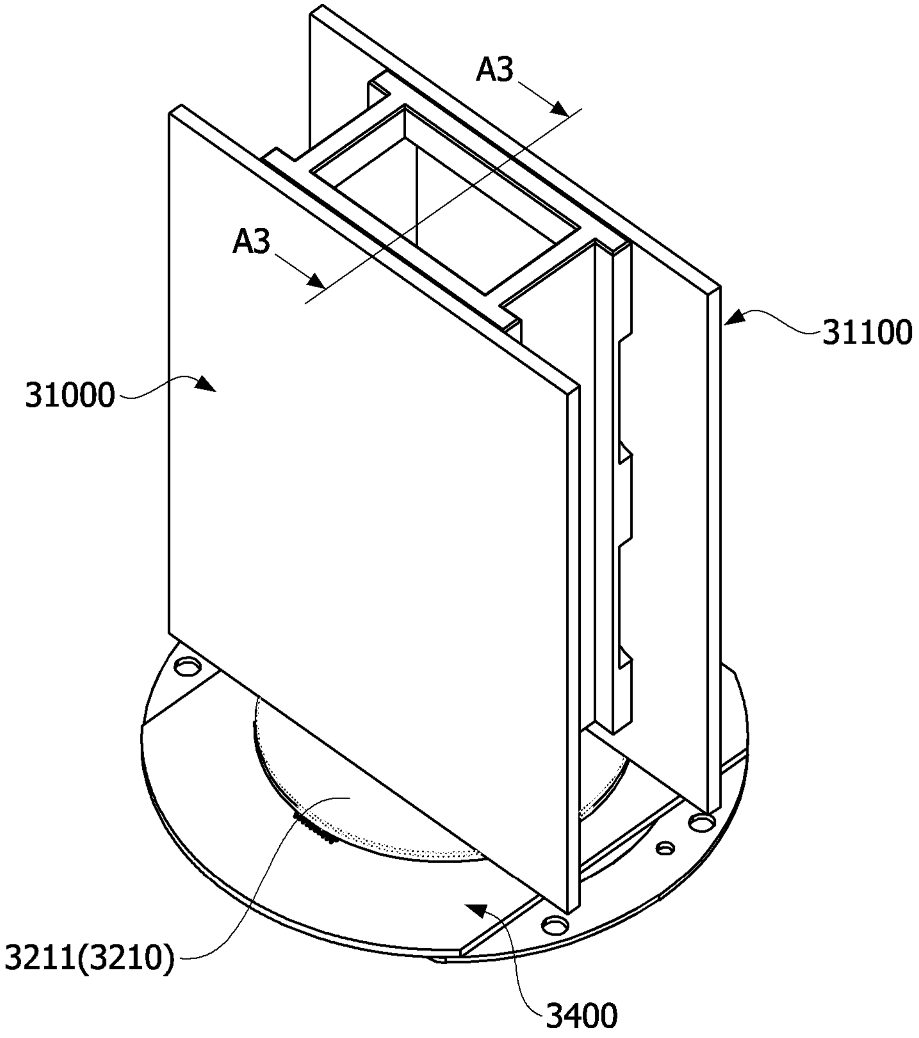
FIG. 27 is a perspective view illustrating a motor according to one embodiment.
Figure 28:
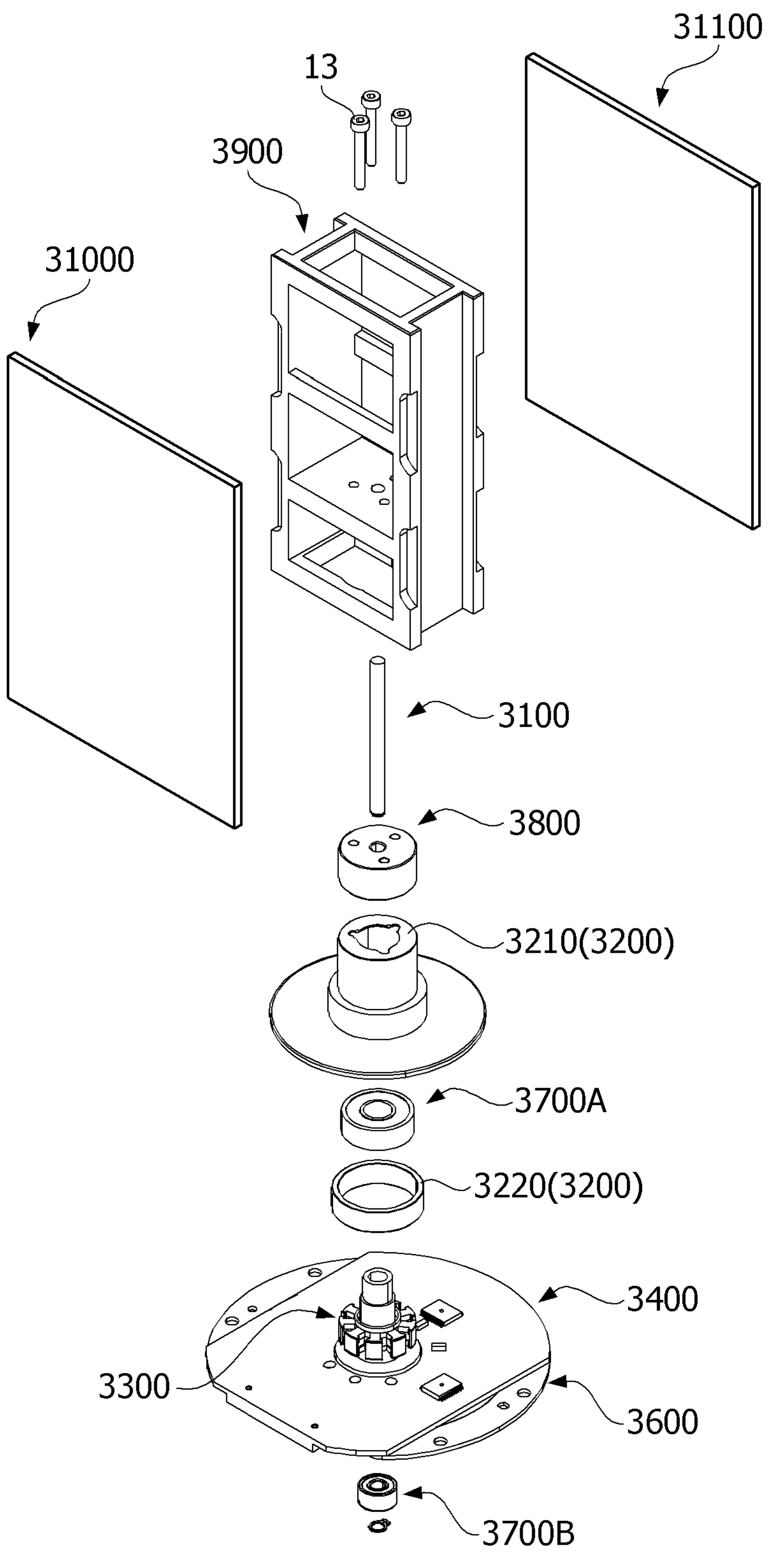
FIG. 28 is an exploded perspective view of the motor illustrated in FIG. 27.
Figure 29:
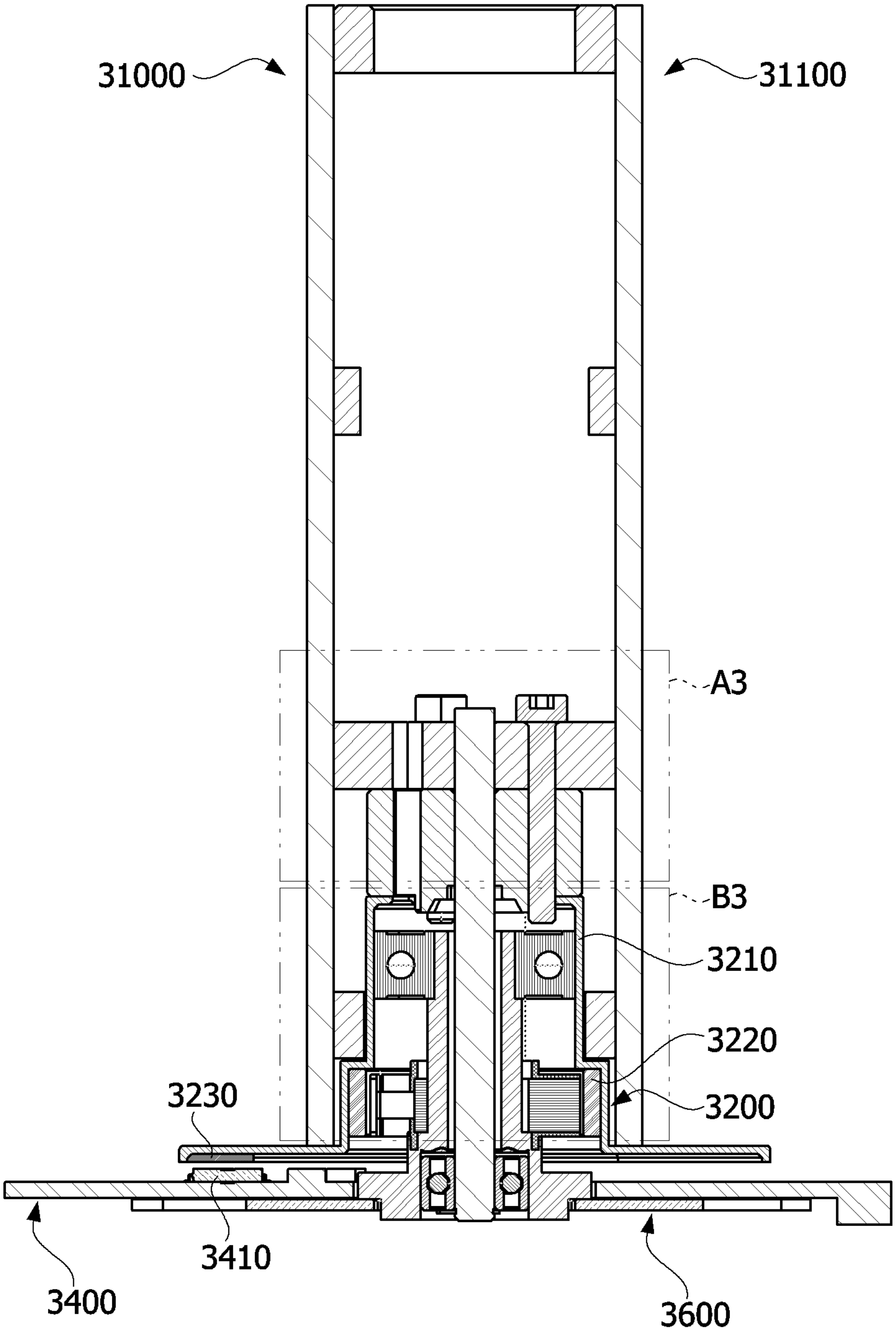
FIG. 29 is a side sectional view of the motor taken along line A3-A3 in FIG. 27.

FIG. 27 is a perspective view illustrating the motor according to one embodiment, FIG. 28 is an exploded perspective view of the motor illustrated in FIG. 27, and FIG. 29 is a side sectional view of the motor taken along line A3-A3 in FIG. 27. Hereinafter, an inner side is a direction facing a shaft 3100 based on the radial direction of the motor, and an outer side is a direction opposite to the inner side.

Referring to FIGS. 27 to 29, the motor according to embodiments may include the shaft 3100, a rotor 3200, and a stator 3300.

The shaft 3100 is coupled to a yoke 3210 of the rotor 3200. The shaft 3100 may be press-fitted and coupled to the yoke 3210. Alternatively, the shaft 3100 may be integrated with the yoke 3210. The shaft 3100 rotates with the rotor 3200. The shaft 3100 is rotatably supported by a bearing 3700 disposed in an inner side of a bearing housing 3500.

The rotor 3200 may include the yoke 3210, a drive magnet 3220, and a sensing magnet 3230.

The yoke 3210 is coupled to the shaft 3100. The shaft 3100 may be disposed at the center of the yoke 3210.

The drive magnet 3220 is meant to rotate the yoke 3210. The drive magnet 3220 may be disposed on an inner surface of the yoke 3210. The drive magnet 3220 may be disposed to face the stator 3300 in the radial direction of the rotor 3200. When an electrical interaction occurs between the drive magnet 3220 and a coil of the stator 3300, the yoke 3210 rotates. The drive magnet 3220 may be a combination of a plurality of unit magnets. Alternatively, the drive magnet 3220 may be a single component with a ring shape.

The sensing magnet 3230 is meant to precisely recognize a position of the rotor 3200. The sensing magnet 3230 may be disposed on the inner surface of the yoke 3210. In addition, the sensing magnet 3230 may be disposed to face the substrate 3400 in an axial direction.

The stator 3300 may be disposed between the shaft 3100 and the yoke 3210. The stator 3300 may be fixed to an outer surface of the bearing housing 3500. The stator 3300 includes a core of the stator including a plurality of teeth, and the coil may be wound around each tooth. The teeth may include an insulator configured to insulate the coil and the core of stator.

The substrate 3400 is disposed on one side of the yoke 3210. The substrate 3400 may include a sensor 3410. The sensor 3410 may be a Hall IC or an encoder IC that senses a change in a magnetic flux of the sensing magnet 3230. The sensor 3410 may be disposed to face the drive magnet 3220 or the sensing magnet 3230 in the axial direction.

The bearing housing 3500 is a member that fixes a first bearing 3700A and a second bearing 3700B to form an axial system. The bearing housing 3500 may include a region such as a cylindrical member elongated along the axial direction.

A bearing housing 3500 is fixed to a plate 3600. Although the plate 3600 and the bearing housing 3500 are illustrated separately, the plate 3600 and the bearing housing 3500 may be integrated with each other. The substrate 3400 may be mounted on one surface of the plate 3600.

The first bearing 3700A may be disposed in an outer side of the bearing housing 3500. The first bearing 3700A rotatably supports the yoke 3210.

The second bearing 3700B may be disposed in an inner side of the bearing housing 3500. The second bearing 3700B rotatably supports the shaft 3100.

Each of the first bearing 3700A and the second bearing 3700B may be disposed not to be overlapped with the stator 3300 in the radial direction of the motor. For example, based on the axial direction, the first bearing 3700A may be disposed higher than the stator 3300, and the second bearing 3700B may be disposed lower than the stator 3300. In addition, the first bearing 3700A may be disposed higher than the drive magnet 3220 based on the axial direction.

A connection member 3800 is a member that couples the yoke 3210 to the holder 3900. The connection member 3800 is disposed between the yoke 3210 and the holder 3900 in the axial direction and couples the yoke 3210 to the holder 3900. When the yoke 3210 rotates, the connection member 3800 rotates, and the holder 3900 rotates together. The connection member 3800 may be a cylindrical member. One surface of the connection member 3800 may be in contact with the yoke 3210 in the axial direction, and the other surface of the connection member 3800 may be in contact with the holder 3900.

The holder 3900 fixes the mirrors 31000 and 31100. In addition, the holder 3900 is coupled to the connection member 3800 and rotates with the yoke 3210. The holder 3900 may be a member formed of a frame such that a cross section thereof is hollow inside. The holder 3900 having such a shape is resistant to bending and has the advantage of greatly reducing the weight. The first mirror 31000 and the second mirror 31100 may be disposed to face each other on one surface and the other surface of the holder 3900. The holder 3900 may be disposed to be overlapped with each of the first mirror 31000 and the second mirror 31100 in the radial direction.

The mirrors 31000 and 31100 serve to reflect a laser irradiated to an object to be sensed. The mirrors 31000 and 31100 may include the first mirror 31000 disposed on one surface of the holder 3900 and the second mirror 31100 disposed on the other surface of the holder 3900. When the yoke 3210 rotates, the holder 3900 rotates, and with the rotation of the holder 3900, the mirrors 31000 and 31100 rotate together. The mirrors 31000 and 31100 may be rectangular plate-shaped members which have a long axial length. The mirrors 31000 and 31100 and the holder 3900 may be coupled to each other via the adhesive.

Figure 30:
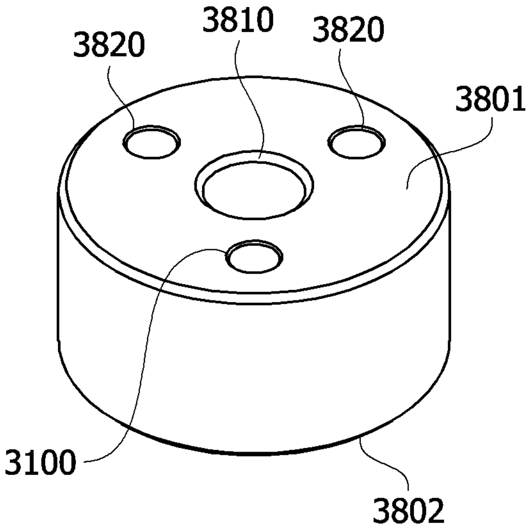
FIG. 30 is a perspective view illustrating the connection member.
Figure 31:
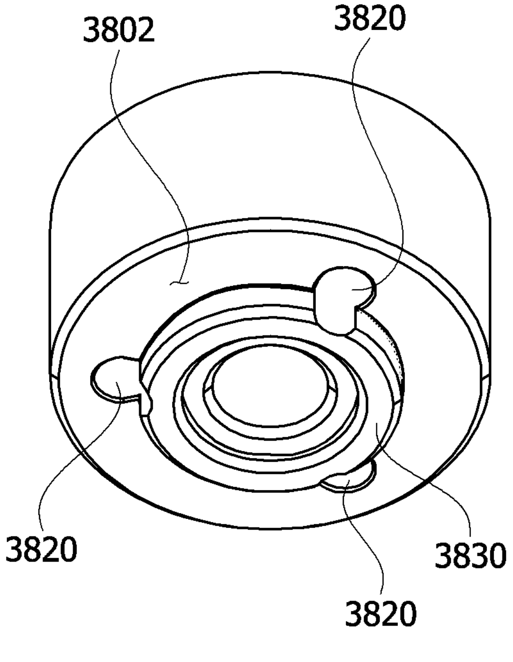
FIG. 31 is a bottom view of the connection member illustrated in FIG. 30.
Figure 32:
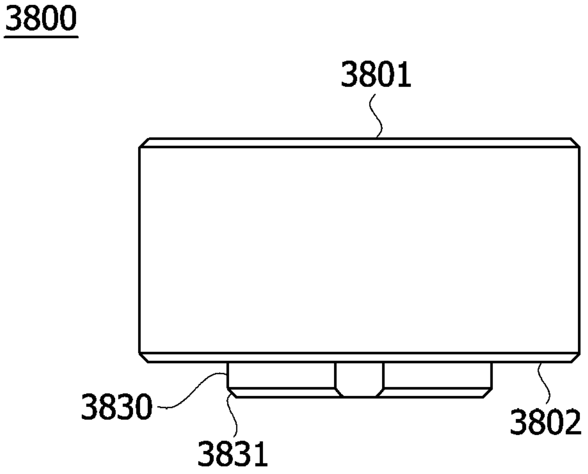
FIG. 32 is a side view of the connection member illustrated in FIG. 30.

FIG. 30 is a perspective view illustrating the connection member 3800, FIG. 31 is a bottom view of the connection member 3800 illustrated in FIG. 30, and FIG. 32 is a side view of the connection member 3800 illustrated in FIG. 30.

Referring to FIGS. 30 to 32, the connection member 3800 includes a first surface 3801 and a second surface 3802. The first surface 3801 may correspond to one surface of the cylindrical connection member 3800, and the second surface 3802 may correspond to the other surface of the cylindrical connection member 3800. The first surface 3801 and the second surface 3802 are disposed to face each other. Each of the first surface 3801 and the second surface 3802 may be disposed on a plane perpendicular to the axial direction.

The connection member 3800 may include a third hole 3820 and a sixth hole 3810. The sixth hole 3810 is a hole penetrated by the shaft 3100. An inner diameter of the sixth hole 3810 is disposed larger than an outer diameter of the shaft 3100. The sixth hole 3810 is disposed at the center of the connection member 3800. The third hole 3820 is a part where a fastening member 13 is fastened. The third hole 3820 is disposed by penetrating the first surface 3801 and the second surface 3802. A screw tab may be formed on an inner surface of the third hole 3820. A plurality of third holes 3820 may be disposed. The plurality of third holes 3820 may be disposed at the same interval along the circumferential direction of the connection member 3800.

The connection member 3800 may include a protrusion 3830. The protrusion 3830 protrudes from the second surface 3802. The protrusion 3830 may be an annular member. The protrusion 3830 is a part that is press-fitted into a first hole 3213*a* of the yoke 3210. A portion of the protrusion 3830 may be disposed to be overlapped with the third hole 3820. This takes into account the positions of a first hole 3213*a* and a second hole 3213*b* of the yoke 3210.

Figure 33:
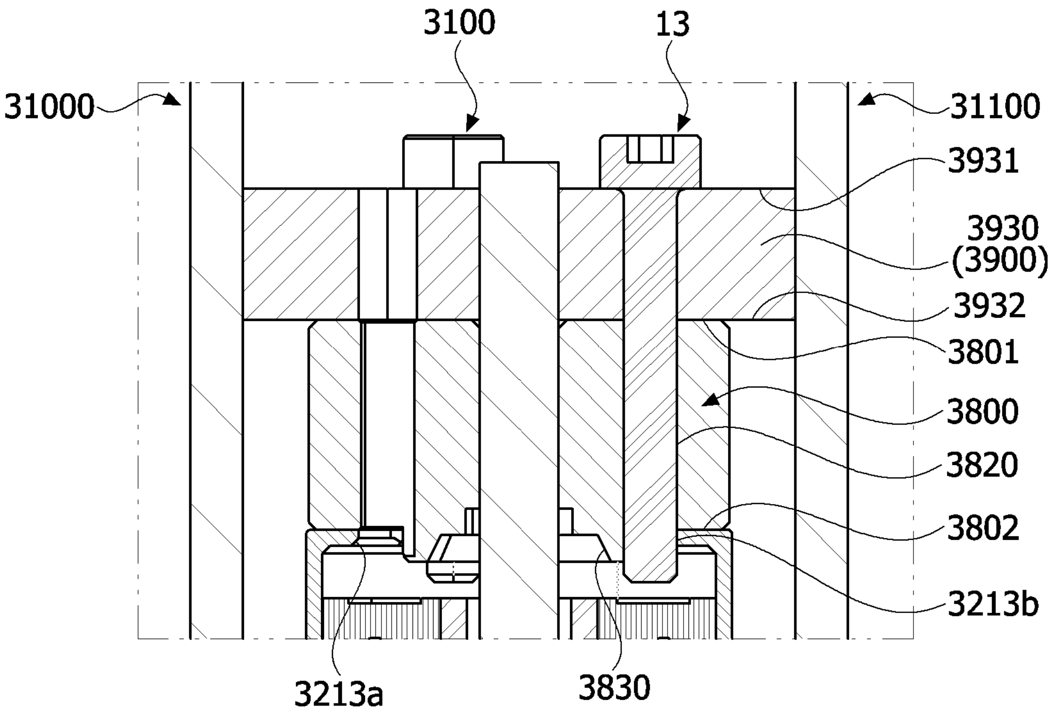
FIG. 33 is an enlarged side view of a part A3 in FIG. 29.

FIG. 33 is an enlarged side view of a part A3 in FIG. 29.

Referring to FIG. 33, the first surface 3801 of the connection member 3800 is in contact with a lower surface of a third member 3930 of the holder 3900. The second surface 3802 of the connection member 3800 is in contact with the upper surface of the yoke 3210. The connection member 3800 is disposed between the yoke 3210 and the third member 3930 of the holder 3900 based on the axial direction.

The fastening member 13 penetrates the third member 3930 of the holder 3900 and is fastened to the third hole 3820 of the connection member 3800. As the fastening member 13 is rotatably fastened to the third hole 3820, the holder 3900 and the connection member 3800 are coupled to each other.

The protrusion 3830 of the connection member 3800 may be press-fitted into the first hole 3213*a* of the yoke 3210. As the protrusion 3830 is press-fitted into the first hole 3213*a*, the connection member 3800 and the yoke 3210 are coupled to each other. As a result, the holder 3900 and the yoke 3210 are coupled via the connection member 3800. Since the holder 3900 is coupled to the yoke 3210 via the connection member 3800, which is a single component, this facilitates assembly.

The fastening member 13 is disposed to penetrate the connection member 3800 and the third member 3930 of the holder 3900. In addition, an end of the fastening member 13 may be disposed to penetrate the second hole 3213*b* of the yoke 3210. In that case, the end of the fastening member 13 may be disposed such that a portion of the fastening member 13 overlaps the second hole 3213*b* in the radial direction. Accordingly, the connection member 3800 and the rotor 3200 are restrained to each other by the end of the fastening member 13 in the rotation direction, thereby preventing slip from occurring between the connection member 3800 and the rotor 3200.

Figure 34:
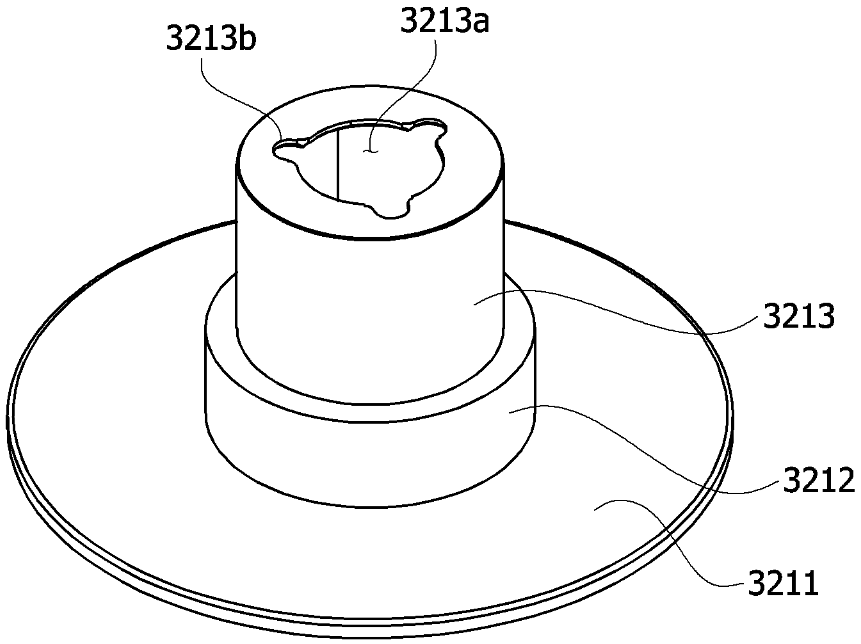
FIG. 34 is a view illustrating the yoke.

FIG. 34 is a view illustrating the yoke 3210.

Referring to FIG. 34, the yoke 3210 may include a base 3211, a magnet receiving part 3212 and a pillar part 3213. The yoke 3210 may be a cylindrical member in which one side and the other side thereof are opened as a whole. The magnet receiving part 3212 may protrude from the base 3211. The pillar part 3213 may protrude from the magnet receiving part 3212. The base 3211, the magnet receiving part 3212 and the pillar part 3213 may have different inner diameters. The inner diameter of the base 3211 may be larger than the inner diameter of the magnet receiving part 3212. The inner diameter of the magnet receiving part 3212 may be larger than the inner diameter of the pillar part 3213.

The sensing magnet 3230 is disposed in an inner side of the base 3211. The drive magnet 3220 is disposed in an inner side of the magnet receiving part 3212. A portion of the bearing housing 3500 may be disposed in an inner side of the pillar part 3213. One end surface of the pillar part 3213 is in contact with one end surface of the connection member 3800 in the axial direction. The first hole 3213*a* penetrated by the shaft 3100 may be disposed on one surface of the pillar part 3213. The protrusion 3830 of the connection member 3800 is press-fitted into the first hole 3213*a*.

The pillar part 3213 may be disposed to be overlapped with the holder 3900 in the radial direction. The pillar part 3213 may be disposed to be overlapped with the first mirror 31000 and the second mirror 31100 in the radial direction. The shape of the yoke 3210 takes into account the characteristics of the shaft 3100, the first mirror 31000, and the second mirror 31100 which are elongated in the axial direction.

The yoke 3210 may include the second hole 3213*b*. The end of the fastening member 13 is positioned in the second hole 3213*b*. Since the end of the fastening member 13 is disposed penetrating the second hole 3213*b*, the yoke 3210 and the connection member 3800 are restrained to each other in the rotational direction. A plurality of second holes 3213*b* may be disposed. The number of second holes 3213*b* may correspond to the number of fastening members 13. The second hole 3213*b* may be concavely formed in the radial direction at an edge of the first hole 3213*a*.

Figure 35:
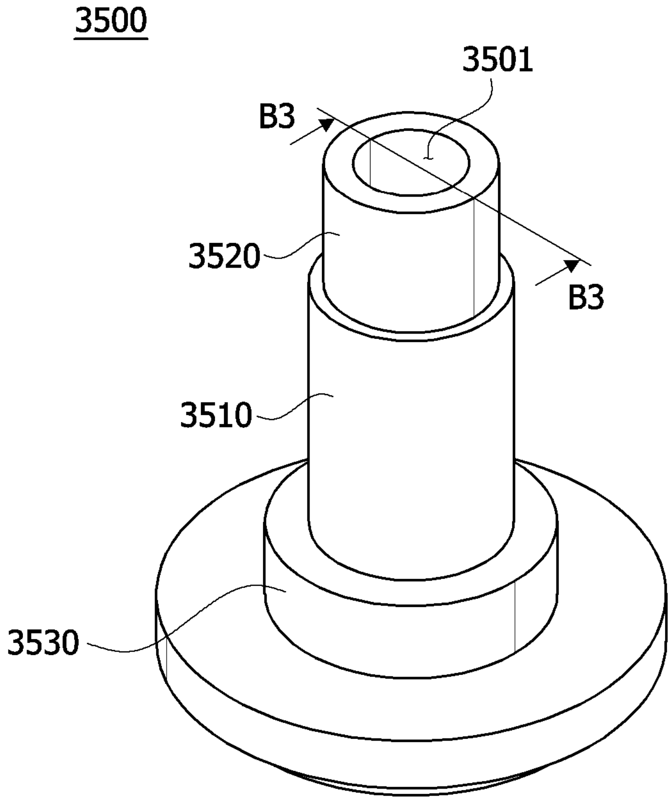
FIG. 35 is a perspective view of a bearing housing.
Figure 36:
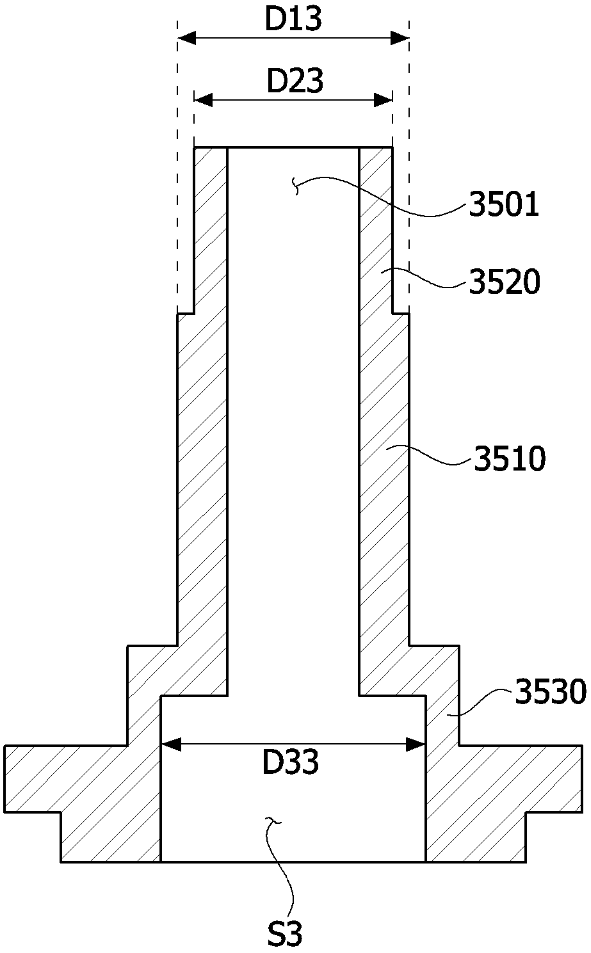
FIG. 36 is a side sectional view of the bearing housing taken along line B3-B3 in FIG. 35.

FIG. 35 is a perspective view illustrating the bearing housing 3500, and FIG. 36 is a side sectional view of the bearing housing 3500 taken along line B3-B3 in FIG. 35.

Referring to FIGS. 35 and 36, the bearing housing 3500 may include a first region 3510 in contact with the stator 3300, a second region 3520 in contact with the first bearing 3700A, and a third region 3530 in contact with the second bearing 3700B.

The first region 3510 is disposed in one side of the second region 3520 in the axial direction, and the third region 3530 is disposed in the other side of the first region 3510. A hole 3501 is disposed at the center of the bearing housing 3500. The shaft 3100 is disposed in an inner side of the hole 3501. In addition, the bearing housing 3500 may include a receiving space S that receives the second bearing 3700B. The hole 3501 and the receiving space S communicate with each other.

An outer diameter D13 of the first region 3510 may be larger than an outer diameter D23 of the second region 3520.

In addition, an inner diameter D33 of the third region 3530 may be larger than an outer diameter D13 of the first region 3510.

The structure of the bearing housing 3500 is meant to increase the axial length of the mirrors 31000 and 31100 by arranging the stator 3300 to be overlapped with the mirrors 31000 and 31100 in the radial direction.

Figure 37:
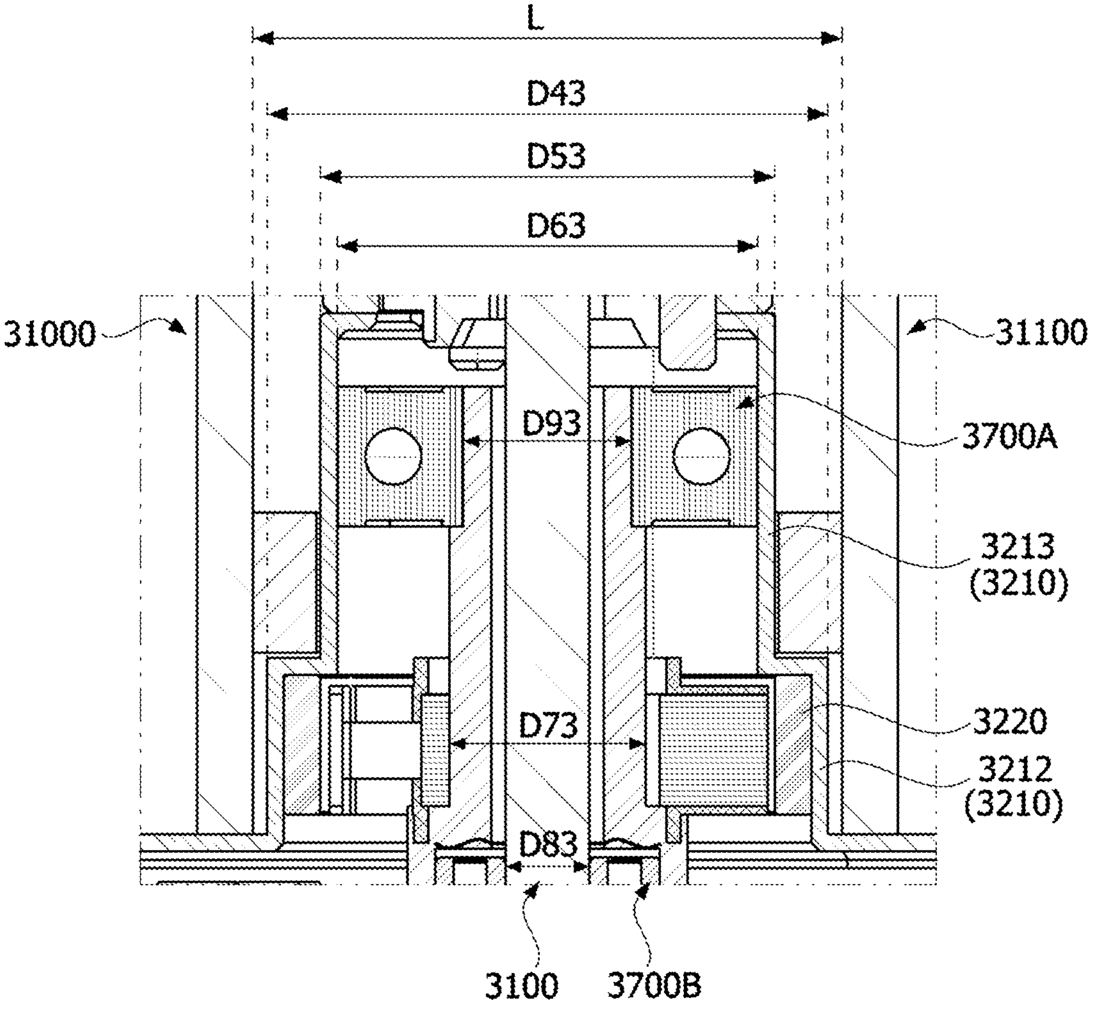
FIG. 37 is an enlarged side view of a part B3 in FIG. 29.

Referring to FIG. 37, it is an enlarged side view of a part B3 in FIG. 29.

The motor according to one embodiment has the advantage of enhancing the sensing performance by increasing the axial length of the mirrors 31000 and 31100. In order to secure the axial length of the mirrors 31000 and 31100, the outer diameter of the stator 3300 needs to be reduced such that the stator 3300 is disposed in the inner side of the mirrors 31000 and 31100. However, when the outer diameter of the stator 3300 is reduced, a winding space of the coil for securing a torque decreases. Accordingly, the inner diameter of the stator 3300 is reduced to sufficiently secure the winding space of the coil.

When reducing the inner diameter of the stator 3300, the outer diameter of the bearing housing 3500 also decreases, and accordingly, the bearing installation space disposed between the inner surface of the bearing housing 3500 and the shaft 3100 is narrowed, so it becomes difficult to install the bearing. Referring to FIG. 37, unlike the second bearing 3700B disposed between the shaft 3100 and the bearing housing 3500, the first bearing 3700A is disposed between the bearing housing 3500 and the yoke so as to solve this problem. When the first bearing 3700A is disposed in the outer side of the bearing housing 3500, the bearing with a relatively large size may be installed. Therefore, robustness of the axial structure can be greatly improved. In addition, since the second bearing 3700B supports the shaft 3100 and the first bearing 3700A directly supports the yoke 3210, the robustness of the axial structure may be further improved.

Specifically, the aforementioned configuration will be described in further detail below.

The first bearing 3700A is disposed to overlap the mirrors 31000 and 31100 in the radial direction. On the other hand, the second bearing 3700B is disposed not to overlap the mirrors 31000 and 31100 in the radial direction. An inner diameter D93 of the first bearing 3700A is larger than an inner diameter D83 of the second bearing 3700B. This is because an inner ring of the first bearing 3700A is fixed to the bearing housing 3500, and an inner ring of the second bearing 3700B is fixed to the shaft.

The magnet receiving part 3212 is disposed to overlap the mirrors 31000 and 31100 in the radial direction. An outer diameter D43 of the magnet receiving part 3212 is larger than an outer diameter D53 of the pillar part 3213. In addition, the outer diameter D43 of the magnet receiving part 3212 is smaller than the shortest distance L between the first mirror 31000 and the second mirror 31100. An inner diameter D73 of the stator 3300 is smaller than an outer diameter D63 of the first bearing 3700A. This is meant for the stator 3300 to be positioned between the first mirror 31000 and the second mirror 31100.

Meanwhile, the drive magnet 3220 of the rotor 3200 is disposed to be overlapped with the first mirror 31000 and the second mirror 31100 in the radial direction.

Figure 38:
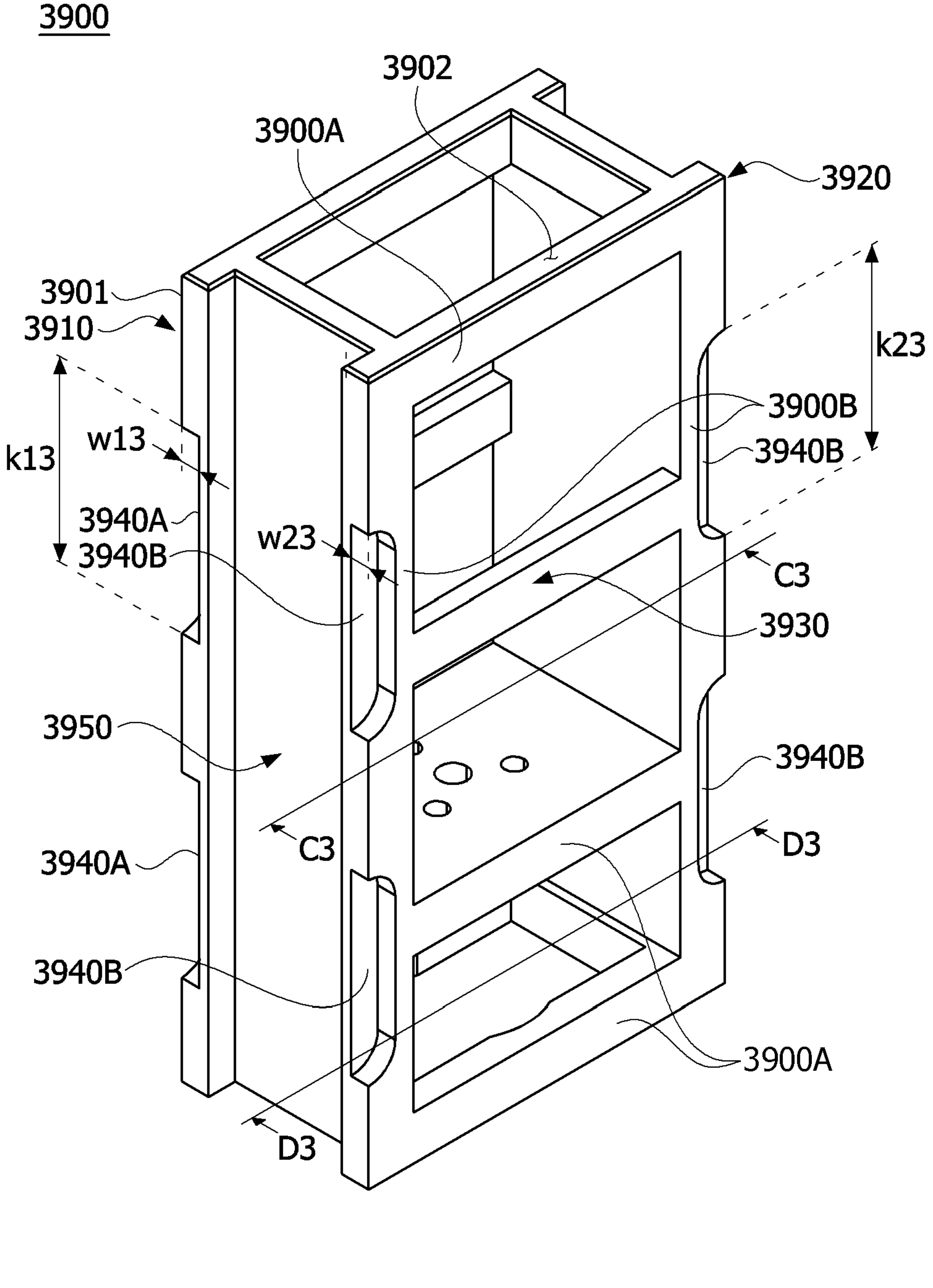
FIG. 38 is a view illustrating the holder.

FIG. 38 is a view illustrating the holder 3900.

Referring to FIG. 38, the holder 3900 may include a first member 3910, a second member 3920, a third member 3930, and a sidewall 3950. The first member 3910 is coupled to the first mirror 31000. The second member 3920 is coupled to the second mirror 31100. The third member 3930 connects the first member 3910 and the second member 3920. The sidewall 3950 may be disposed between the first member 3910 and the second member 3920. The first member 3910 may include a third surface 3901 in contact with the first mirror 31000. The second member 3920 may include a fourth surface 3902 in contact with the second mirror 31100. The third surface 3901 and the fourth surface 3902 may be disposed to face each other. In addition, the third surface 3901 and the fourth surface 3902 may be elongated along the axial direction.

Due to the hollow space in an inner side of the holder 3900, the first surface 3801 may be divided into a horizontal area 3900A and a vertical area 3900B in contact with a partial region of the first mirror 31000. The second surface 3802 may also be divided into the horizontal area 3900A and the vertical area 3900B in contact with a partial region of the second mirror 31100.

The holder 3900 may include a first groove 3940A and a second groove 3940B to which an adhesive is applied. The first groove 3940A is concavely formed on the third surface 3901. The first groove 3940A may have an axial length k13 greater than the width direction length w13. The first groove 3940A may be disposed in the vertical region 3900B of the first surface 3801. The second groove 3940B is concavely formed on the fourth surface 3902. The second groove 3940B may have the axial length k13 greater than the width direction length w13. The second groove 3940B may be disposed in the vertical region 3900B of the second surface 3802.

The first mirror 31000 and the second mirror 31100 have a rectangular structure with a relatively long axial length in consideration of a scan range. Accordingly, when the first groove 3940A and the second groove 3940B to which the adhesive is applied are elongated in the axial direction, there is an advantage of increasing the coupling force between the first mirror 31000 and the second mirror 31100 and the holder 3900, and there is also an advantage of easily applying the adhesive to the holder 3900 and easily curing the adhesive.

The holder 3900 may be manufactured by the die casting using aluminum which may reduce weight relatively.

Figure 39:
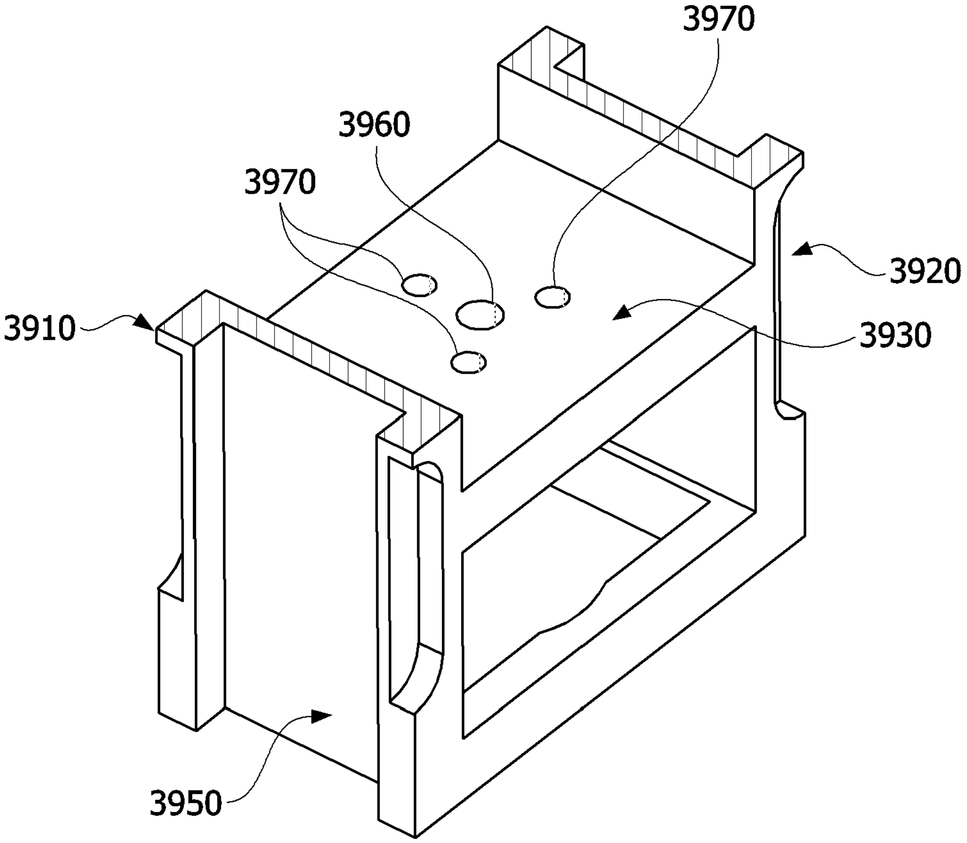
FIG. 39 is a cross-sectional view of the holder taken along line C3-C3 in FIG. 38.

FIG. 39 is a cross-sectional view of the holder 3900 taken along line C3-C3 in FIG. 38.

Referring to FIG. 39, the third member 3930 of the holder 3900 is disposed in a direction perpendicular to the axial direction and connects the first member 3910 and the second member 3920. The third member 3930 may include a fourth hole 3960 and a fifth hole 3970. The fourth hole 3960 is a part penetrated by the shaft 3100, and an inner diameter of the fourth hole 3960 is set to be larger than an outer diameter of the shaft 3100. The shaft 3100 may penetrate the fourth hole 3960, and an end of the shaft 3100 may protrude above the upper surface of the third member 3930.

The fifth hole 3970 is a part penetrated by the fastening member 13, and an inner diameter of the fifth hole 3970 is set to be larger than the outer diameter of the shaft 3100. In a state where the fastening member 13 penetrates the fifth hole 3970 and is fastened to the connection member 3800, a head of the fastening member 13 may be in contact with the upper surface of the third member 3930. The second hole 3213*b*, the third hole 3820, and the fifth hole 3970 may be disposed to correspond to the axial direction. The end of the fastening member 13 that penetrates the fifth hole 3970 and the third hole 3820 are disposed in the second hole 3213*b*.

Figure 40:
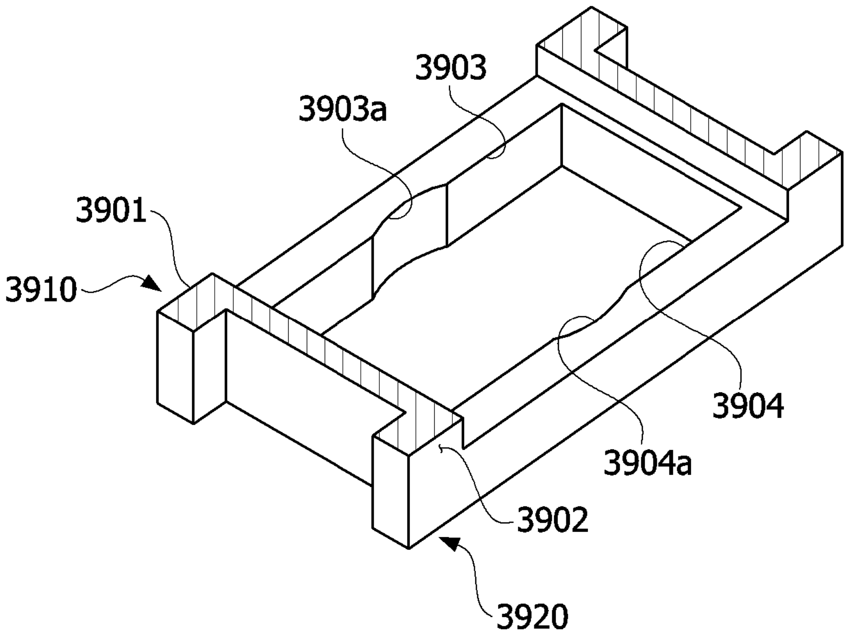
FIG. 40 is a cross-sectional view of the holder taken along line D3-D3 in FIG. 38.

FIG. 40 is a cross-sectional view of the holder 3900 taken along line D3-D3 in FIG. 38.

Referring to FIG. 40, the first member 3910 may include a fifth surface 3903 disposed to face the third surface 3901. A third groove 3903*a* may be disposed on the fifth surface 3903. The third groove 3903*a* may be concavely formed on the fifth surface 3903 towards the third surface 3901 and may be formed as a curved surface. The second member 3920 may include a sixth surface 3904 disposed to face the fourth surface 3902. A fourth groove 3904*a* may be disposed on the sixth surface 3904. The fourth groove 3904*a* may be concavely formed on the sixth surface 3904 towards the fourth surface 3902 and may be formed as a curved surface.

A portion of the yoke 3210 may be disposed in the third groove 3903*a*. In addition, another portion of the yoke 3210 may be disposed in the fourth groove 3904*a*. Due to the third groove 3903*a* and the fourth groove 3904*a*, there is an advantage of reducing the size of the holder 3900 while securing the size of the yoke 3210.

Figure 41:
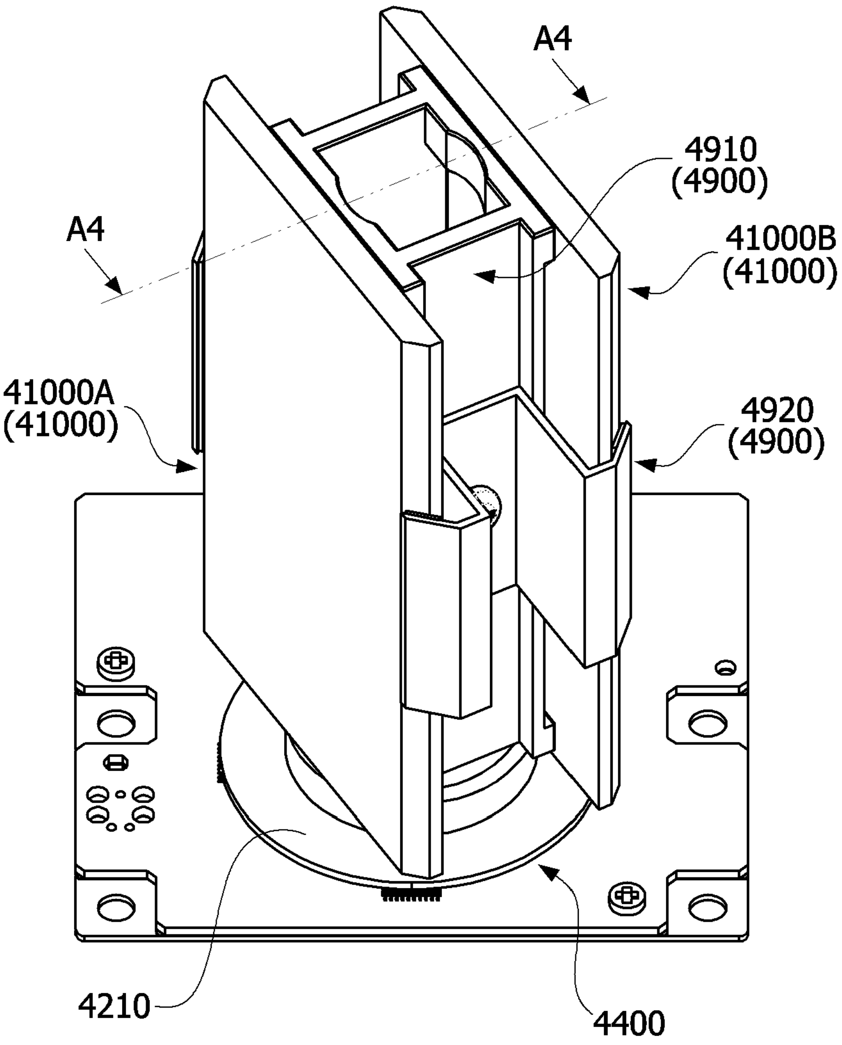
FIG. 41 is a perspective view illustrating a motor according to one embodiment.
Figure 42:
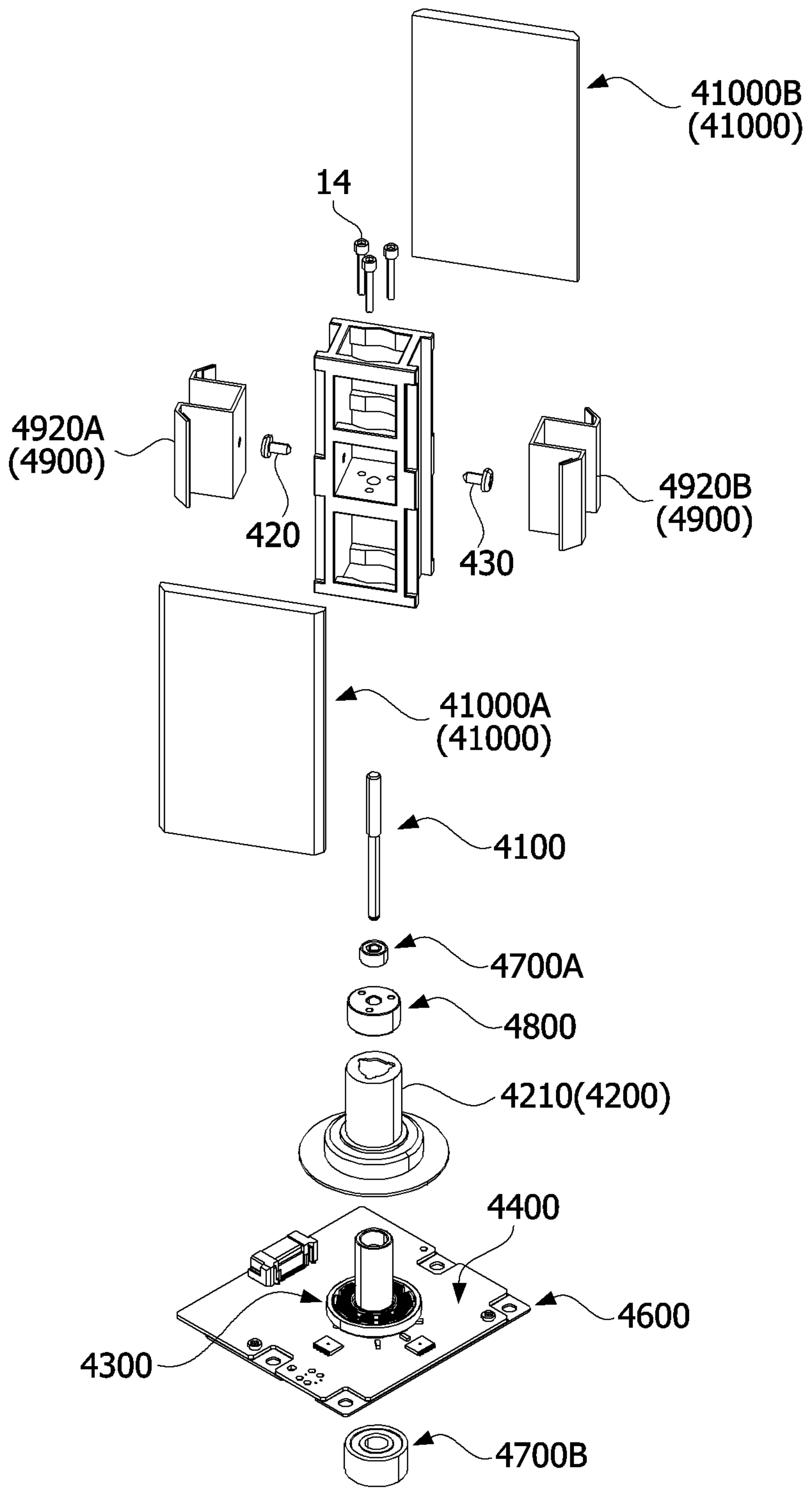
FIG. 42 is an exploded perspective view of the motor shown in FIG. 41.
Figure 43:
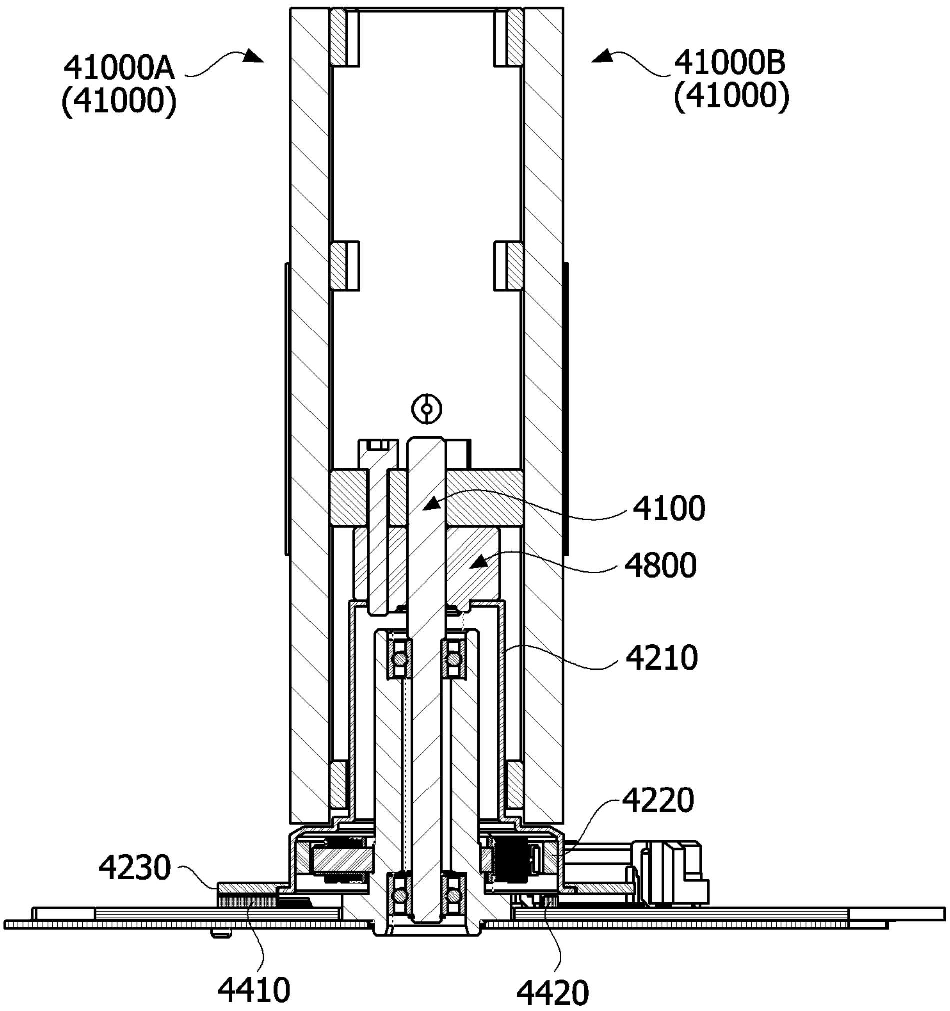
FIG. 43 is a side sectional view of the motor taken along line A-A in FIG. 41.

FIG. 41 is a perspective view illustrating the motor according to one embodiment, FIG. 42 is an exploded perspective view of the motor illustrated in FIG. 41, and FIG. 43 is a side sectional view of the motor taken along line A4-A4 in FIG. 41. Hereinafter, an inner side is a direction facing the shaft 4100 based on the radial direction of the motor, and an outer side is a direction opposite to the inner side.

Referring to FIGS. 41 to 43, the motor according to embodiments may include a shaft 4100, a rotor 4200, and a stator 4300.

The shaft 4100 is coupled to a yoke 4210 of the rotor 4200. The shaft 4100 may be press-fitted and coupled to the yoke 4210. Alternatively, the shaft 4100 may be integrated with the yoke 4210. The shaft 4100 rotates with the rotor 4200. The shaft 4100 is rotatably supported by a bearing 4700 disposed in an inner side of the bearing housing 4500.

The rotor 4200 may include a yoke 4210, a drive magnet 4220, and a sensing magnet 4230.

The yoke 4210 is coupled to the shaft 4100. The shaft 4100 may be disposed at the center of the yoke 4210.

The drive magnet 4220 is meant to rotate the yoke 4210. The drive magnet 4220 may be disposed on an inner surface of the yoke 4210. The drive magnet 4220 may be disposed to face the stator 4300 in the radial direction of the rotor 4200. When an electrical interaction occurs between the drive magnet 4220 and a coil of the stator 4300, the yoke 4210 rotates. The drive magnet 4220 may be a combination of a plurality of unit magnets. Alternatively, the drive magnet 4220 may be a single component with a ring shape.

The sensing magnet 4230 is meant to precisely recognize a position of the rotor 4200. The sensing magnet 4230 may be disposed on the inner surface of the yoke 4210. In addition, the sensing magnet 4230 may be disposed to face the substrate 4400 in the axial direction.

The stator 4300 may be disposed between the shaft 4100 and the yoke 4210. The stator 4300 may be fixed to an outer surface of the bearing housing 4500. The stator 4300 includes a core of the stator 4300 including a plurality of teeth, and the coil may be wound around each tooth. The teeth may include an insulator configured to insulate the coil and the core of the stator 4300.

The substrate 4400 is disposed on one side of the yoke 4210. The substrate 4400 may include a first sensor 4410. The first sensor 4410 may be a Hall IC or an encoder IC that senses a change in a magnetic flux of the sensing magnet 4230. The first sensor 4410 may be disposed to face the sensing magnet 4230 in the axial direction. The substrate 4400 may include a second sensor 4420. The second sensor 4420 may be a Hall IC that senses a change in a magnetic flux of the drive magnet 4220. The second sensor 4420 may be disposed to face the drive magnet 4220 in the axial direction.

The bearing housing 4500 is a member that fixes a first bearing 4700A and a second bearing 4700B to form an axial system. The bearing housing 4500 may include a region such as a cylindrical member elongated along the axial direction.

The bearing housing 4500 is fixed to a plate 4600. Although the plate 4600 and the bearing housing 4500 are illustrated separately, the plate 4600 and the bearing housing 4500 may be integrated with each other. The substrate 4400 may be mounted on one surface of the plate 4600.

The first bearing 4700A may support an upper end of the shaft 4100, and the second bearing 4700B may support a lower end of the shaft 4100.

The connection member 4800 is a member that couples the yoke 4210 to a holder 4900. The connection member 4800 is disposed between the yoke 4210 and the holder 4900 in the axial direction and couples the yoke 4210 to the holder 4900. When the yoke 4210 rotates, the connection member 4800 rotates, and the holder 4900 rotates together. The connection member 4800 may be a cylindrical member. One surface of the connection member 4800 may be in contact with the yoke 4210 in the axial direction, and the other surface of the connection member 4800 may be in contact with the holder 4900.

The holder 4900 fixes the mirror 41000. In addition, the holder 4900 is coupled to the connection member 4800 and rotates with the yoke 4210. The holder 4900 may be a member formed of a frame such that cross section thereof is hollow inside. The holder 4900 having such a shape is resistant to bending and has the advantage of greatly reducing the weight. The first mirror 41000A and the second mirror 41000B may be disposed to face each other on one surface and the other surface of the holder 4900. The holder 4900 may be disposed to be overlapped with each of the first mirror 41000A and the second mirror 41000B in the radial direction.

The mirror 41000 serves to reflect a laser irradiated to an object to be sensed. The mirror 41000 may include the first mirror 41000A disposed on one surface of the holder 4900 and the second mirror 41100B disposed on the other surface of the holder 4900. When the yoke 4210 rotates, the holder 4900 rotates, and with the rotation of the holder 4900, the mirror 41000 rotates together.

Figure 44:
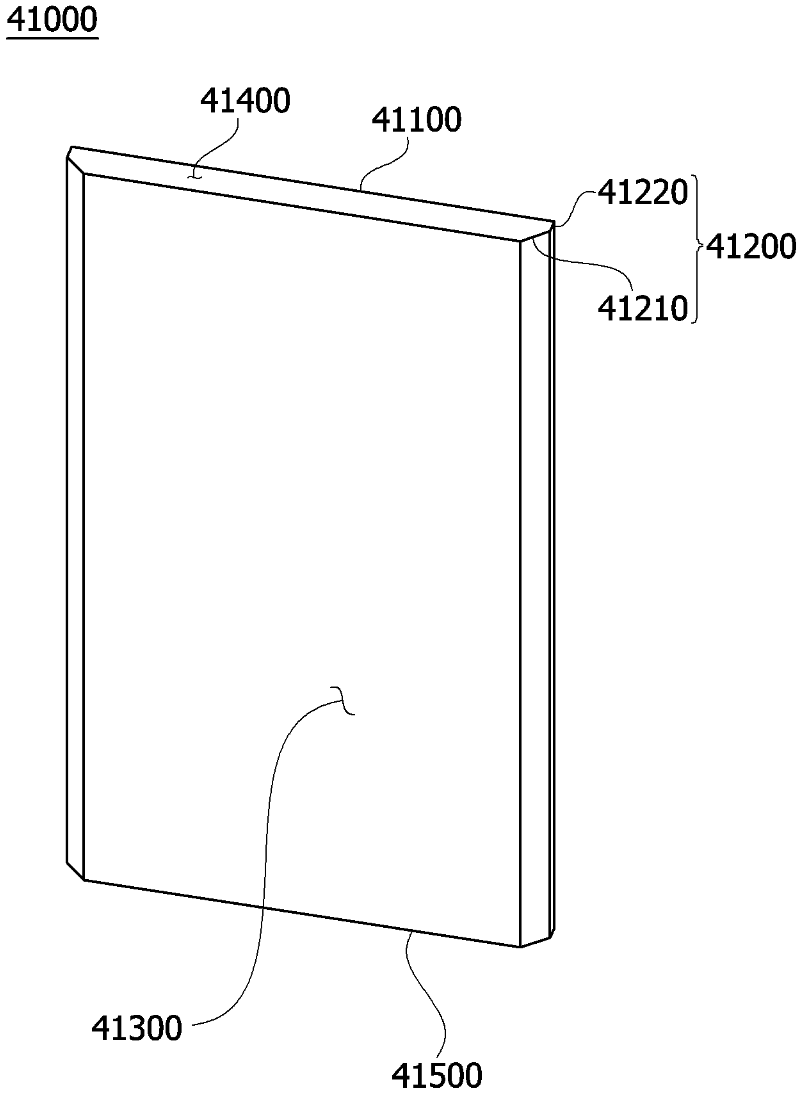
FIG. 44 is a perspective view illustrating a mirror.
Figure 45:
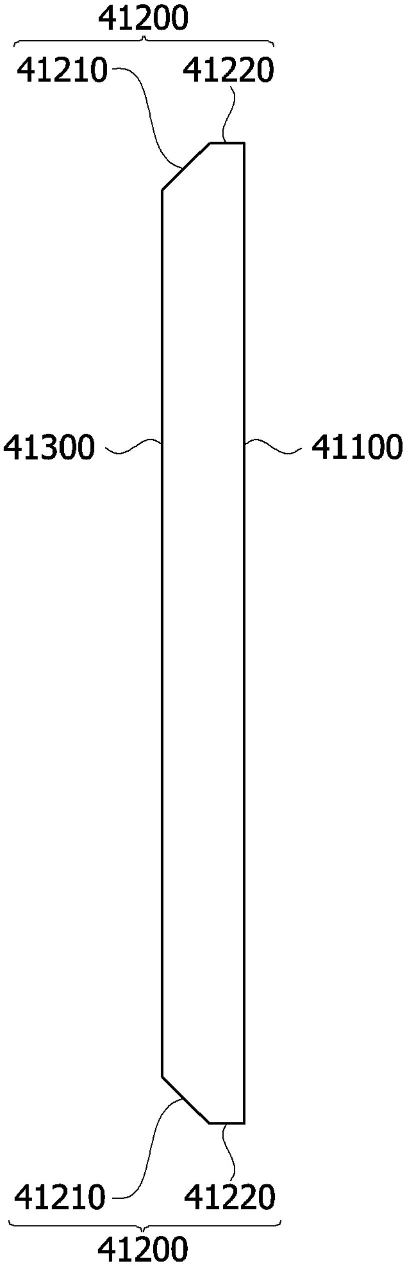
FIG. 45 is a top plan view of the mirror illustrated in FIG. 44.

FIG. 44 is a perspective view illustrating the mirror, and FIG. 45 is a top plan view of the mirror illustrated in FIG. 44.

Referring to FIGS. 44 and 45, the mirror 41000 may be a rectangular plate-shaped member which has a long axial length. The mirror 41000 may include a rear surface 41100, a side surface 41200, a front surface 41300, an upper surface 41400, and a lower surface 41500. The rear surface 41100 is a surface in contact with the holder 4900. The front surface 41300 is a surface that reflects a laser. The side surfaces 41200 may be disposed on one side and the other side of the mirror 41000, respectively. The side surface 41200 may include a first side surface 41210 and a second side surface 41220. The first side surface 41210 may be a surface adjacent disposed to the front surface 41300, and the second side surface 41220 may be a surface disposed adjacent to the rear surface 41100. The first side surface 41210 may be disposed to be inclined with regard to a surface extending from the front surface 41300. Accordingly, a region of the front surface 41300 may be smaller than that of the rear surface 41100.

Figure 46:
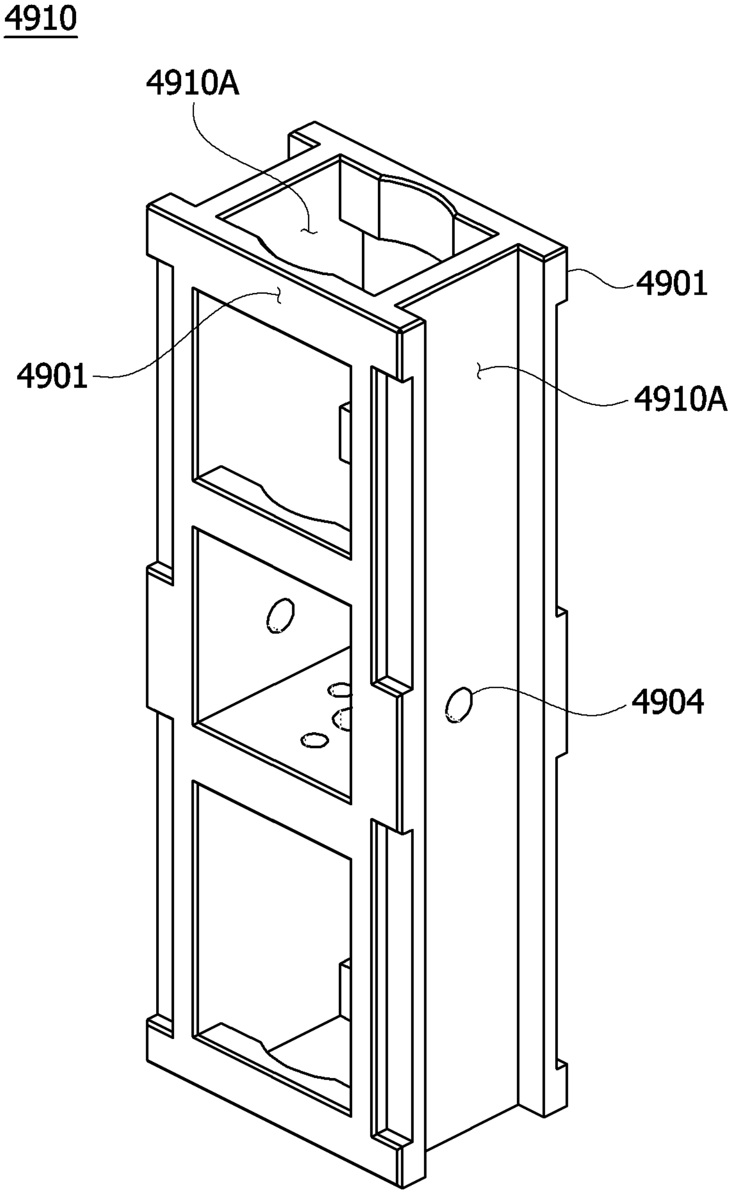
FIG. 46 is a perspective view illustrating a body of the holder.

FIG. 46 is a perspective view illustrating a body of the holder 4900.

Referring to FIG. 46, the holder 4900 may include a body 4910. The body 4910 includes a first surface 4901 in contact with the rear surface 41100 of the mirror 41000. Two first surfaces 4901 may be disposed to face each other, and the two first surfaces 4901 may be connected to two side parts 4910A disposed to be spaced apart from each other. A fastening hole 4904 may be disposed in each of the side parts 4910A. The fastening hole 4904 is for coupling the holder 4900 to the bracket 4920.

Figure 47:
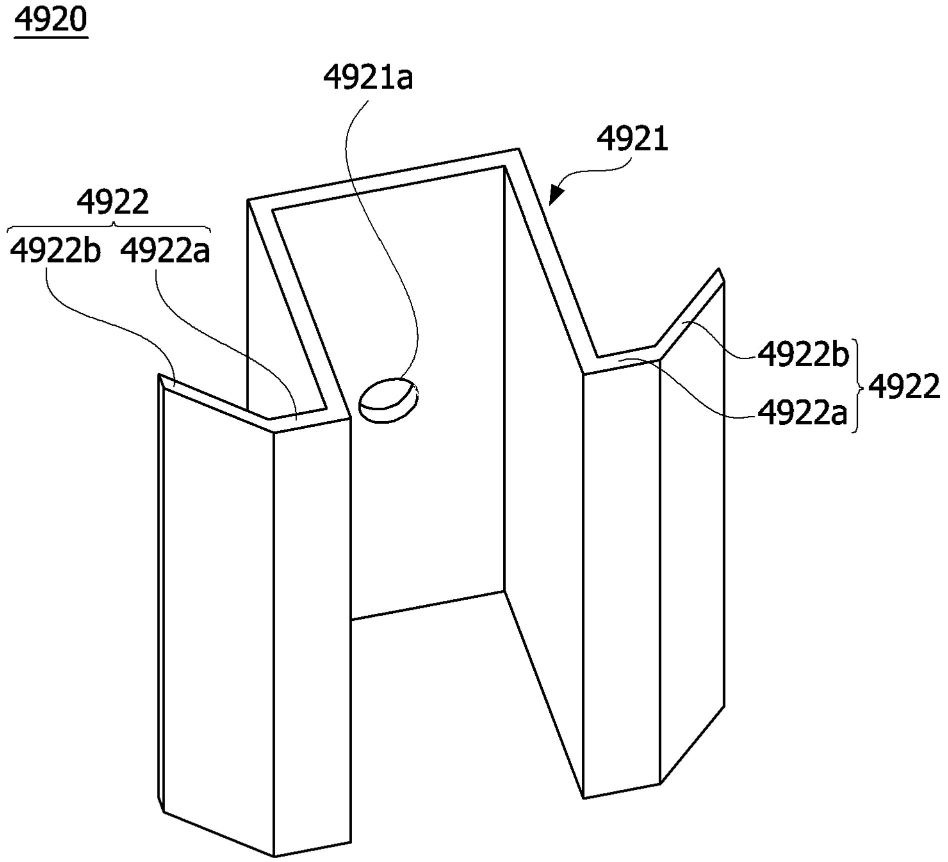
FIG. 47 is a perspective view illustrating a bracket of the holder.
Figure 48:
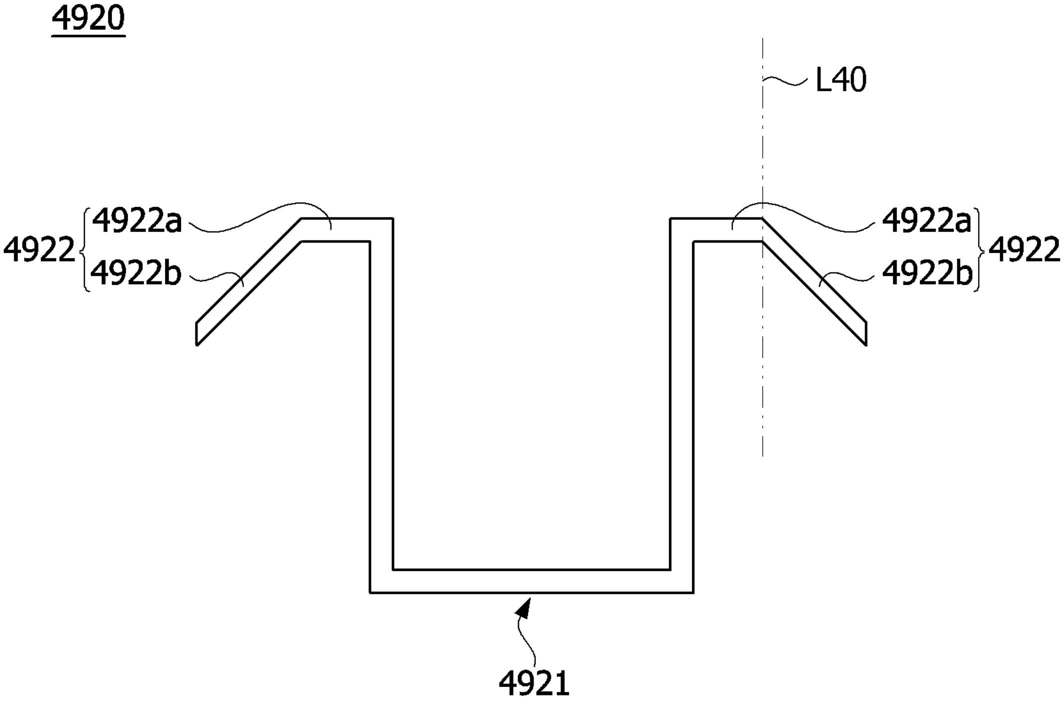
FIG. 48 is a top plan view of the bracket illustrated in FIG. 47.

FIG. 47 is a perspective view illustrating a bracket 4920 of the holder 4900, and FIG. 48 is a top plan view of the bracket 4920 illustrated in FIG. 47.

Referring to FIGS. 47 and 48, the bracket 4920 is a member that fixes the mirror 41000 and the body 4910 of the holder 4900. When only the adhesive is used, since the coupling force between the holder 4900 and the mirror 41000 is weak, the holder 4900 and the mirror 41000 are additionally fixed using the bracket 4920. The bracket 4920 may include a bracket body 4921 and a clip part 4922. The bracket body 4921 is fixed to a side part 4910A of the holder 4900. The cross-sectional shape of the bracket body 4921 may be a "⊏" type. A fastening hole 4921*a* is formed in the bracket body 4921. The bracket body 4921 is coupled to the body 4910 of the holder 4900 via a first screw 24 or a second skew 34 that penetrate the fastening hole 4921*a*.

The clip part 4922 may be bent outwards from an end part of the bracket body 4921. The clip part 4922 is an elastically deformable member, which is a part that directly fixes the mirror 41000 by pressing the side surface 41200 of the mirror 41000.

The clip part 4922 may be divided into a first region 4922*a* and a second region 4922*b*. The first region 4922*a* is a part vertically bent from the bracket body 4921. The second region 4922*b* is a part bent towards the bracket body 4921 in the first region 4922*a*.

The holder 4900 includes a first protrusion 4902 that is in contact with the mirror 41000 and fixes the mirror 41000 to the holder 4900. The first protrusion 4902 is formed to protrude rather than the first surface 4901. Hereinafter, a surface indicative of the extending surface of the first surface 4901 is a reference surface L40, and in the bracket 4920, the second region 4922*b* protruding rather than the reference surface L40 corresponds to a first protrusion portion 4902.

Figure 49:
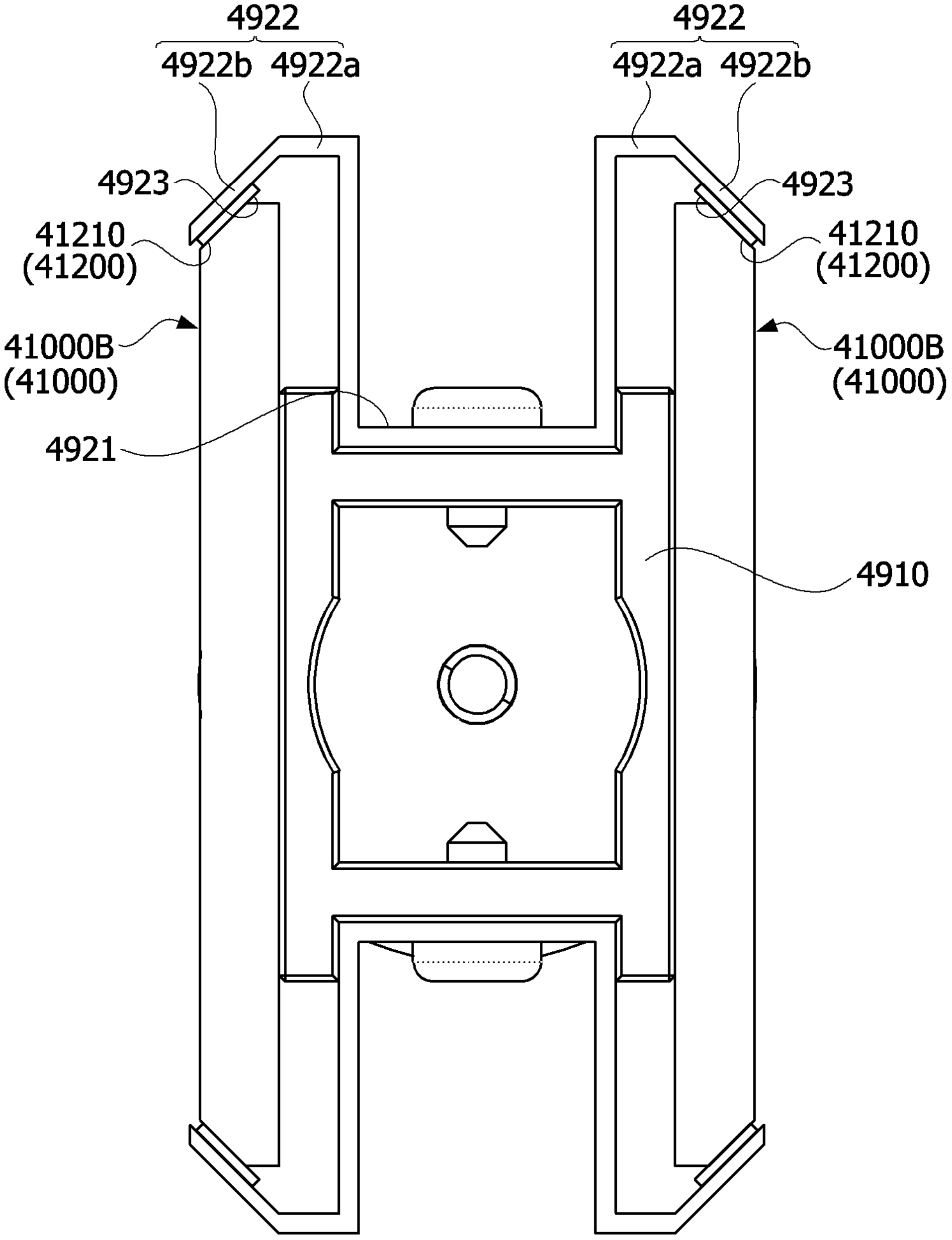
FIG. 49 is a top plan view of the holder and the mirror.

FIG. 49 is a top plan view of the holder 4900 and the mirror 41000.

Referring to FIG. 49, as the first protrusion 4902, the second region 4922*b* of the bracket 4920 is in contact with the side surface 41200 of the mirror 41000 and fixes the mirror 41000 to the holder 4900. Specifically, the second region 4922*b* presses the mirror 41000 by contacting the inclined first side surface 41210 of the mirror 41000. Since the second region 4922*b* is inclined to correspond to the first side surface 41210, the fixing force may be increased by pressing the mirror 41000 in a direction towards the holder 4900. In that case, a pad in contact with the first side surface 41210 is attached to the second region 4922*b*, thereby preventing scratching and damaging the first surface 41210 and causing vibration, noise or separation due to the gap between the second region 4922*b* and the first side surface 41210.

Figure 50:
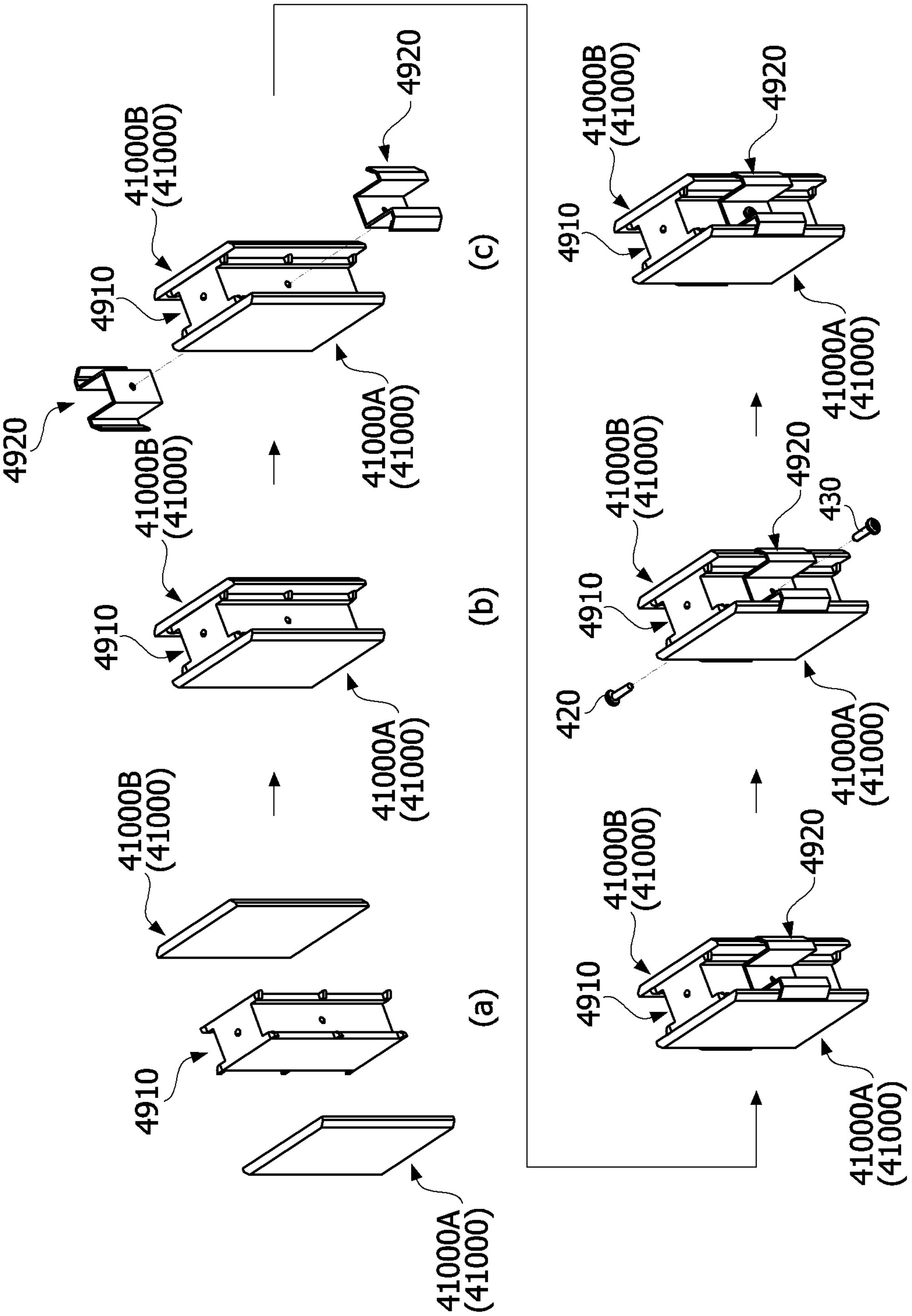
FIGS. 50 (*a*) to (*f*) are views illustrating processes of assembling the holder and the mirror.

FIG. 50 is a view illustrating a process of assembling the holder 4900 and the mirror 41000.

Referring to FIGS. 49 and 50, as illustrated in (a) through (b) of FIGS. 50, the mirror 41000 is primarily fixed to the body 4910 of the holder 4900 using the adhesive. Next, when the bracket 4920 is mounted in the body 4910 of the holder 4900 as illustrated in (c) and (d) of FIGS. 50, the clip part 4922 of the bracket 4920 presses the side surface 41200 of the mirror 41000 to additionally fix the mirror 41000 to the body 4910. Next, as illustrated in (e) and (f) of FIGS. 50, when the bracket 4920 is fastened to the body 4910 of the holder 4900 via the first screw 24 and the second skew 34, the mirror 41000 is finally fixed to the holder 4900.

Figure 51:
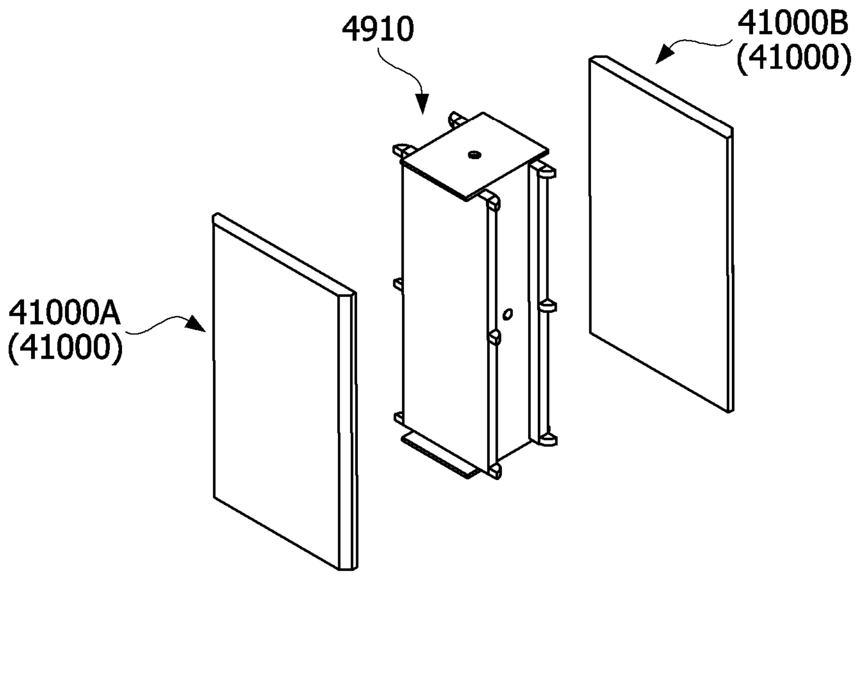
FIG. 51 is a view illustrating the body of the holder according to one modified embodiment.
Figure 52:
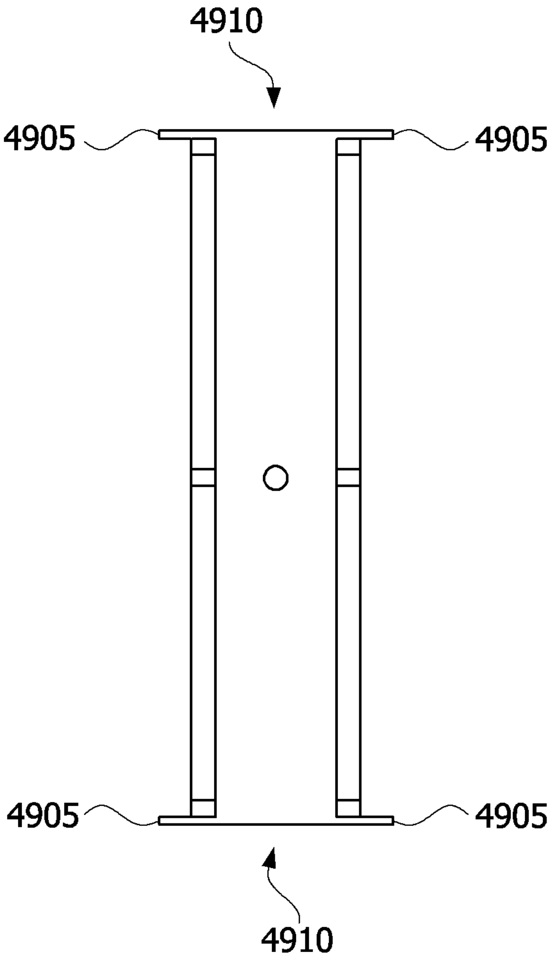
FIG. 52 is a side view of the holder according to another modification.
Figure 53:
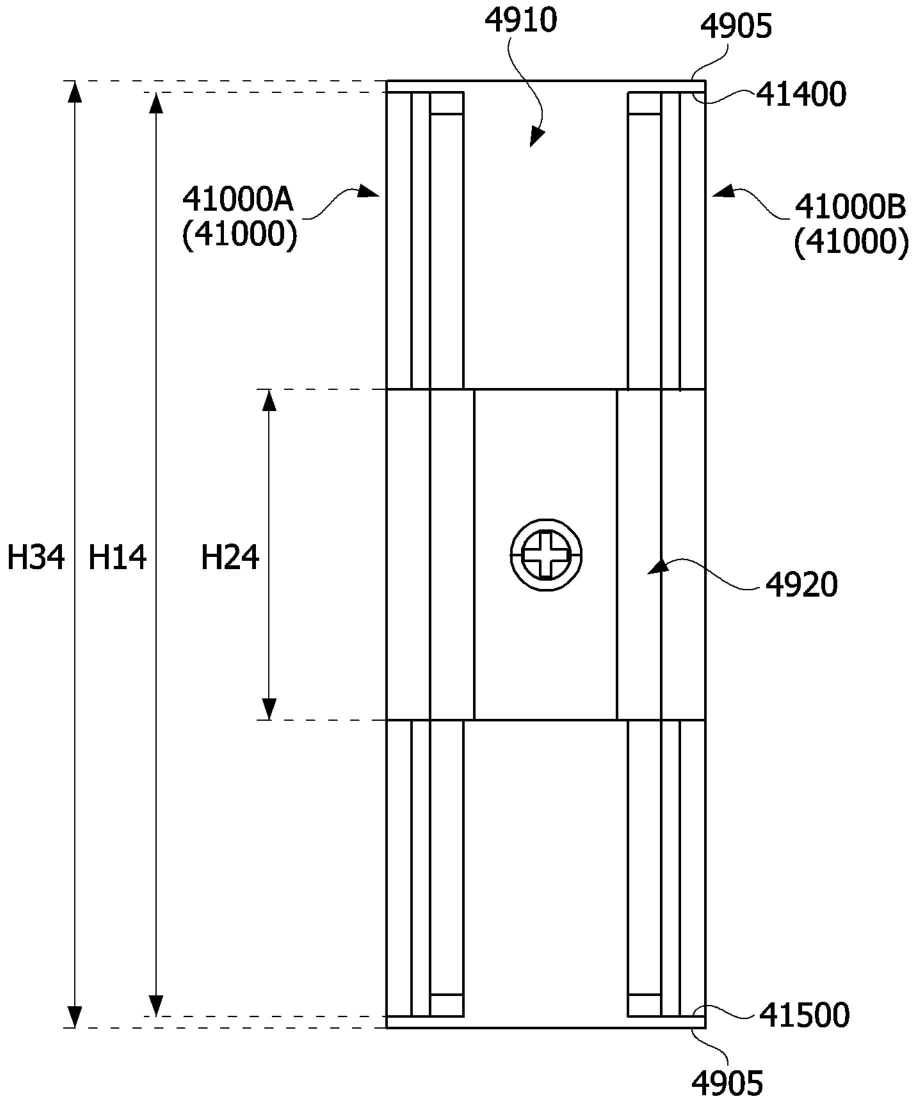
FIG. 53 is a side view illustrating the mirror and the holder in which the body illustrated in FIG. 51 is disposed.

FIG. 51 is a view illustrating the body 4910 of the holder 4900 according to one modified embodiment, FIG. 52 is a side view of the holder 4900 according to another modified embodiment, and FIG. 53 is a side view illustrating the mirror 41000 and the holder 4900 in which the body 4910 illustrated in FIG. 51 is disposed.

Referring to FIGS. 51 to 53, in the holder 4900 according to modified embodiments, a second protrusion 4905 may be disposed on the body 4910 of the holder 4900. The second protrusion 4905 protrudes rather than the first surface 4901 and is in contact with the upper surface 41400 or the lower surface 41500 of the mirror 41000. In a state where the first protrusion 4902 supports the side surface 41200 of the mirror 41000, the second protrusion 4905 supports the upper surface 41400 and the lower surface 41500 of the mirror 41000, thereby more firmly fixing the mirror 41000 to the holder 4900 and preventing the mirror 41000 from being separated to an upper side or a lower side of the holder 4900.

Due to the second protrusion 4905, a height H14 of the mirror 41000 may exceed a height H24 of the bracket 4920 and less than a height H34 of the holder 4900.

Figure 54:
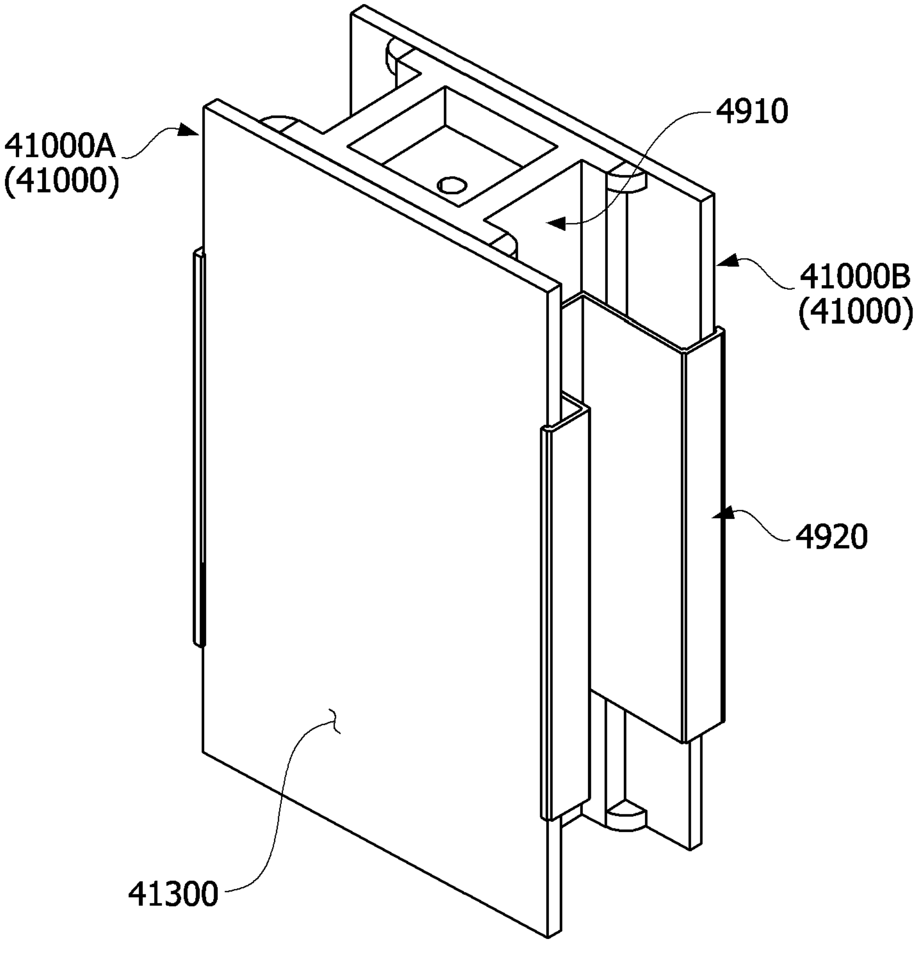
FIG. 54 is a view illustrating the holder and the mirror according to further another modified embodiment.
Figure 55:
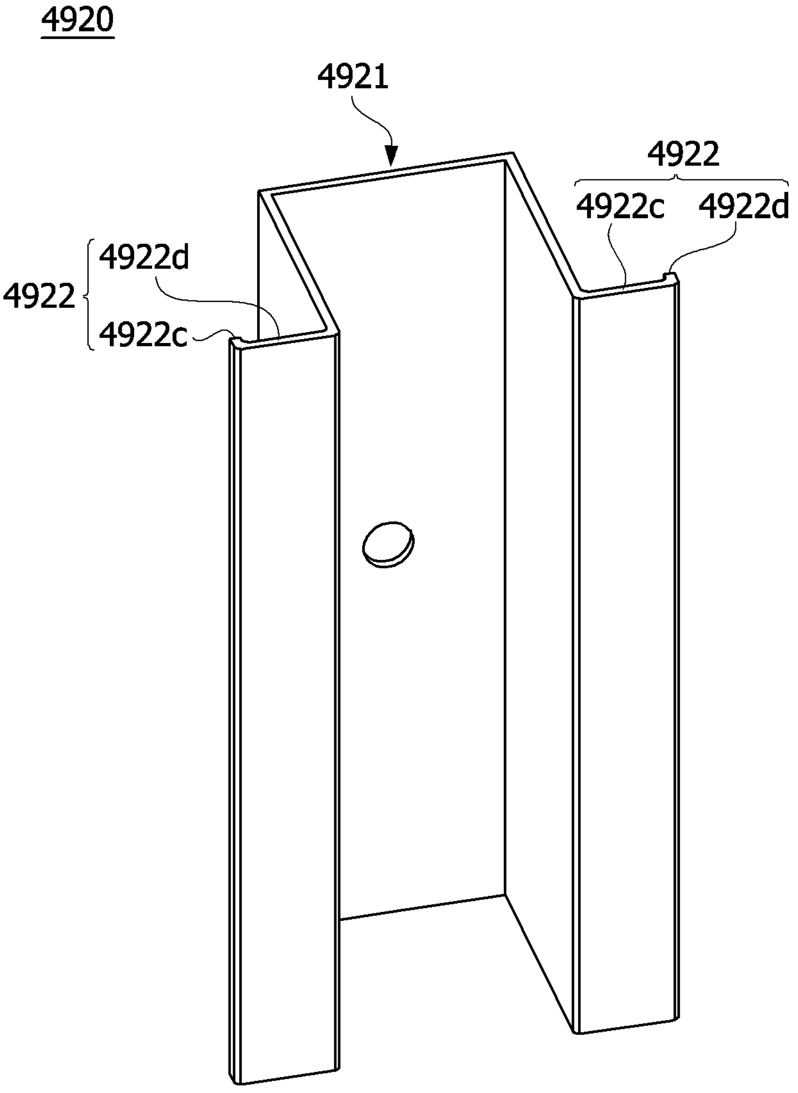
FIG. 55 is a perspective view of the bracket illustrated in FIG. 54.
Figure 56:
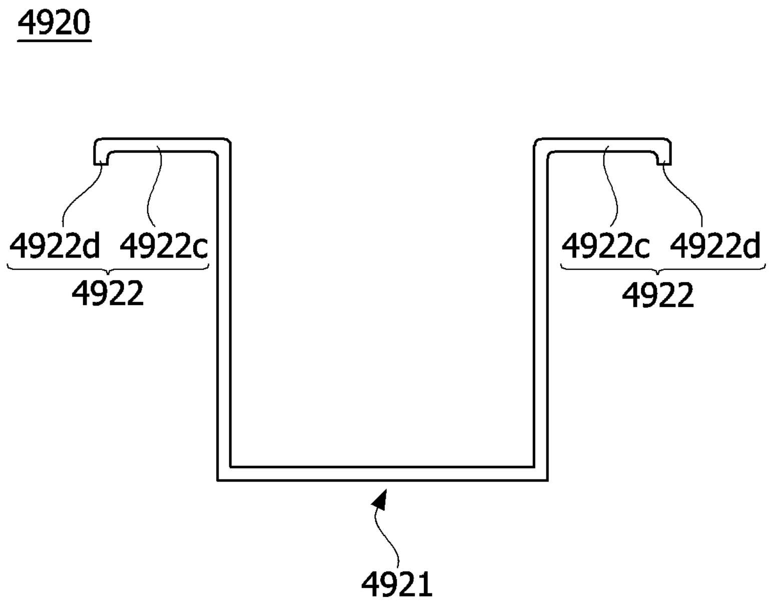
FIG. 56 is a top plan view of the bracket illustrated in FIG. 54.

FIG. 54 is a view illustrating the holder 4900 and the mirror 41000 according to further another modified embodiment, FIG. 55 is a perspective view of the bracket 4920 illustrated in FIG. 54, and FIG. 56 is a top plan view of the bracket 4920 illustrated in FIG. 54.

Referring to FIGS. 54 to 56, the holder 4900 and the mirror 41000 according to further another modified embodiment are characterized in that the holder 4900 is in contact with the front surface 41300 of the mirror 41000 to fix the mirror 41000. The clip part 4922 of the bracket 4920 of the holder 4900 may include a third region 4922*c* and a fourth region 4922*d*. The third region 4922*c* may be vertically bent at the bracket body 4921. The fourth region 4922*d* may be vertically bent to the bracket body 4921 in the third region 4922*c*. The fourth region 4922*d* is in contact with a front surface 41300 of the mirror 41000. The length of the fourth region 4922*d* may be formed relatively much shorter than the length of the third region 4922*c*. This is meant to minimize the front surface 41300 of the mirror 41000.

Figure 57:
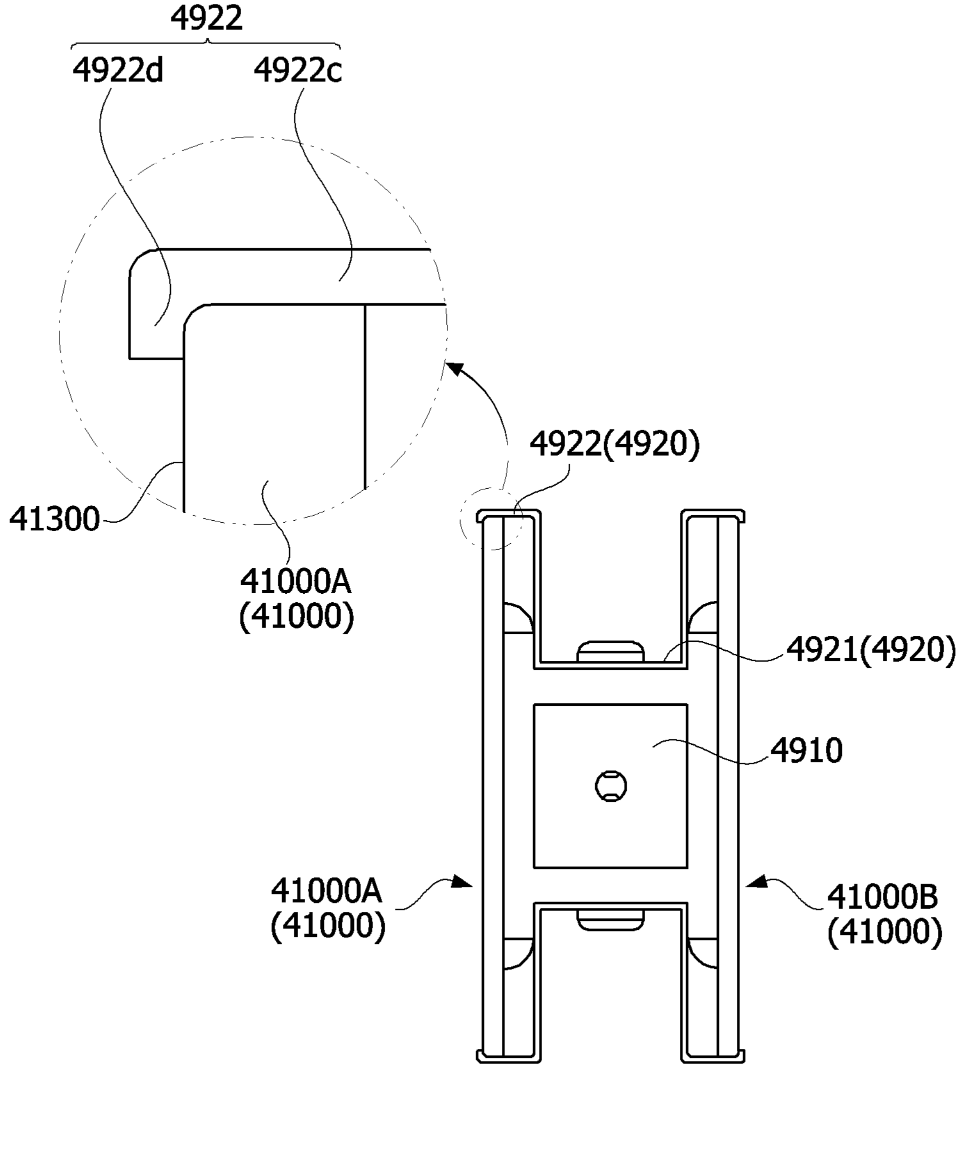
FIG. 57 is a top plan view illustrating a bracket that is in contact with a front surface of the mirror and fixes the mirror to the holder.

FIG. 57 is a top plan view illustrating the bracket 4920 that is in contact with the front surface 41300 of the mirror 41000 and fixes the mirror 41000 to the holder 4900.

Referring to FIG. 57, the fourth region 4922*d* of the clip part 4922 of the bracket 4920 may be in contact with the vicinity of an edge of the front surface 41300 of the mirror 41000 and fix the mirror 41000 to the body 4910 of the holder 4900. Since the bracket 4920 is in contact with and fixes the front surface 41300 of the mirror 41000, the mirror 41000 may be more firmly fixed to the holder 4900 than when the bracket 4920 fixes the side surface 41200 of the mirror 41000. Since the fourth region 4922*d* fixes only a small portion of the front surface 41300 of the mirror 41000 and the height of the bracket 4920 is relatively very small than the height of the mirror 41000, the mirror 41000 may be fixed to the holder 4900 without significantly affecting sensing performance.

Figure 58:
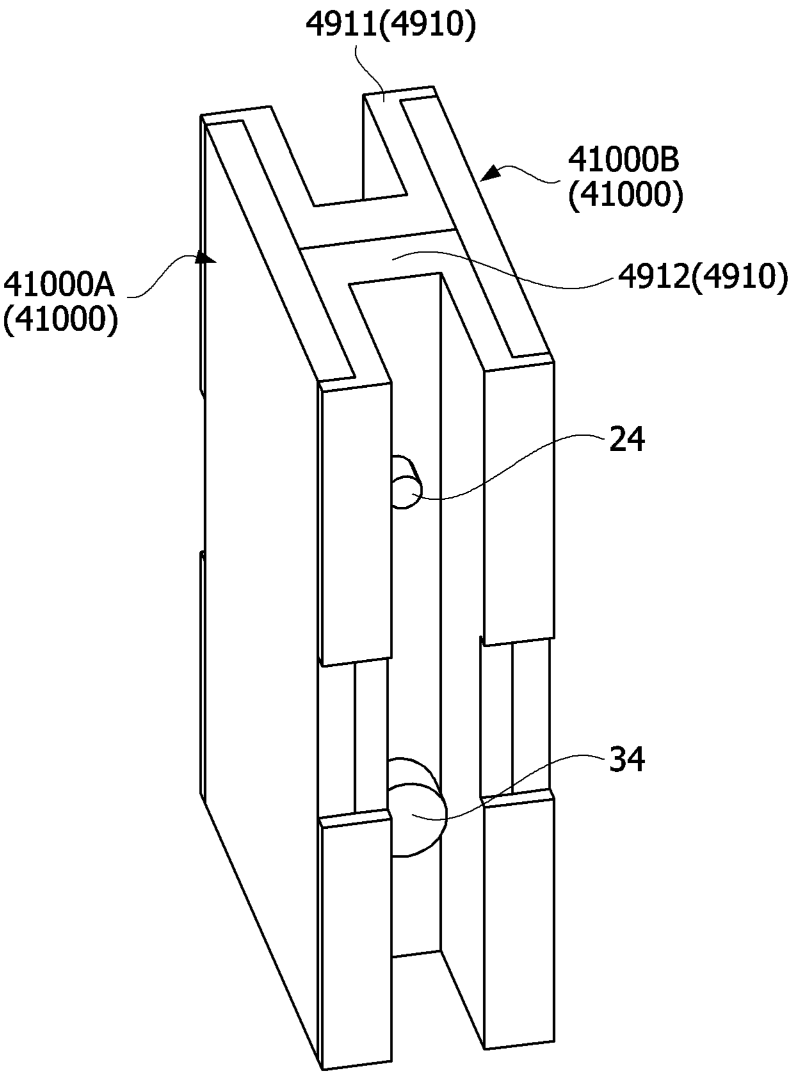
FIG. 58 is a view illustrating the holder and the mirror according to still further another modified embodiment.
Figure 59:
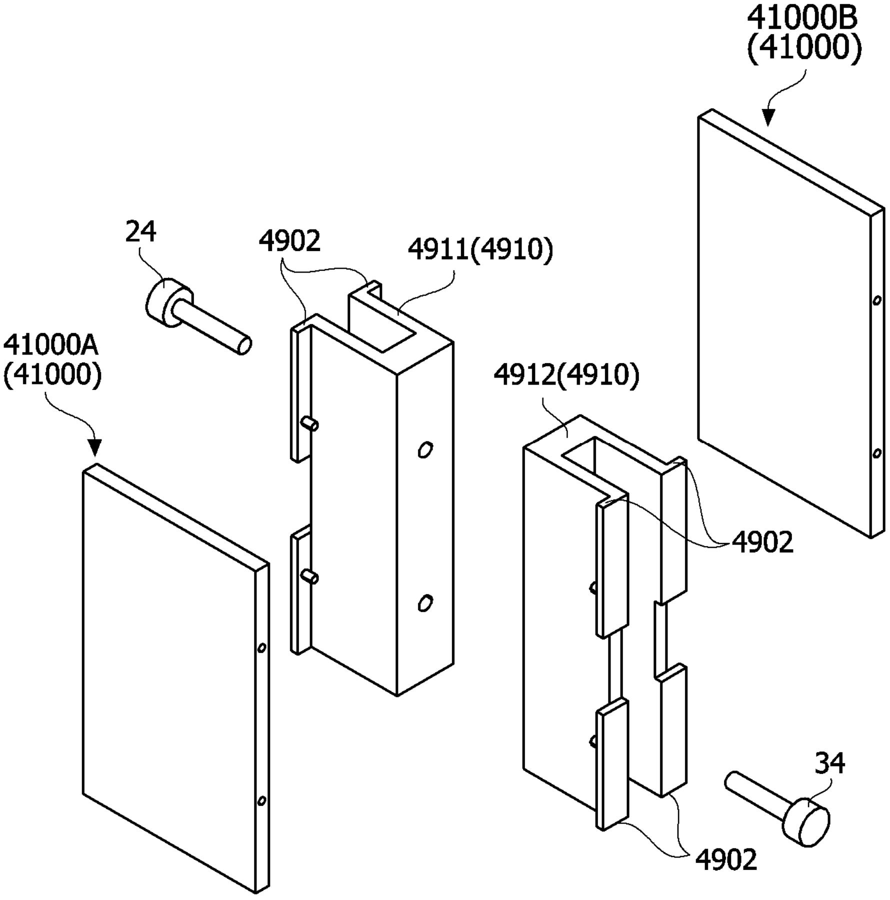
FIG. 59 is an exploded view of the holder and the mirror illustrated in FIG. 58.
Figure 60:
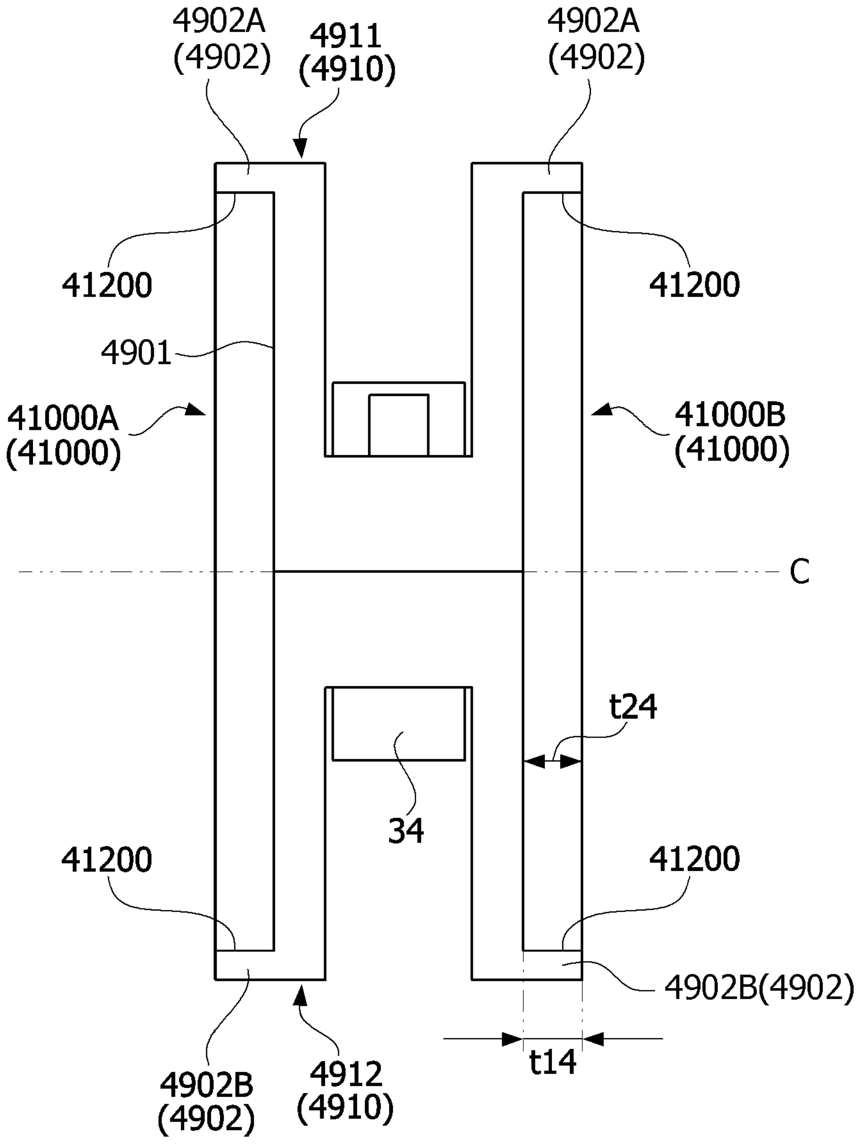
FIG. 60 is a top plan view of the holder and the mirror illustrated in FIG. 58.

FIG. 58 is a view illustrating the holder 4900 and the mirror 41000 according to still further another modified embodiment, FIG. 59 is an exploded view of the holder 4900 and the mirror 41000 illustrated in FIG. 58, and FIG. 60 is a top plan view of the holder 4900 and the mirror 41000.

Referring to FIGS. 58 to 60 (41500), the holder 4900 according to still further another modified embodiment may be implemented as a first protrusion part 4902 where a portion of the body 4910 supports the side surface 41200 of the mirror 41000. Specifically, the body 4910 may include a first part 4911 and a second part 4912. The first part 4911 and the second part 4912 are coupled to each other by the first screw 24 and the second screw 34. The first part 4911 and the second part 4912 may have the same shape and size. Each of the first part 4911 and the second part 4912 may have a cross-sectional shape formed in a "⊏" type.

The first part 4911 and the second part 4912 may be disposed symmetrically on the basis of a width center C of the mirror 41000.

The first part 4911 may include a portion of the first surface 4901 in contact with the rear surface 41100 of the mirror 41000. The second part 4912 may include the remainder of the first surface 4901 in contact with the rear surface 41100 of the mirror 41000.

The first protrusion 4902 may include a first-first protrusion 4902A in contact with one side surface 41200 of the mirror 41000 and a first-second protrusion 4902B in contact with the other side surface 41200 of the mirror 41000. The first-first protrusion 4902A is disposed to protrude from an end of the first part 4911 rather than the first surface 4901. The first-second protrusion portion 4902B is disposed to protrude from an end of the second part 4912 rather than the first surface 4901.

A thickness t14 of the first protrusion 4902 may be the same as a thickness t24 of the mirror 41000.

The first screw 24 may be fastened by penetrating the first part 4911 and the second part 4912 at the side of the first part 4911. Accordingly, a head of the first screw 24 is in contact with the first part 4911. The second screw 34 may be fastened by penetrating the first part 4911 and the second part 4912 at the side of the second part 4912. Accordingly, a head of the second screw 34 is in contact with the second part 4912.

Figure 61:
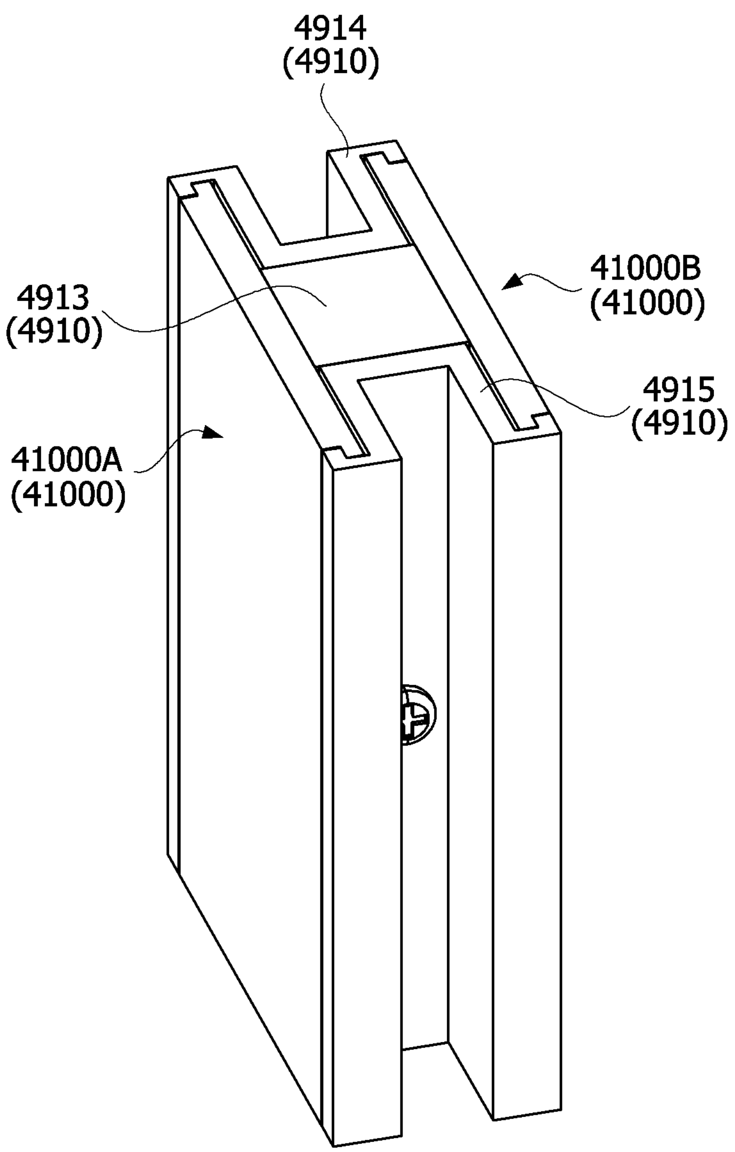
FIG. 61 is a view illustrating the holder and the mirror according to still further another modified embodiment.
Figure 62:
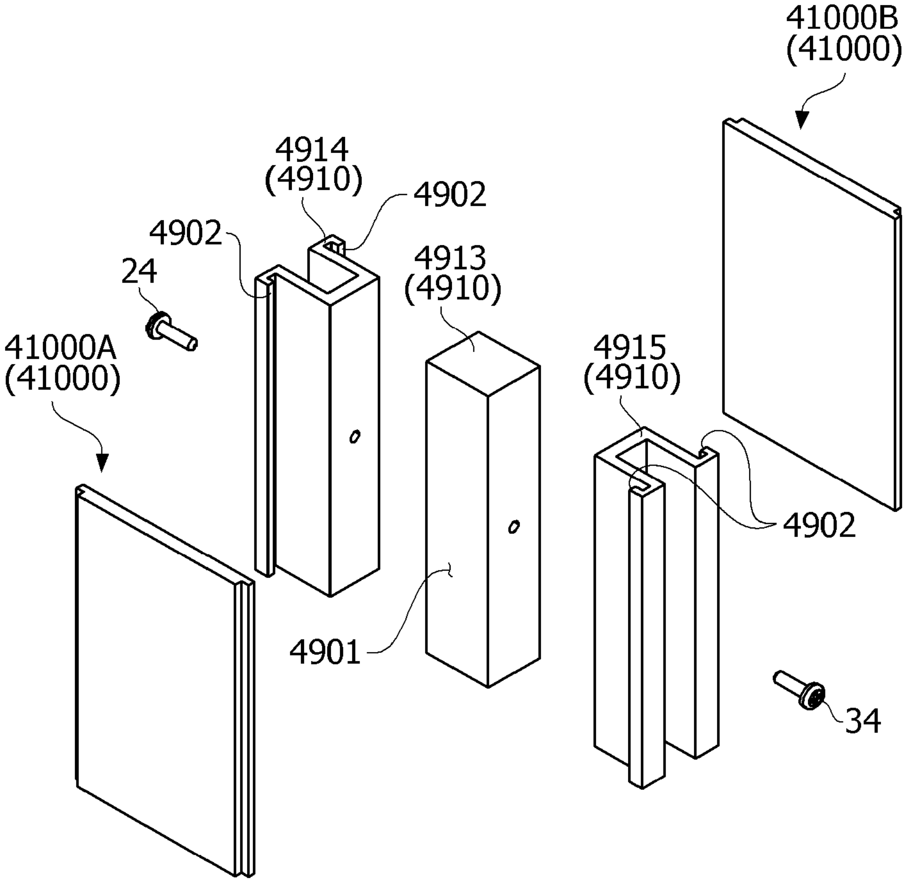
FIG. 62 is an exploded view of the holder and the mirror illustrated in FIG. 61.
Figure 63:
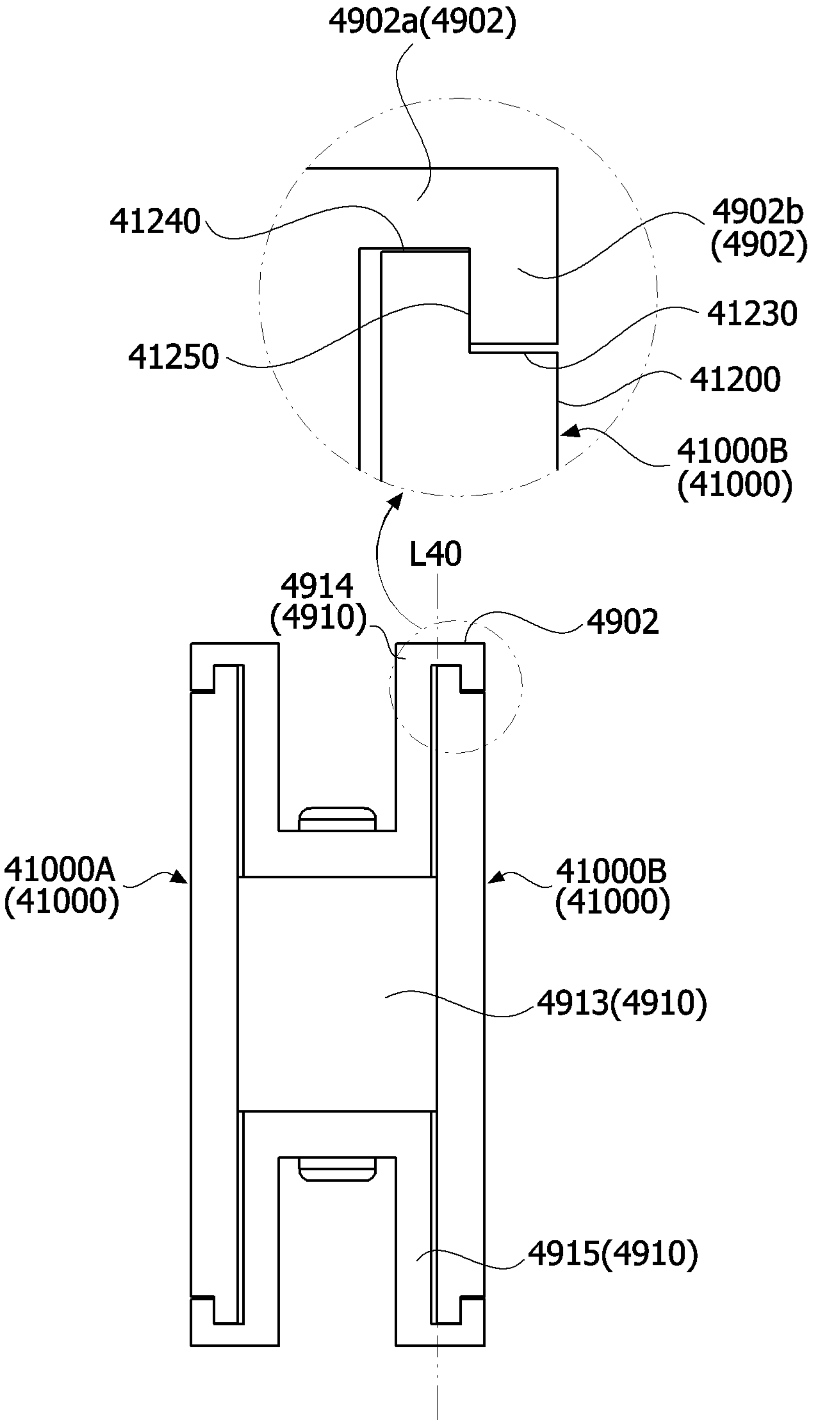
FIG. 63 is a top plan view of the holder and the mirror illustrated in FIG. 61.

FIG. 61 is a view illustrating the holder 4900 and the mirror 41000 according to still further another modified embodiment, FIG. 62 is an exploded view of the holder 4900 and the mirror 41000 illustrated in FIG. 61, and FIG. 63 is a top plan view of the holder 4900 and the mirror 41000.

Referring to FIGS. 61 to 62, in the holder 4900 according to still further another modified embodiment, a portion of the body 4910 is implemented as a first protrusion 4902 that supports the side surface 41200 of the mirror 41000; however, the body 4910 is made up of three parts, and the side surface 41200 of the mirror 41000 is disposed in a stepped manner.

Specifically, the body 4910 may include a third part 4913, a fourth part 4914, and a fifth part 4915. The third part 4913 may have a hexahedral block shape including the first surface 4901. The fourth part 4914 and the fifth part 4915 are coupled to the third part 4913 via the first screw 24 and the second screw 34, respectively. Each of the fourth part 4914 and the fifth part 4915 may have a cross-sectional shape formed in a "⊏" type. The first protrusions 4902 may be disposed on the fourth part 4914 and the fifth part 4915, respectively.

The side surface 41200 of the mirror 41000 may include a third side surface 41200 disposed adjacent to the front surface 41300 of the mirror 41000 and a fourth side surface 41200 disposed adjacent to the rear surface 41100 of the mirror 41000. The third side surface 41200 and the fourth side surface 41200 are connected to each other using a stepped surface 1250. The first protrusion 4902 may be disposed to be in contact with the stepped surface 1250. That is, a portion of the mirror 41000 and a portion of the first protrusion 4902 are disposed to overlap each other based on a thickness direction of the mirror 41000. The structure of the side surface 41200 of the mirror 41000 and the first protrusion 4902 has the advantage of increasing the coupling force between the mirror 41000 and the holder 4900. In particular, the mirror 41000 may be prevented from being separated in the radial direction of the motor by centrifugal force.

The present invention may be used in a variety of devices such as vehicles or home appliances.

The invention claimed is:

1. A motor comprising:
a shaft;
a rotor coupled to the shaft;
a stator disposed between the shaft and the rotor;
a bearing disposed between the shaft and the stator; and
a base plate,
wherein
the rotor includes a yoke coupled to the shaft,
the base plate includes a body, a first partition protruding from the body, and a second partition extending from the first partition,
the first partition is disposed between the bearing and the stator,
a portion of the second partition is disposed to be overlapped with the first partition, and
the first partition is in contact with a lateral surface of an outer ring of the bearing and the second partition is in contact with one surface of the outer ring of the bearing,
wherein the rotor further includes a drive magnet and a sensing magnet coupled to the yoke, and at least a portion of the first partition in the radial direction is disposed to be overlapped with the stator, the drive magnet and the sensing magnet, and
wherein the yoke includes an extension part in contact with the shaft, and the second partition is disposed to be overlapped with the extension part in a radial direction.

2. The motor of claim 1, wherein the yoke includes a first hole penetrated by the shaft,
the base plate includes a second hole penetrated by the shaft,
an inner diameter of the second hole is larger than an inner diameter of the first hole,
the shaft is in contact with an inner surface of the first hole, and
an outer surface of the bearing is in contact with an inner surface of the second hole.

3. The motor according to claim 2,
wherein a portion of the base plate is disposed to overlap the bearing in a radial direction.

4. The motor according to claim 2,
wherein a portion of the base plate is disposed to overlap the yoke in a radial direction.

5. The motor according to claim 2,
wherein a distance in the radial direction between an inner surface of an inner ring and an outer surface of an outer ring of the bearing is equal to a difference between an inner diameter of the second hole and an inner diameter of the first hole.

6. The motor according to claim 1, wherein a curved surface disposed in a boundary between the body and the first partition is provided.

7. The motor according to claim 1, wherein a distance from the body to an upper end of the first partition exceeds a length of the bearing and is less than the longest distance from the body to the yoke in an axial direction.

8. The motor according to claim 1, wherein the rotor further includes a drive magnet and a sensing magnet coupled to the yoke, and at least a portion of the first partition in the radial direction is disposed to be overlapped with the stator, the drive magnet and the sensing magnet.

9. The motor of claim 1, wherein at least a portion of the first partition is disposed to be overlapped with the stator in the radial direction.

* * * * *